(12) United States Patent
Doi

(10) Patent No.: US 8,564,624 B2
(45) Date of Patent: Oct. 22, 2013

(54) IMAGE PROCESSING APPARATUS, IMAGE PROCESSING METHOD, AND PROGRAM

(75) Inventor: Nobuhiro Doi, Chiba (JP)

(73) Assignee: Sony Corporation, Tokyo (JP)

(*) Notice: Subject to any disclaimer, the term of this patent is extended or adjusted under 35 U.S.C. 154(b) by 651 days.

(21) Appl. No.: 12/820,296

(22) Filed: Jun. 22, 2010

(65) Prior Publication Data

US 2011/0025711 A1    Feb. 3, 2011

(30) Foreign Application Priority Data

Aug. 3, 2009 (JP) ................................. 2009-180627

(51) Int. Cl.
*G09G 5/00* (2006.01)

(52) U.S. Cl.
USPC ........................................................ 345/635

(58) Field of Classification Search
USPC .................................................. 345/634–641
See application file for complete search history.

(56) References Cited

U.S. PATENT DOCUMENTS

| | | | | |
|---|---|---|---|---|
| 6,147,703 A | * | 11/2000 | Miller et al. | 348/220.1 |
| 6,310,648 B1 | * | 10/2001 | Miller et al. | 348/333.05 |
| 2002/0064387 A1 | * | 5/2002 | Miyake et al. | 396/429 |
| 2003/0081135 A1 | * | 5/2003 | Boll | 348/333.01 |
| 2005/0160377 A1 | * | 7/2005 | Sciammarella et al. | 715/838 |
| 2007/0188646 A1 | | 8/2007 | Kobayashi et al. | |
| 2008/0309644 A1 | * | 12/2008 | Arimoto | 345/173 |
| 2010/0002013 A1 | * | 1/2010 | Kagaya | 345/619 |

FOREIGN PATENT DOCUMENTS

JP    2005-328243    11/2005

* cited by examiner

*Primary Examiner* — Aaron M Richer
*Assistant Examiner* — Mohammad H Akhavannik
(74) *Attorney, Agent, or Firm* — Sony Corporation

(57) ABSTRACT

An image processing apparatus includes: a drawing unit which draws one of a plurality of images arranged in an order specified on the basis of a predetermined rule as a reference image in an image memory and which arranges and draws the predetermined number of images located on either side of the reference image in the order and continuing from the reference image as near images of the reference image in the order with reference to the reference image in the image memory; a display controller which displays the images falling within a predetermined range among the images drawn in the image memory on a display unit; and a controller which changes the position of the predetermined range in accordance with an instruction operation of changing a display state of the images on the display unit, when the instruction operation is received.

16 Claims, 37 Drawing Sheets

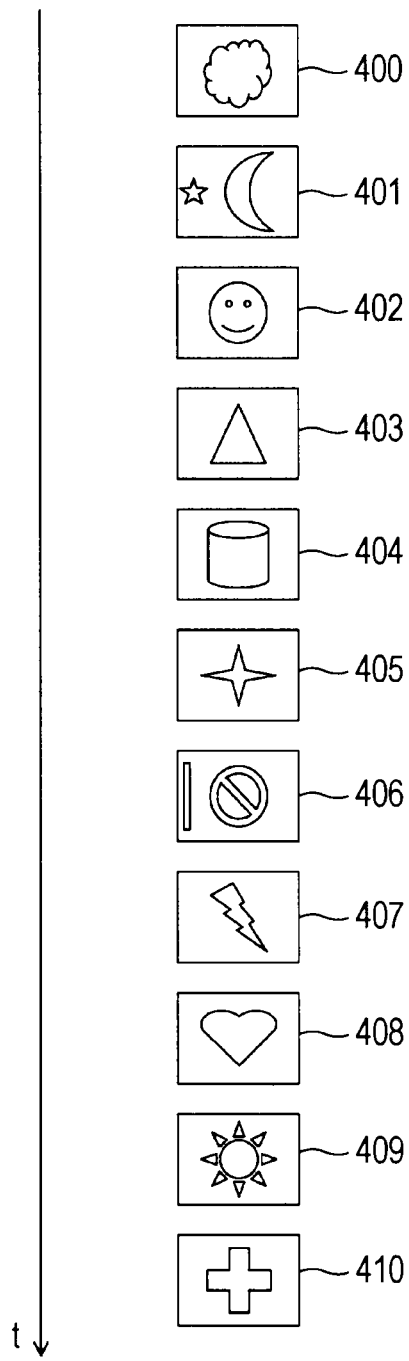

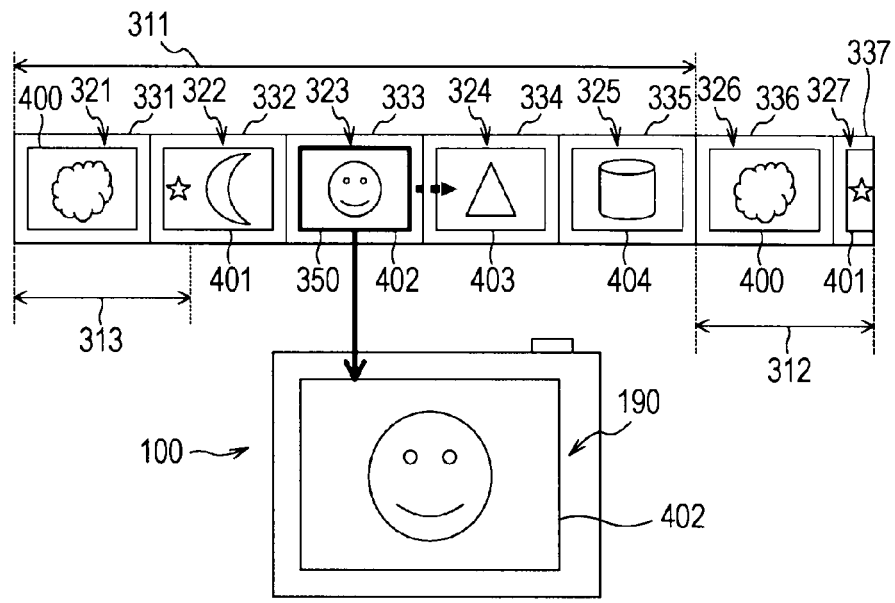
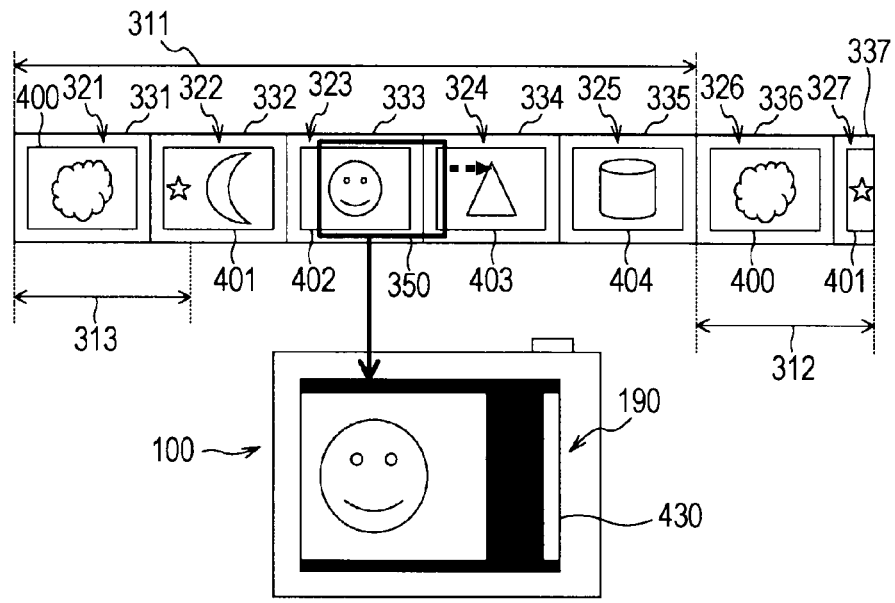

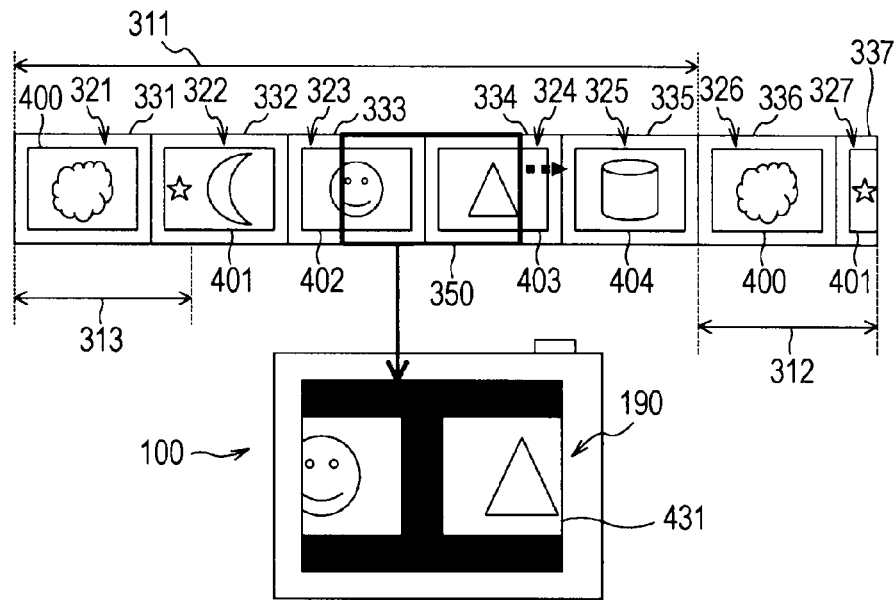
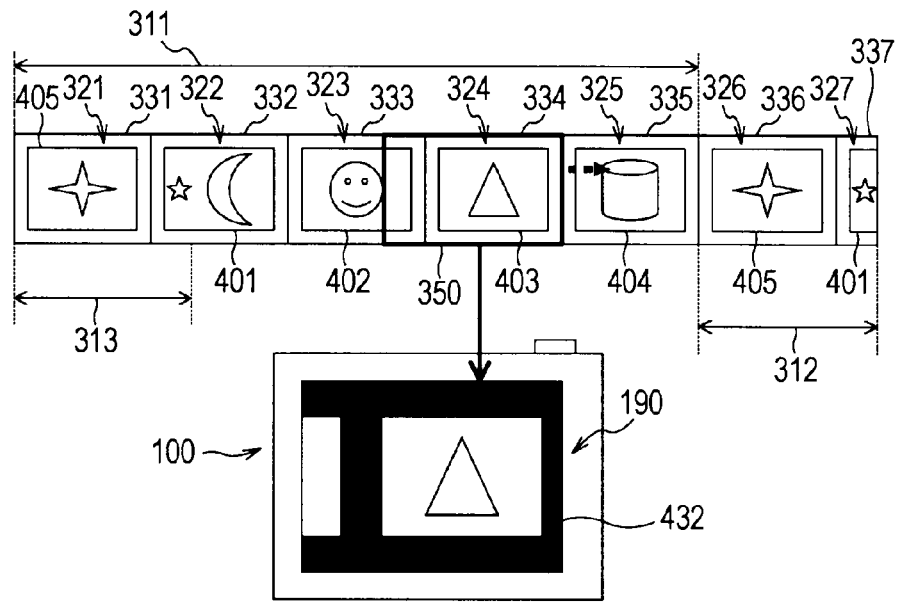

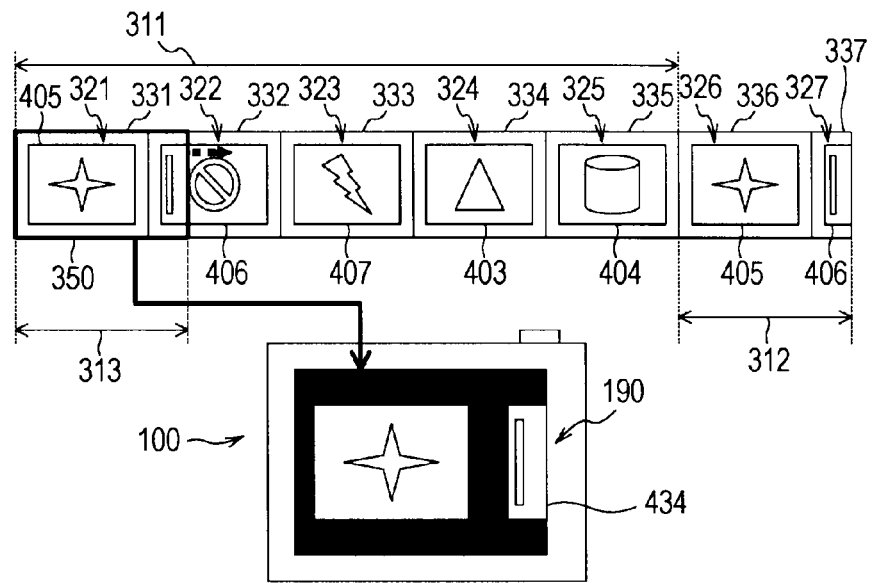
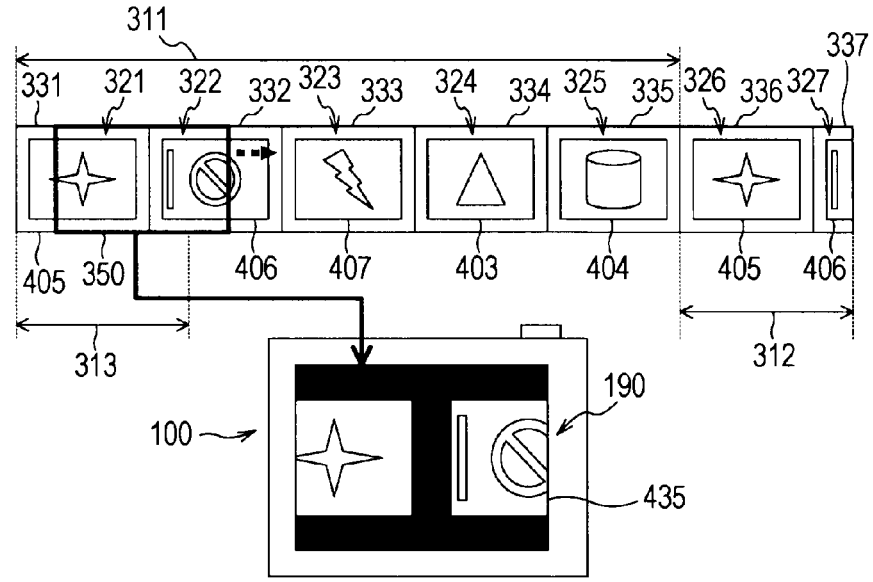

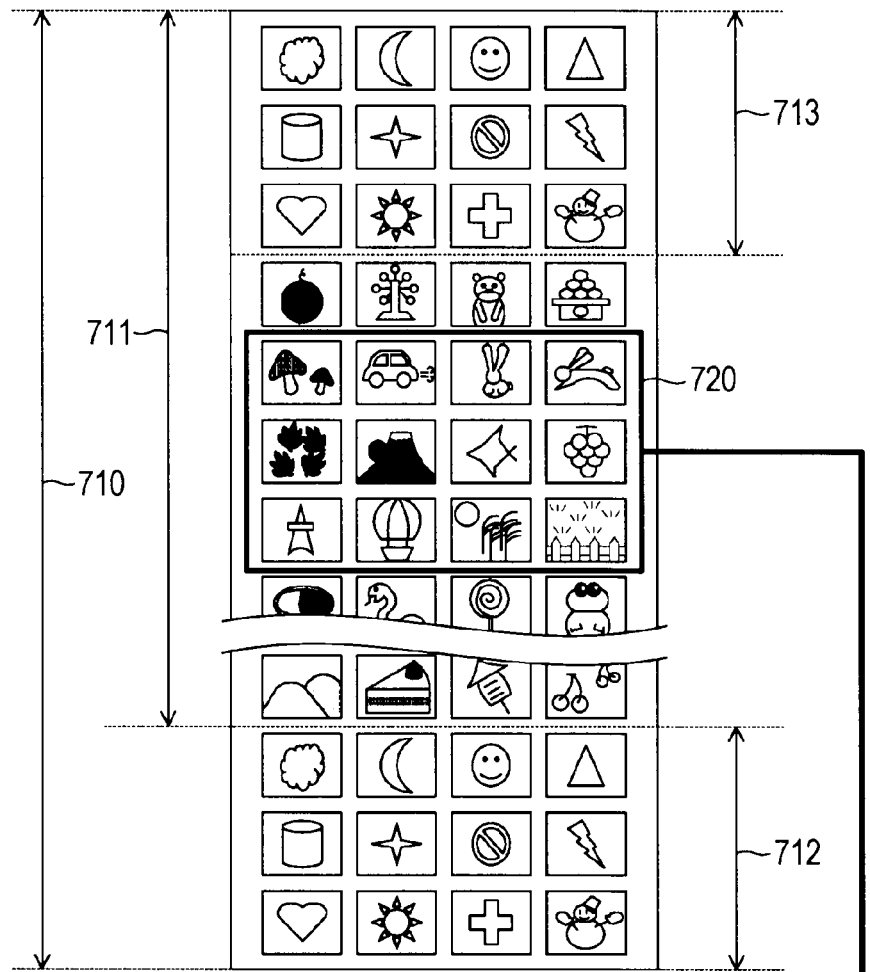
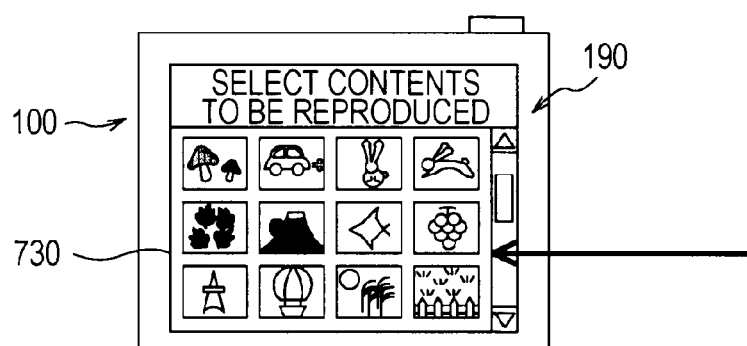
FIG. 37A
FIG. 37B

IMAGE PROCESSING APPARATUS, IMAGE PROCESSING METHOD, AND PROGRAM

BACKGROUND OF THE INVENTION

1. Field of the Invention

The present invention relates to an image processing apparatus, and more particularly, to an image processing apparatus and an image processing method of displaying an image and a program causing a computer to execute the image processing method.

2. Description of the Related Art

In recent years, there have been widely used imaging apparatus such as a digital still camera capable of capturing an image of a subject such as a figure or a scene, generating image data, and recording the image data as an image file. Moreover, there has been suggested an image processing apparatus capable of sequentially reproducing recorded image files by an operation of a user.

For example, an imaging apparatus has been suggested which is capable of moving reproduced images, which are arranged and displayed in chronological order by a user operating arrow keys, in right and left directions through animation on a display screen (for example, see Japanese Unexamined Patent Application Publication No. 2005-328243 (FIG. 6)).

SUMMARY OF THE INVENTION

In the above-mentioned technique according to the related art, when images stored in an external recording medium are reproduced, the reproducing target images are acquired from the external recording medium, the acquired images are stored in an internal recording medium, and the stored images are displayed as reproduced images. Moreover, when images are scroll-displayed on the display screen, the reproducing target images acquired from the external recording medium are stored in the internal recording medium and the stored images are scroll-displayed as the reproduced images through animation.

When the images are scroll-displayed on the display screen through animation, the reproduced images scroll-displayed are frequently subjected to a drawing process in the internal recording medium. However, when the reproduced images scroll-displayed through animation are frequently subjected to the drawing process, a problem may arise in that the scroll display is not appropriately executed by an operation of a user.

It is desirable to provide a technique capable of scroll-displaying plural images appropriately in accordance with an operation detail.

According to an embodiment of the invention, there is provided an image processing apparatus including a drawing unit which draws one of a plurality of images arranged in an order specified on the basis of a predetermined rule as a reference image in an image memory and which arranges and draws the predetermined number of images located before the reference image in the order and continuing from the reference image and the predetermined number of images located after the reference image in the order and continuing from the reference image as near images of the reference image in the order with reference to the reference image in the image memory; a display controller which displays the images falling within a predetermined range among the images drawn in the image memory on a display unit; and a controller which changes the position of the predetermined range in accordance with an instruction operation of changing a display state of the images on the display unit, when the instruction operation is received, which changes the reference image to another image among the images drawn in the image memory, when a given condition is satisfied, and which permits the drawing unit to arrange and draw the near images of the changed reference image in the order with reference to the changed reference image. There are also provided an imaging processing method and a program causing a computer to execute the image processing method. With such a configuration, when an instruction operation of changing the display state of the images on the display unit is received, the position of the predetermined range can be changed in accordance with the instruction operation. When the position of the predetermined range is changed under satisfaction of a given condition, the reference image can be changed and the near images of the changed reference image are arranged and drawn with reference to the changed reference image.

According to the embodiment of the invention, when the instruction operation is received, the controller may change the number of near images of the changed reference image in accordance with a kind of instruction operation and may permit the drawing unit to draw these near images. With such a configuration, when the instruction operation is received, the number of near images of the changed reference image can be changed and the near images are drawn in response to the kind of instruction operation.

According to the embodiment of the invention, the drawing unit may arrange and draw the reference image and the near images in the order in a specified direction in an image drawing region of the image memory. The controller may permit the drawing unit to draw the near image, which is not able to be drawn, in the other end of the image drawing region in the specified direction in the order, when all of the near images of the changed reference image are not able to be arranged and drawn in the image drawing region in the specified direction in the order upon changing the reference image. With such a configuration, when all of the near images of the changed reference image are not able to be arranged and drawn in the image drawing region in the specified direction in the order, the near images which are not able to be drawn can be drawn in the other end of the image drawing region in the specified direction in the order.

According to the embodiment of the invention, the drawing unit may draw the same image as the reference image or the near image drawn in one end of the image drawing region in the specified direction in the other end of the image drawing region in the specified direction. The controller may move the predetermined range to the other end of the image drawing region in the specified direction, when the predetermined range changed in accordance with the instruction operation reaches either one or the other end of the image drawing region in the specified direction. With such a configuration, the predetermined range changed in accordance with the instruction operation reaches either one end or the other end of the image drawing region in the specified direction, the predetermined range can be moved to the other end of the image drawing region in the specified direction.

According to the embodiment of the invention, the drawing unit may allow the size of a drawing region in the other end of the image drawing region in the specified direction, where the same image as the reference image or the near image drawn in the one end of the image drawing region is drawn, to be nearly equal to the largest size of the predetermined range. With such a configuration, the size of the drawing region of the image drawing region in the specified direction, where the same image as the reference image or the near image drawn in the one end of the image drawing region is drawn, can be made nearly equal to the largest size of the predetermined range.

According to the embodiment of the invention, the controller may permit the drawing unit to newly draw only the near image which is not drawn in the image memory among the near images of the changed reference image, when the reference image is changed. With such a configuration, when the reference image is changed, only the near images which are not drawn in the image memory among the near images of the changed reference image can be newly drawn.

According to the embodiment of the invention, the image processing apparatus may further include an operation receiving unit which receives an operation detail as an instruction operation to scroll-display the plurality of images on the display unit. The display controller may move the predetermined range in accordance with the instruction operation and permits the display unit to scroll-display each image drawn in the image memory. With such a configuration, the predetermined range can be moved and the images drawn in the image memory can be scroll-displayed on the display unit on the basis of the operation detail to scroll-display the plurality of images on the display unit.

According to the embodiment of the invention, the plurality of images may be images indicating contents. The drawing unit may specify the order on the basis of attribute information associated with the contents. With such a configuration, the order in which the reference image and the near images are arranged can be specified on the basis of attribute information associated with the contents.

According to the embodiment of the invention, the plurality of images may be thumbnail images indicating contents. The drawing unit may draw the reference image and the near images in the order in accordance with the display arrangement of a content selection screen used to select the contents. The display controller may display the content selection screen, which contains the predetermined range within which the plurality of thumbnail images fall among the thumbnail images drawn in the image memory and contains the plurality of thumbnail images falling within the predetermined range, on the display unit. With such a configuration, the reference image and the near images can be drawn in the order in accordance with the arrangement to display the content selection screen. The plurality of thumbnail images among the thumbnail images drawn in the image memory can fall within the predetermined range. The content selection screen containing the plurality of thumbnail images falling within the predetermined range can be displayed.

According to the embodiment of the invention, it is possible to obtain the advantage of scroll-displaying the plural images appropriately in accordance with the operation detail.

BRIEF DESCRIPTION OF THE DRAWINGS

FIG. 6 is a schematic diagram illustrating an image indicating content stored in the memory unit according to the first embodiment of the invention.

FIGS. 15A and 15B are schematic diagrams illustrating a drawing method of drawing images in the image memory by the drawing unit and a display method of displaying the images drawn in the image memory by the display controller according to the first embodiment of the invention.

FIGS. 16A and 16B are schematic diagrams illustrating a drawing method of drawing images in the image memory by the drawing unit and a display method of displaying the images drawn in the image memory by the display controller according to the first embodiment of the invention.

FIGS. 18A and 18B are schematic diagrams illustrating a drawing method of drawing images in the image memory by the drawing unit and a display method of displaying the images drawn in the image memory by the display controller according to the first embodiment of the invention.

FIGS. 37A and 37B are schematic diagrams illustrating a drawing method of drawing images in an image memory by the drawing unit and a display method of displaying the images drawn in the image memory by the display controller according to a fourth embodiment of the invention.

DESCRIPTION OF THE PREFERRED EMBODIMENTS

Hereinafter, preferred embodiments (hereinafter, referred to as embodiments) of the invention will be described. The description is made in the following order.
1. First Embodiment (Drawing Control and Display Control: Example Where Images Indicating Contents Are Scroll-displayed)
2. Second Embodiment (Drawing Control and Display Control: Example Where Pasting Regions Are Supplied at Both Ends of Loop Region)
3. Third Embodiment (Drawing Control and Display Control: Example Where Pasting Region Is Omitted)
4. Fourth Embodiment (Drawing Control and Display Control: Example Where Index Image Is Scroll-displayed)

1. First Embodiment

Exemplary Appearance Configuration of Imaging Apparatus

Figure 1A:
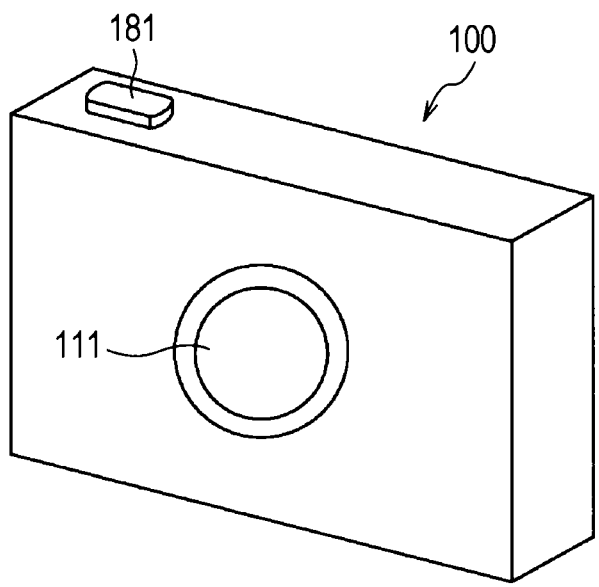
FIGS. 1A and 1B are perspective views illustrating the appearance of an imaging apparatus according to a first embodiment of the invention.
Figure 1B:
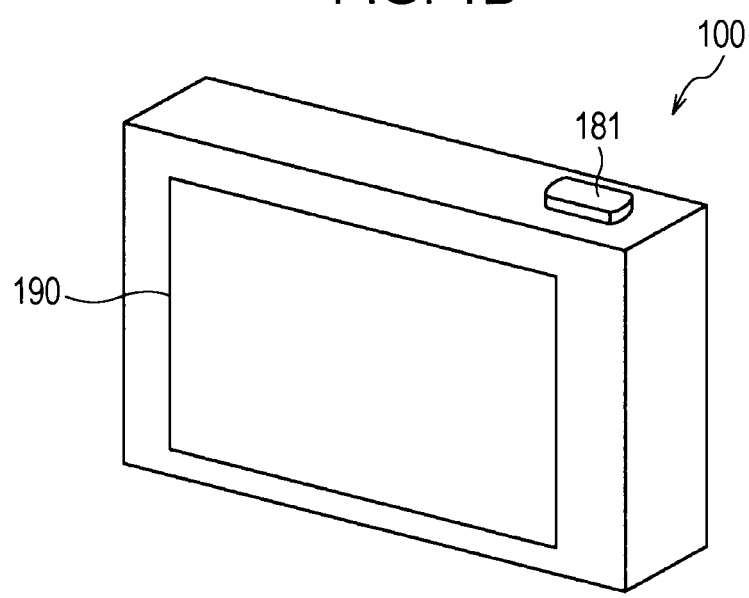

FIGS. 1A and 1B are perspective views illustrating the appearance of an imaging apparatus 100 according to a first embodiment of the invention. FIG. 1A is the perspective view illustrating the front surface (on which a lens unit 111 facing a subject is disposed) of the imaging apparatus 100. FIG. 1B is the perspective view illustrating the rear surface (on which an input/output panel 190 facing the photographer is disposed) of the imaging apparatus 100.

The imaging apparatus 100 includes a lens unit 111, a shutter button 181, and an input/output panel 190. The imaging apparatus 100 generates image data by imaging a subject and records the image data as a still image file or a video file. The imaging apparatus 100 is realized as a digital still camera or a digital video camera capable of displaying the image data. The imaging apparatus 100 is an example of an image processing apparatus according to an embodiment of the invention. The imaging apparatus 100 further includes other operation members such as a power switch and a mode switching switch, but the other operation members are not illustrated and the description thereof is omitted. Some or all of the plural lenses of the lens unit 111 are disposed in the case of the imaging apparatus 100.

The lens unit 111 is an optical system including the plural lenses condensing light from a subject and a diaphragm.

The shutter button 181 is a button that is pressed down by the photographer when the image data (imaged image) generated by imaging a subject is recorded as an image file.

The input/output panel 190 displays various kinds of images and receives an operation input from a user by detecting a contact operation on the input/output panel 190.

Exemplary Inner Configuration of Imaging Device

Figure 2:
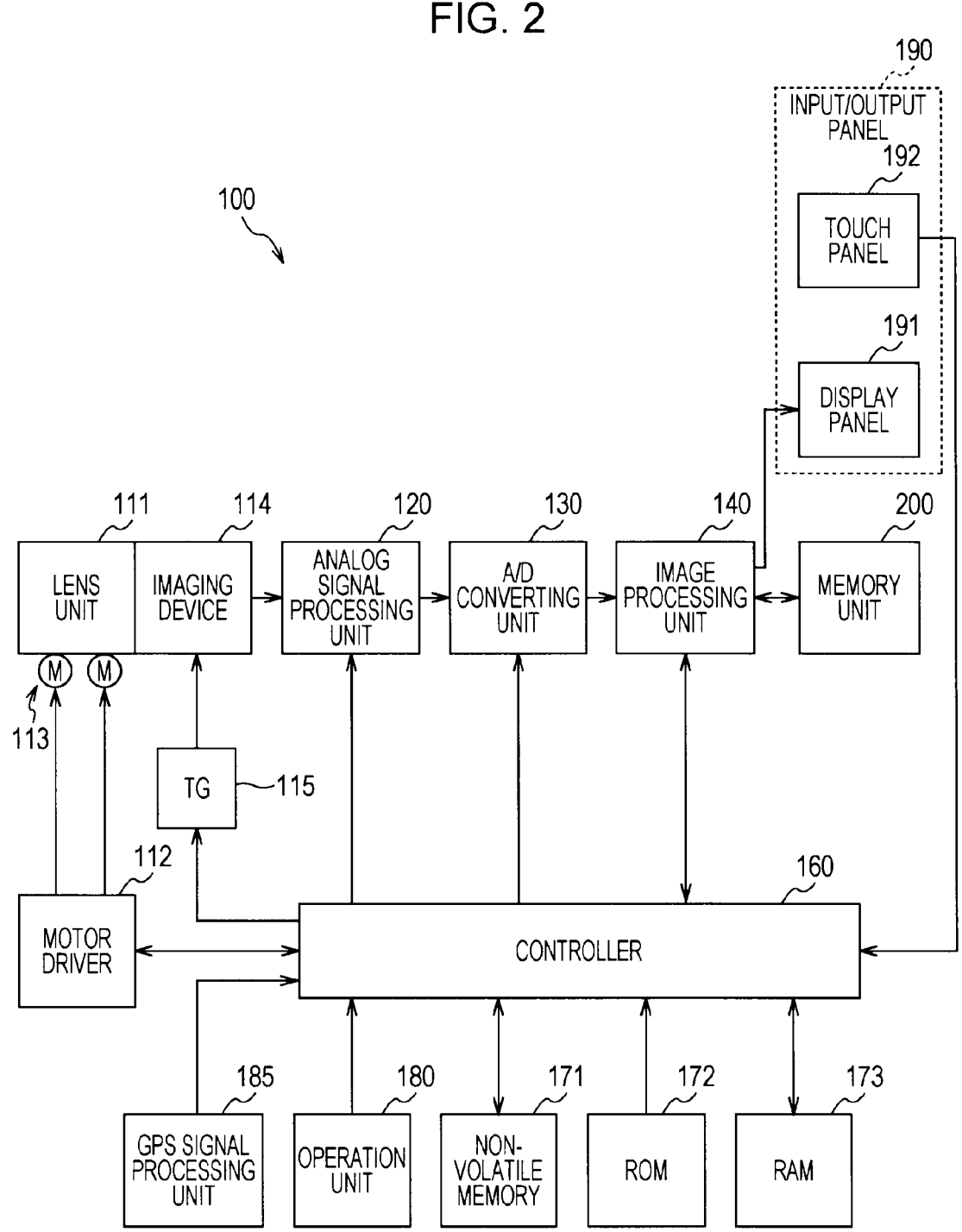
FIG. 2 is a block diagram illustrating an exemplary internal configuration of the imaging apparatus according to the first embodiment of the invention.

FIG. 2 is a block diagram illustrating an exemplary inner configuration of the imaging apparatus 100 according to the first embodiment of the invention. The imaging apparatus 100 includes a lens unit 111, a motor driver 112, an actuator 113, an imaging device 114, a TG (Timing Generator) 115, an analog signal processing unit 120, and an A/D (Analog/Digital) converting unit 130. The imaging apparatus 100 further includes an imaging processing unit 140, a memory unit 200, a controller 160, a non-volatile memory 171, a ROM (Read Only Memory) 172, and a RAM (Random Access Memory) 173. The imaging apparatus 100 further includes an operation unit 180, a GPS signal processing unit 185, and an input/output panel 190. Since the lens unit 111 and the input/output panel 190 are the same as those shown in FIGS. 1A and 1B, the same reference numerals are given.

The lens unit 111 is an optical system including a zoom lens changing a focal distance continuously, a focus lens adjusting the focus, and a diaphragm. The lens unit 111 condenses light from a subject and outputs it to the light imaging device 114. The lens unit 111 is mechanically connected to an actuator 113 that moves the zoom lens, the focus lens, and the like and adjusts the diaphragm.

The motor driver 112 is a unit that drives the actuator 113 under the control of the controller 160.

The actuator 113 is a unit that is driven under the control of the motor driver 112 to adjust the diaphragm forming the lens unit 111 and to move the focus lens or the like forming the lens unit 111.

The imaging device 114 is disposed on an optical path of light incident via the lens unit 111 from a subject. The imaging device 114 operates in accordance with a timing signal supplied form the TG 115 to form an incident image of the subject and generate an image signal. That is, the imaging device 114 executes photoelectric conversion by condensing the light incident via the lens unit 111 from the subject to generate the image signal (analog signal) in accordance with the amount of received light and supply the generated image signal to the analog signal processing unit 120. As the imaging device 114, there may be used a CCD (Charge Coupled Device) type or CMOS (Complementary Metal Oxide Semiconductor) type solid-state imaging device.

The TG 115 is a timing generator that supplies a timing signal to the imaging device 114 under the control of the controller 160. An exposure time or the like of the imaging device 114 is controlled on the basis of the timing signal.

The analog signal processing unit 120 executes analog signal processing such as amplification on the image signal (analog signal) supplied from the imaging device 114 under the control of the controller 160 and supplies the image signal subjected to the analog signal processing to the A/D converting unit 130.

The A/D converting unit 130 executes A/D conversion on the image signal (analog signal) supplied from the analog signal processing unit 120 under the control of the controller 160 and supplies image signal (digital signal) obtained by the A/D conversion to the image processing unit 140.

The image processing unit 140 executes various kinds of image processing under the control of the controller 160. For example, the image processing unit 140 executes digital signal processing, such as a noise removing process, on the image signal (digital signal) supplied from the A/D converting unit 130 and supplies the image signal (image data) subjected to the digital signal processing to the input/output panel 190. In this way, the image processing unit 140 supplies the image signal subjected to the digital signal processing to the input/output panel 190 to display an image (so-called through image) corresponding to the image signal. The image processing unit 140 generates an image of a focus range (AF range) used in control of the focus under the control of the controller 160, and supplies the image to the input/output panel 190 to display the image.

The image processing unit 140 compresses the image signal supplied from the A/D converting unit 130 in a predetermined encoding method, supplies the compressed image signal to the memory unit 200, and records the compressed image signal as an image file. As the encoding method, JPEG (Joint Photographic Experts Group) may be used, for example. The image processing unit 140 decompresses the compressed image data recorded in the memory unit 200 and supplies each image generated on the basis of the decompressed image data to the input/output panel 190 to display the image data. The image processing unit 140 acquires the image data and information recorded in the memory unit 200 and supplies the acquired image data to the controller 160.

The memory unit 200 is a recording unit that stores the image signal supplied from the image processing unit 140 as a still screen file (still screen content) or a video file (video content). The memory device 200 stores various kinds of information supplied from the image processing unit 140. The memory unit 200 supplies the stored file or information to the image processing unit 140. As the memory unit 200, there is used a disk such as a DVD (Digital Versatile Disk) or a removable recording medium such as a semiconductor memory such as a memory card. The memory unit 200 may be disposed in the imaging apparatus 100 or may be detachable from the imaging apparatus 100.

The controller 160 executes a program stored in the ROM 172 and controls the units of the imaging apparatus 100. The controller 160 executes various kinds of processing in accordance with the operation of the user on a touch panel 192 or an operation signal output from the operation unit 180. For example, the controller 160 is realized by a CPU (Central Processing Unit). The control of the controller 160 is described in detail with reference to FIG. 3.

The non-volatile memory 171 is a non-volatile memory that stores data (various kinds of setting information) that have to be stored even when the imaging apparatus 100 is turned off. Examples of the non-volatile memory 171 include an EEPROM (Electrically Erasable Programmable Read Only Memory) and a flash memory.

The ROM 172 is a memory that stores a program executed by the controller 160 or data necessary for executing the program by the controller 160.

The RAM 173 is a memory that temporarily stores a program necessary for executing various processes by the controller 160 or data. The RAM 173 is used as a work area of the program executed by the controller 160.

The operation unit 180 is an operation receiving unit which receives an operation detail operated by a user and supplies an operation signal to the controller 160 in accordance with the received operation detail. The operation unit 180 corresponds to the shutter button 181 shown in FIGS. 1A and 1B, for example.

The input/output panel 190 includes a display panel 191 and the touch panel 192. The display panel 191 is a unit that displays an image corresponding to the image data on the basis of the image data supplied from the image processing unit 140. For example, an image imaged by the imaging device 114 is displayed on the input/output panel 190 (so-called display of a through image). Various menu pictures or various images are displayed on the input/output panel 190. Examples of the display panel 191 include an LCD (Liquid Crystal Display) and an organic EL (Electro Luminescent) panel.

The touch panel 192 overlaps with the display panel 191 so as to be transparent to the screen of the display panel 191. The touch panel 192 receives an operation input from the user by detecting an object coming into contact with the display surface thereof. When the user presses down a desired position with the finger touching the operation screen displayed on the display panel 191, the touch panel 192 detects the coordinates of the pressed position and outputs the operation signal corresponding to the detected coordinates to the controller 160. The controller 160 executes a predetermined process on the basis of the acquired operation signal, when acquiring the operation signal. As the touch panel 192, for example, a touch panel may be used which converts the contact on the display surface into an electric signal by use of a special sensing device and outputs the converted electric signal to the controller 160. Alternatively, as the touch panel 192, an optical sensor type touch panel may be used which detects the closeness to the display surface or an object coming into contact with the display surface.

The GPS signal processing unit 185 calculates position information on the basis of a GPS signal received by a GPS signal receiving antenna and outputs the calculated position information to the controller 160. The calculated position information contains data regarding the latitude, longitude, and altitude information at the time of taking the photograph.

The imaging operation of the imaging apparatus 100 will be described. For example, when the shutter button 181 shown in FIGS. 1A and 1B is pressed down, a release signal is supplied from the operation unit 180 to the controller 160. When the release signal is supplied to the controller 160, the controller 160 controls the image processing unit 140, compresses the image signal supplied from the A/D converting unit 130 to the image processing unit 140, and stores the compressed image signal as an image file in the memory unit 200. When the image file is stored, time information, the position information (GPS information) calculated by the GPS signal processing unit 185, a thumbnail image, and a screen nail image are stored as auxiliary information in the image file. The image file is described in detail with reference to FIG. 4.

Exemplary Function Configuration of Imaging Apparatus

Figure 3:
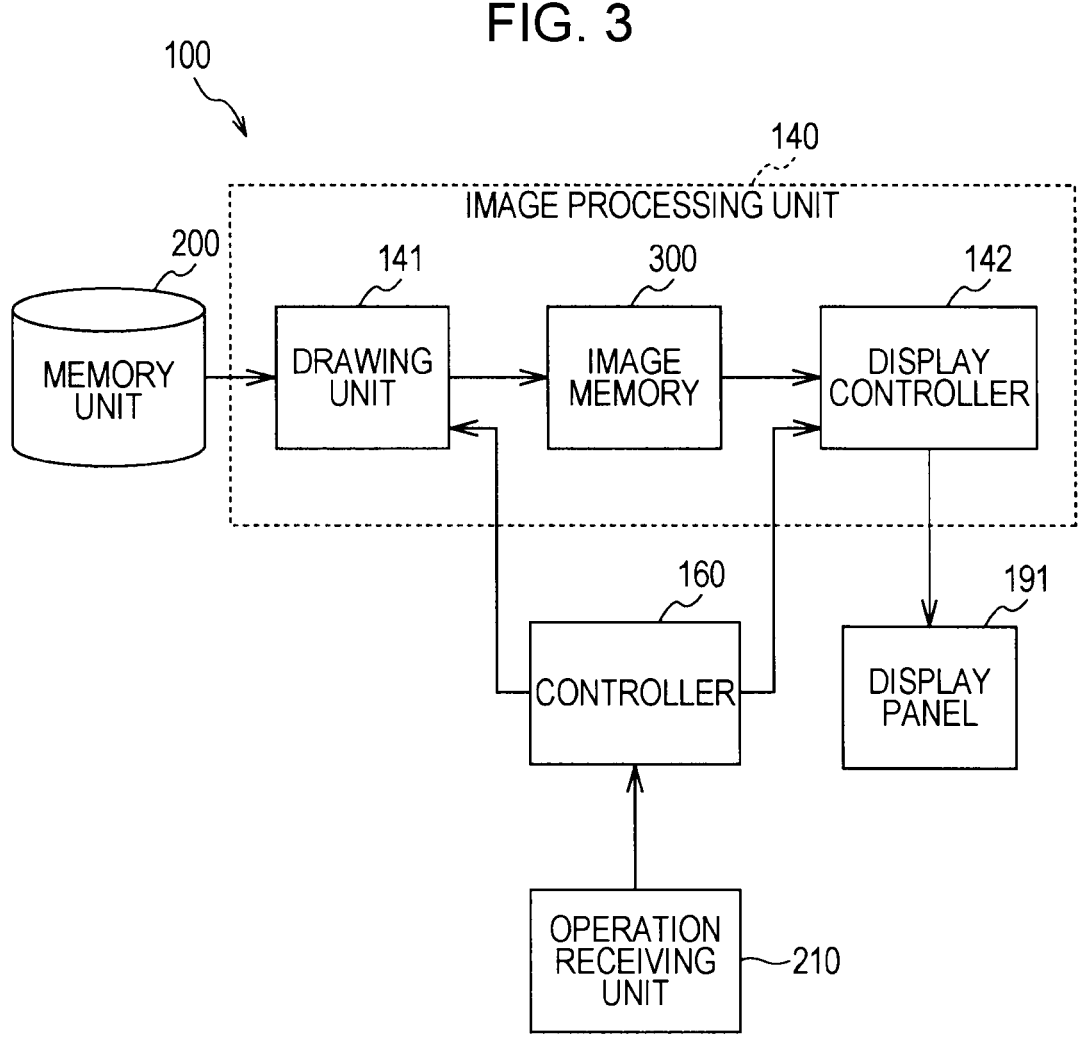
FIG. 3 is a block diagram illustrating an exemplary function configuration of drawing control of the imaging apparatus according to the first embodiment of the invention.

FIG. 3 is a block diagram illustrating an exemplary function configuration of drawing control and display control of the imaging apparatus 100 according to the first embodiment of the invention. The imaging apparatus 100 includes a drawing unit 141, a display controller 142, a controller 160, a display panel 191, a memory unit 200, an operation receiving unit 210, and an image memory 300. The drawing unit 141, the display controller 142, and the image memory 300 correspond to the image processing unit 140 shown in FIG. 2. The controller 160, the display panel 191, and the memory unit 200 are the same as those shown in FIG. 2 and thus the same reference numerals are given to description.

The memory unit 200 stores contents such as a still screen file or a video file and supplies the stored contents to the drawing unit 141. The contents stored in the memory unit 200 are described in detail with reference to FIG. 4.

The operation receiving unit 210 receives an instruction operation to display each image on the display panel 191 and outputs an operation detail to the controller 160 in accordance with the received instruction operation. For example, the operation receiving unit 210 receives an operation detail to scroll-display an image on the display panel 191 indicating the content. The operation receiving unit 210 receives a drag operation, a long-contacting and image sending operation, and a flick operation, and the like as the operation detail. The operation receiving unit 210 corresponds to the operation unit 180 and the touch panel 192 shown in FIG. 2.

The drawing unit 141 acquires the contents stored in the memory unit 200 under the control of the controller 160 and draws each image in the image memory 300 on the basis of the acquired content. Specifically, the drawing unit 141 decodes the contents stored in the memory unit 200, acquires a display image (for example, a screen nail image) from the decoded contents, and draws the acquired image in the image memory 300. For example, the drawing unit 141 draws one of plural images indicating the contents as a reference image in the image memory 300. The drawing unit 141 draws near images in the vicinity of the reference image along a time axis in parallel to the reference image in the image memory 300. Here, the near images are located before the content corresponding to the reference image along the time axis and correspond to a predetermined number of contents continuous from the content corresponding to the reference image. In addition, the near images are located after the content corresponding to the reference image along the time axis and correspond to a predetermined number of contents continuous from the content corresponding to the reference image. A drawing method is described in detail with reference to FIGS. 8A and 8B and FIGS. 9A and 9B.

The image memory 300 is a drawing buffer that maintains the image drawn by the drawing unit 141 and supplies the drawn image to the display controller 142. A drawing region in the image memory 300 is described in detail with reference to FIGS. 5, 23, and the like.

The display controller 142 displays an image, which falls within an extraction range (for example, an extraction range 350 shown in FIGS. 8A and 8B) among the images drawn in the image memory 300, on the display panel 191 under the control of the controller 160. The display control is described in detail with reference FIGS. 8A and 8B and FIGS. 9A and 9B.

The controller 160 controls the drawing unit 141 and the display controller 142 on the basis of the operation detail from the operation receiving unit 210. For example, when the controller 160 receives an instruction operation (for example, a scroll operation) to change the display state of an image on the display panel 191, the controller 160 changes the position of the extraction range on the basis of the instruction operation. When a regular condition is satisfied upon changing the extraction range, the controller 160 changes the reference image to another image among the images drawn in the image memory 300 and permits the drawing unit 141 to draw the near image in the vicinity of the changed reference image along the time axis in parallel to the reference image. In this case, among the near images in the vicinity of the changed reference image, only the near images which have not been drawn in the image memory 300 are newly drawn by the drawing unit 141.

Exemplary Configuration of Image File

Figure 4:
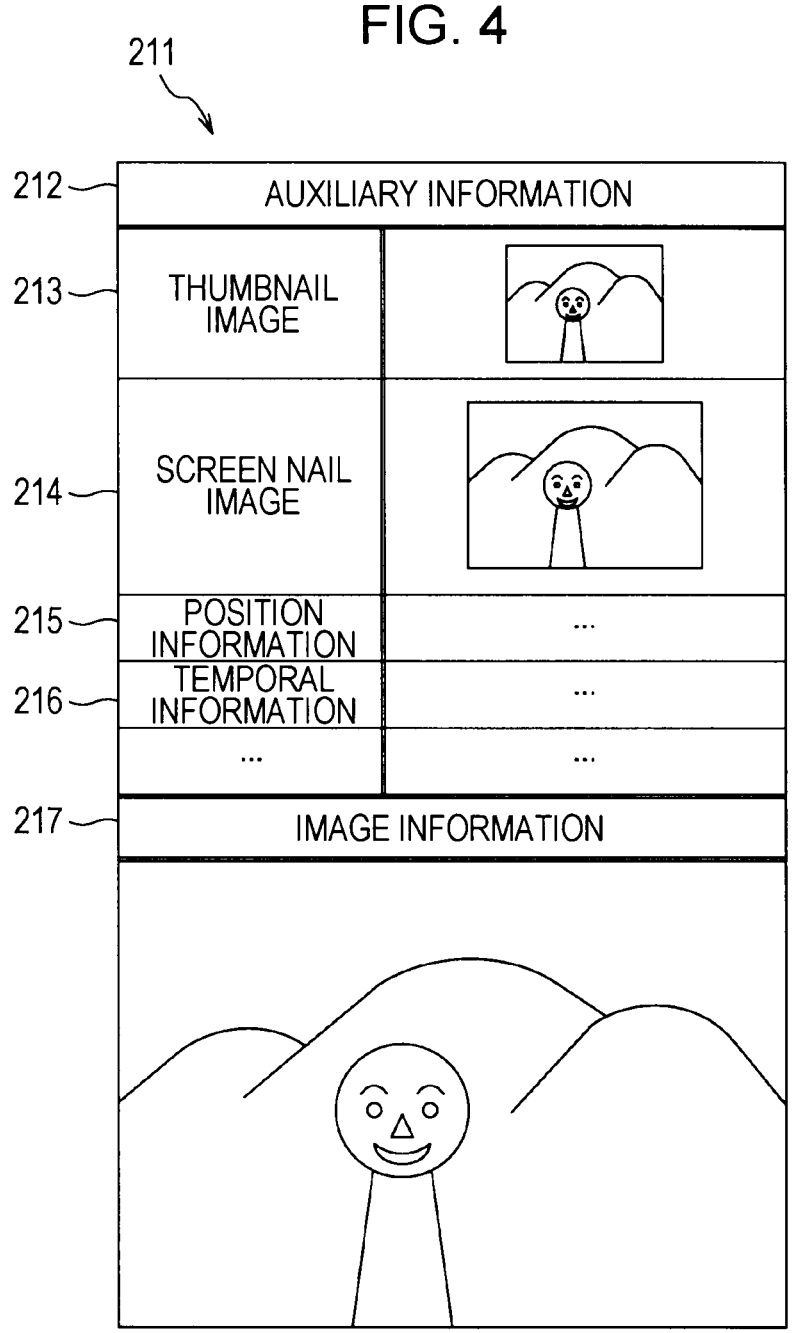
FIG. 4 is a schematic diagram illustrating an image file stored in a memory unit according to the first embodiment of the invention.

FIG. 4 is a schematic diagram illustrating an image file stored in the memory unit 200 according to the first embodiment. In the example shown in FIG. 4, a file structure of a still screen file stored in conformity with the JPEG method is schematically illustrated.

The still screen file 211 is a file that is stored in conformity with the JPEG method and includes auxiliary information 212 and image information 217. The image information 217 is image data (so-called original image) generated by the imaging device 114 and compresses by the image processing unit 140 when the shutter button 181 shown in FIGS. 1A and 1B is pressed down by the user.

The auxiliary information 212 is attribute information regarding the still screen file 211 and contains a thumbnail image 213, a screen nail image 214, position information 215, temporal information 216, and the like.

The thumbnail image 213 is a reduced image corresponding to the image information 217. For example, the thumbnail image is an image displayed on an index screen to select the image file stored in the memory unit 200.

The screen nail image 214 is a display image corresponding to the image information 217. For example, the screen nail image 214 is an image displayed when an image file stored in the memory unit 200 is scroll-displayed.

The position information 215 is GPS information calculated by the GPS signal processing unit 185. For example, the position information 215 contains position information regarding the latitude, longitude, and altitude.

The temporal information 216 is temporal information containing time (time of taking the photograph) at the time of photographing the image information 217.

Exemplary Drawing Region of Display Target Image

Figure 5:
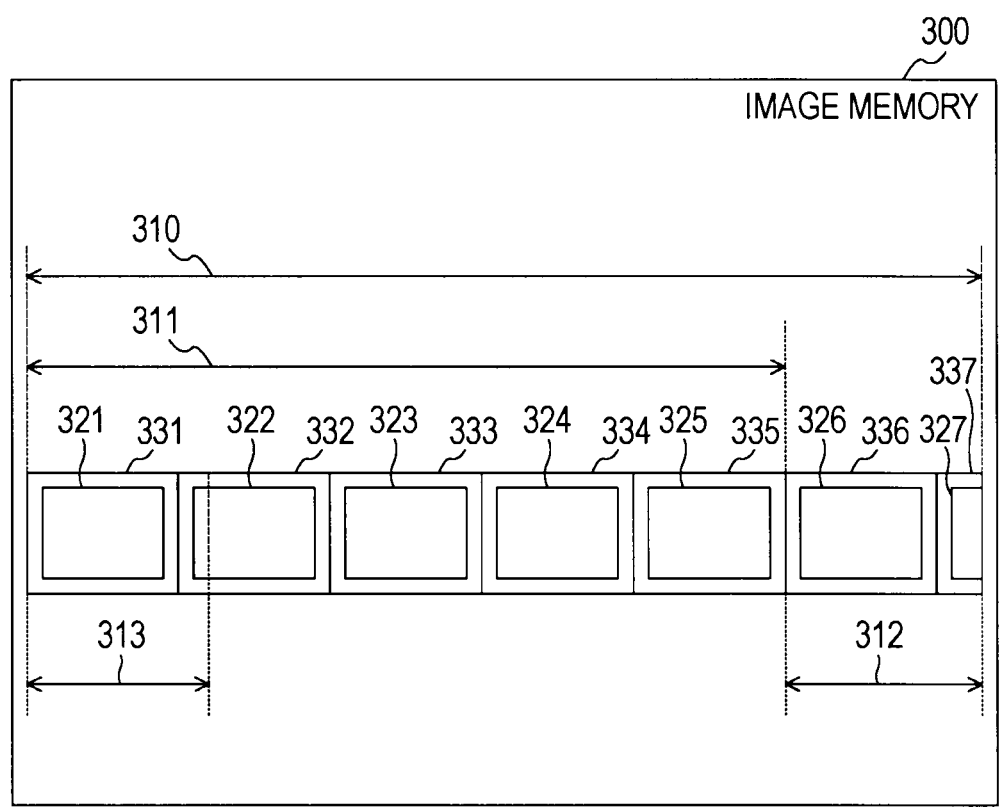
FIG. 5 is a schematic diagram illustrating a drawing region of a display target image in an image memory according to the first embodiment of the invention.

FIG. 5 is a schematic diagram illustrating the drawing region of a display target image in the image memory 300 according to the first embodiment of the invention. In the first embodiment of the invention, when an image (for example, a screen nail image) indicating the content stored in the memory unit 200 is scroll-displayed by an operation of a user, a relatively long drawing region is guaranteed in the scroll direction in the image memory 300. For example, as shown in FIG. 5, an effective region 310 is guaranteed as the drawing region of the display target image in the image memory 300.

The effective region 310 includes a loop region 311 and a pasting region 312.

The loop region 311 is a region where there are drawn a display target image (reference image), two images located before the reference image along the time axis and continuing from the reference image, and two images located after the reference image along the time axis and continuing from the reference image. In the loop region 311, the screen nail images of the contents are drawn in image drawing regions 321 to 325, for example. Black-border regions 331 to 335 are disposed around the image drawing regions 321 to 325, respectively. The black-border regions 331 to 335 are regions that display the borders of images indicating the contents, when the images drawn in the image drawing regions 321 to 325 are scroll-displayed by an operation of the user, for example. The drawing method and display method are described in detail with reference to FIGS. 7A and 7B to FIGS. 22A and 22B.

The pasting region 312 is a region where the same image as the image drawn in the pasting synchronous region 313 of the loop region 311 is drawn. Specifically, the same image as the image drawn in the image drawing region 321 of the loop region 311 is drawn in the image drawing region 326. The same part (on the left side in a horizontal direction) of the image drawn in the image drawing region 322 of the loop region 311 is drawn in the image drawing region 327. As in the loop region 311, back-border regions 336 and 337 are disposed in the borders of the image drawing regions 326 and 327 of the pasting region 312. Here, the pasting region 312 is set to have a size equal to or larger than the extraction region (for example, the extraction range 350 enlarged in FIGS. 16A and 16B to FIGS. 18A and 18B).

Exemplary Image Indicating Contents

FIG. 6 is a schematic diagram illustrating images indicating the contents stored in the memory unit 200 according to the first embodiment of the invention. Images 400 to 410 shown in FIG. 6 are screen nail images or thumbnail images contained in the still screen file recorded by the imaging apparatus 100, for example. In FIG. 6, only simplified images are shown in the rectangles corresponding to the images 400 to 410 for easy description. In FIG. 6, the images 400 and 410 are arranged in parallel in chronological order on the basis of the temporal information (time of taking the photograph) recorded in association with the images 400 and 410.

Exemplary Scroll Display by Flick Operation

Figure 7A:
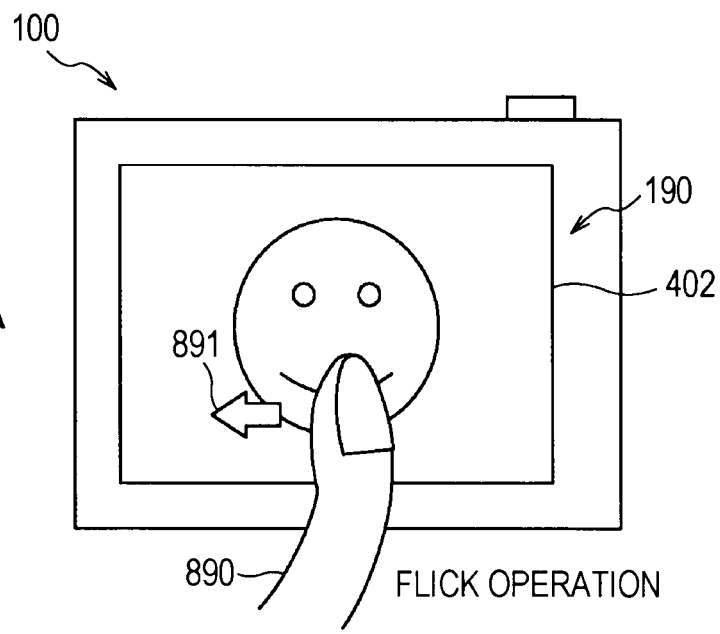
FIGS. 7A and 7B are diagrams illustrating a display example where a display state of images displayed on an input/output panel is changed by a flick operation according to the first embodiment of the invention.
Figure 7B:
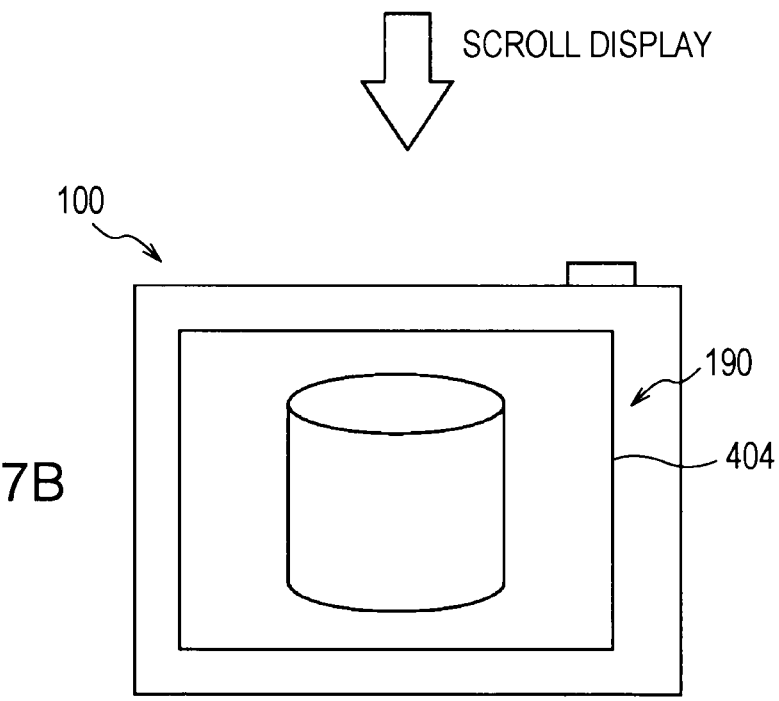

FIGS. 7A and 7B are diagrams illustrating a display example where the display state of an image displayed on the input/output panel 190 is changed by a flick operation according to the first embodiment of the invention. In FIG. 7A, an exemplary display state is shown before the change. In FIG. 7B, an exemplary display state is shown after the change. In this example, when a user flicks the image with a finger 890 in the display state (a state where an image 402 is displayed on the input/output panel 190) shown in FIG. 7A, the image is scroll-displayed. After the images are scroll-displayed by the flick operation, a display state (a state where an image 404 is displayed on the input/output panel 190) shown in FIG. 7B is displayed. Here, the flick operation refers to an operation of flicking an image with a finger in a desired direction and by a movement distance in the state where the finger comes into contact with the display surface of the input/output panel 190. Alternatively, the flick operation may be executed using an operation member such as a mouse.

For example, when the desired contents are selected and reproduced among the contents stored in the memory unit 200, the user displays a content selection image (for example, an index screen 730 shown in FIG. 37B) on the input/output panel 190. For example, a list of thumbnail images used to select the contents stored in the memory unit 200 is shown on the content selection screen. By selecting the thumbnail image shown in the list, the content corresponding to the selected thumbnail image can be reproduced. Here, an instruction operation to display the content selection screen and the selection operation of selecting the thumbnail image may be executed on the input/output panel 190 by a touch operation or may be executed by an operation input from the operation unit 180. In this way, by selecting the thumbnail image, the image 402 may be displayed on the input/output panel 190, as shown in FIG. 7A.

Moreover, in the state where the image 402 is displayed on the input/output panel 190, the user flicks the image with the finger 890 in the direction of an arrow 891 on the display surface of the input/output panel 190, as in FIG. 7A. The flick operation is executed in the operation direction and by the operation amount to display the image 404. In this way, when the flick operation is executed, the display state of the input/output panel 190 is changed from the image 402 to the image 404 and thus the images 402 to 404 are scroll-displayed through animation. After the scroll display, the image 404 is displayed on the input/output panel 190, as in FIG. 7B. The change from the image 402 to the image 404 on the input/output panel 190 is described in detail with reference to FIGS. 8A and 8B and FIGS. 9A and 9B.

FIGS. 8A and 8B and FIGS. 9A and 9B are schematic diagrams illustrating a drawing method of drawing the images in the image memory 300 by the drawing unit 141 and a display method of displaying the images drawn in the image memory 300 by the display controller 142 according to the first embodiment of the invention. The example shown in FIGS. 8A and 8B and FIGS. 9A and 9B corresponds to the example shown in FIGS. 7A and 7B. In the example, the display state of the image 402 on the input/output panel 190 is changed to the display state of the image 404 on the input/output panel 190 by the flick operation of the user.

Figure 8A:
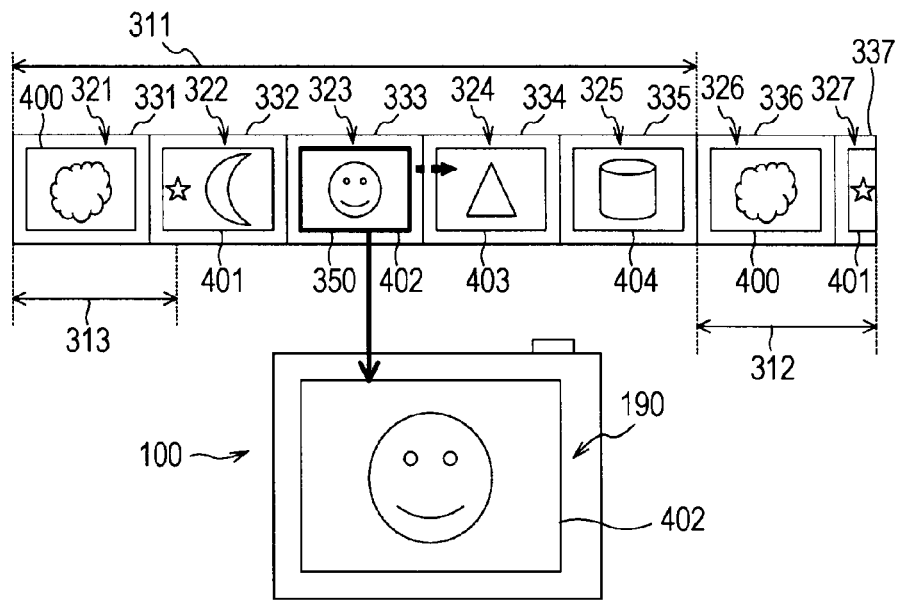
FIGS. 8A and 8B are schematic diagrams illustrating a drawing method of drawing images in an image memory by a drawing unit and a display method of displaying the images drawn in the image memory by a display controller according to the first embodiment of the invention.

FIG. 8A schematically shows a relationship between the drawing state of the image memory 300 and the display state of the input/output panel 190 when the image 402 is displayed on the input/output panel 190.

For example, when the user operates an instruction to display a desired image on the input/output panel 190, the drawing unit 141 acquires the content corresponding to the display target image (the reference image) from the memory unit 200. The drawing unit 141 draws the screen nail image contained in the acquired contents in the image memory 300. The drawing unit 141 draws the reference image and also acquires two contents located before the content corresponding to the reference image and continuing from the content on the time axis from the memory unit 200. In addition, the drawing unit 141 acquires two contents located after the content corresponding to the reference image and continuing from the content on the time axis from the memory unit 200. The drawing unit 141 draws the screen nail images contained in the acquired contents in the image memory 300.

Specifically, as shown in FIG. 8A, the drawing unit 141 draws the image 402 as the reference image in the image drawing region 323 of the loop region 311. The drawing unit 141 draws the image 401 corresponding to the content, which is located before the content corresponding to the reference image (the image 402) and is adjacent to the content corresponding to the reference image on the time axis, in the image drawing region 322. The drawing unit 141 draws the image 400 corresponding to the content, which is located before the content corresponding to the reference image and is adjacent to the content corresponding to the image 401 on the time axis, in the image drawing region 321. The drawing unit 141 draws the image 403 corresponding to the content, which is located after the content corresponding to the reference image (the image 402) and is adjacent to the content corresponding to the reference image on the time axis, in the image drawing region 324. The drawing unit 141 draws the image 404 corresponding to the content, which is located after the content corresponding to the reference image and is adjacent to the content corresponding to the image 403 on the time axis, in the image drawing region 325.

That is, the drawing unit 141 draws the images 400 to 404 in the image drawing regions 321 to 325 of the loop region 311 in parallel in chronological order.

The drawing unit 141 draws the same image as the image drawn in the image drawing region 321 of the loop region 311 in the image drawing region 326 of the pasting region 312. The drawing unit 141 draws the same image as a part of the image drawn in the image drawing region 322 of the loop region 311 in the image drawing region 327 of the pasting region 312. That is, the same image as the image drawn in the pasting synchronous region 313 of the loop region 311 is drawn in the pasting region 312. Specifically, as shown in FIG. 8A, the drawing unit 141 draws an image 400 in the image drawing region 326 of the pasting region 312 and draws the part of the image 401 in the image drawing region 327 of the pasting region 312.

In the following drawings, the extraction range 350 (indicated by a thick line rectangle) is added to the image displayed on the input/output panel 190 among the images drawn in the image memory 300. That is, in the example shown in FIG. 8A, the image 402 (the image drawn in the image drawing region 323) contained in the extraction range 350 is displayed on the input/output panel 190. In the following drawings, the black-border regions 331 to 337 are picked out in white to facilitate explanation.

Figure 8B:
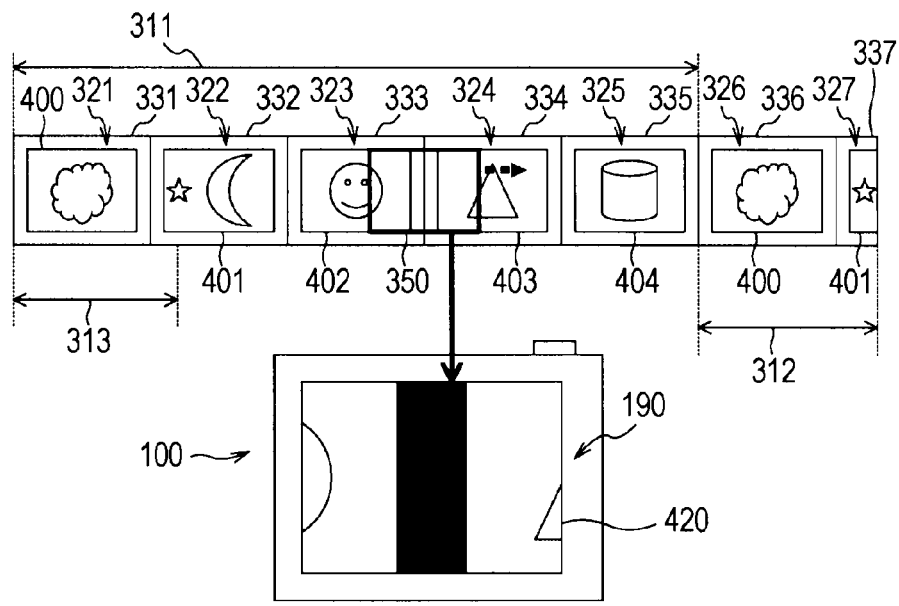
Figure 9A:
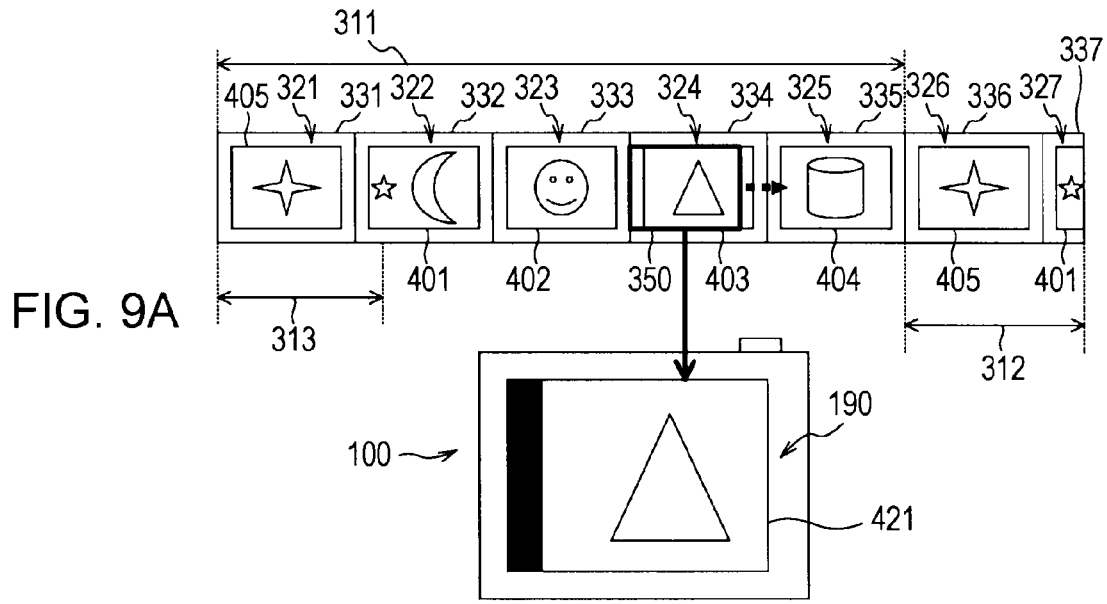
FIGS. 9A and 9B are schematic diagrams illustrating a drawing method of drawing images in the image memory by the drawing unit and a display method of displaying the images drawn in the image memory by the display controller according to the first embodiment of the invention.

FIGS. 8B and 9A schematically show a relationship between the drawing state of the image memory 300 and the display state of the input/output panel 190, when the display state of the input/output panel 190 is changed from the image 402 to the image 404 by the flicking operation.

It is assumed that the user executes the flock operation to change the display state of the input/output panel 190 from the image 402 to the image 404 when the image 402 is displayed on the input/output panel 190, as in FIG. 7A. In this case, as shown in FIGS. 8B and 9A, the display controller 142 sequentially displays the images falling within the extraction range 350 on the input/output panel 190, while moving the extraction range 350 in a direction from the image 402 to the image 404. In this way, by sequentially displaying the images falling within the extraction range 350 on the input/output panel 190, the images 402 to 404 are scroll-displayed through animation. The extraction range 350 may be moved at a uniform speed or may be moved at a speed changed in accordance with the flick operation. As shown in FIGS. 8B and 9A, the portions corresponding to the black-border regions 331 to 337 falling within the extraction range 350 are displayed as the black border images on the input/output panel 190.

When it is determined that the extraction range 350 satisfying the regular condition is moved, the drawing unit 141 draws a new image drawn near the reference image as the reference image. For example, as shown in FIG. 9A, the reference image can be changed from the image 402 to the image 403 under the condition that the extraction range 350 becomes distant from the position (the image drawing region 323 on which the image 402 is drawn) and the black-border region 333 around the position upon executing the flick operation. Alternatively, the reference image may be changed to the image near the reference image under the condition that all of the images near the reference image fall within the extraction range 350. Alternatively, the reference image may be changed to the image near the reference image under the condition that a constant ratio among the images near the reference image falls within the extraction range 350.

For example, as in FIG. 9A, when the extraction range 350 is moved to the image 403 drawn near the image 402 displayed on the input/output panel 190 upon executing the flick operation, the image 403 is newly drawn as the reference image by the drawing unit 141. Specifically, the images corresponding to four contents, which are located on either side of the content corresponding to the image 403 (the reference image) drawn in the image drawing region 324 of the loop region 311 and continue from the content corresponding to the reference image on the time axis, are drawing target images. That is, the images 401 and 402 located before the image 403 on the time axis and the images 404 and 405 located after the image 403 on the time axis are the drawing target images. Since the images 401 to 404 are drawn in the image memory 300 beforehand, as shown in FIG. 8A, the drawing unit 141 draws only the image 405 after the movement of the extraction range 350 to the image 403.

Here, the five image drawing regions 321 to 325 are present in the loop region 311. Therefore, when the reference image is not the image drawn in the image drawing region 323 located at the middle of the five image drawing regions, two images may not be arranged on either side of the reference image. Here, when the reference image is not the image drawn in the image drawing region 323, the reference image and four images to be arranged on either side of the reference image are arranged and drawn in a ring (cycle) form in chronological order. For example, since the image 403 is the image drawn in the image drawing region 324, two images on either side of the image 403 may not be arranged and drawn in the loop region 311. The image 404 is drawn in the image drawing region 325 adjacent to the image 403 on the right side. The image 405 is drawn in the image drawing region 321 located in the other end of the loop region 311. That is, the drawing unit 141 draws the image 405 in the image drawing region 321 of the loop region 311 and also draws the image 405 in the image drawing region 326 of the pasting region 312.

Figure 9B:
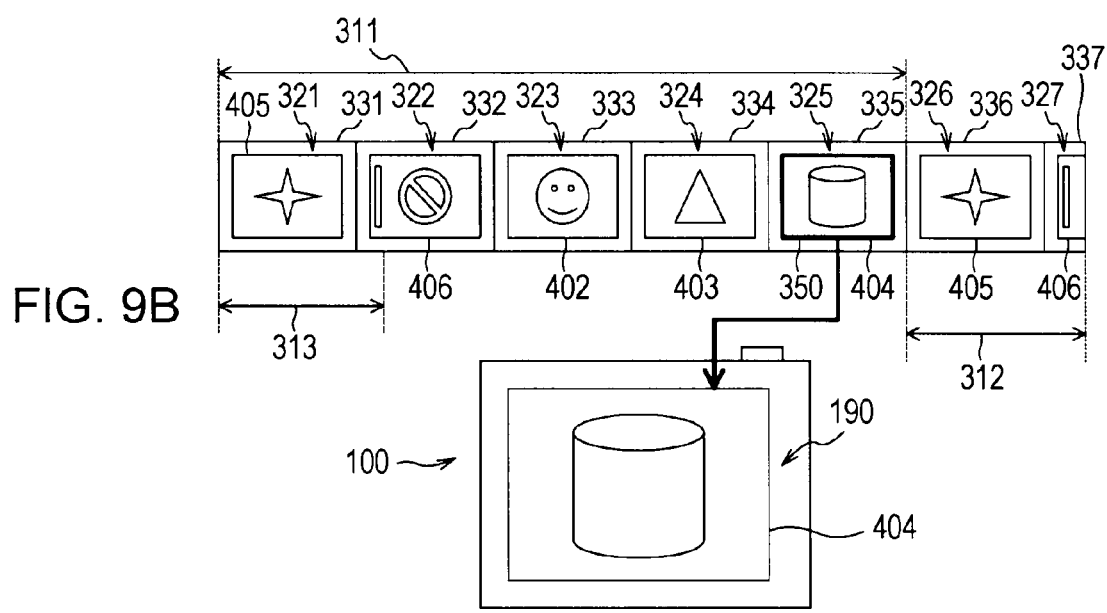

Subsequently, as shown in FIG. 9B, the extraction range 350 is moved to the image 404, which is the display target image by the flick operation, and the image 404 falling within the selection range 350 is displayed on the input/output panel 190. As shown in FIG. 9B, when the extraction range 350 is moved to the image 404, the drawing unit 141 newly draws the image 404 as the reference image. Specifically, the images corresponding to four contents, which are located on either side of the content corresponding to the image 404 (the reference image) drawn in the image drawing region 325 of the loop region 311 and continue from the content corresponding to the reference image on the time axis, are the drawing target images. That is, the images 402 and 403 corresponding to the contents located before the image 404 on the time axis and the image 405 and an image 406 corresponding to the contents located after the image 404 on the time axis are the drawing target images. Since the images 402 to 405 are drawn in the image memory 300 beforehand, as in FIG. 9A, the drawing unit 141 newly draws only the image 406 after the movement of the extraction range 350 to the image 404. In this case, as described above, the reference image and the other four images are arranged and drawn in the ring form in chronological order. That is, in the loop region 311, the image 406 is drawn in the image drawing region 322 located on the opposite side of the image drawing region 325 in which the image 404 is drawn. The drawing unit 141 draws the image 406 in the image drawing region 322 of the loop region 311 and also draws a part of the image 406 in the image drawing region 327 of the pasting region 312.

Next, an example will be described in which the display state of the input/output panel 190 is changed from the image 404 to the image 406 by the flick operation.

Figure 10A:
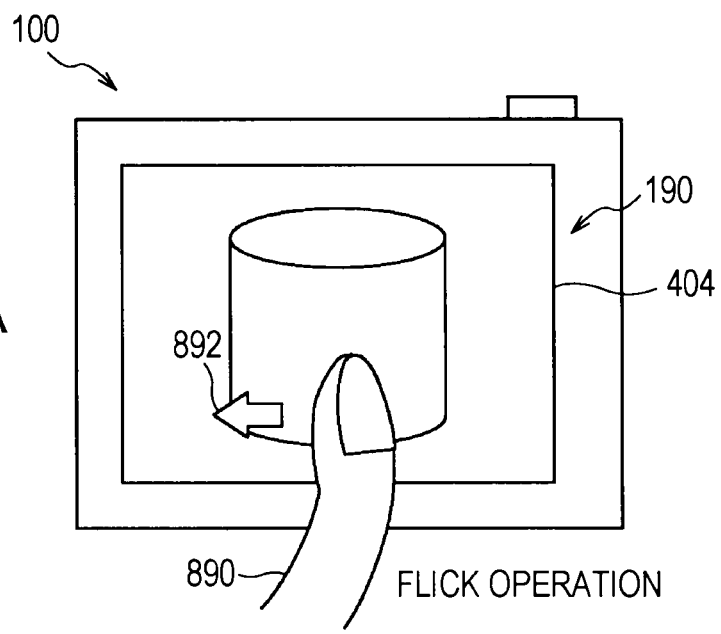
FIGS. 10A and 10B are diagrams illustrating a display example where a display state of images displayed on the input/output panel is changed by a flick operation according to the first embodiment of the invention.
Figure 10B:
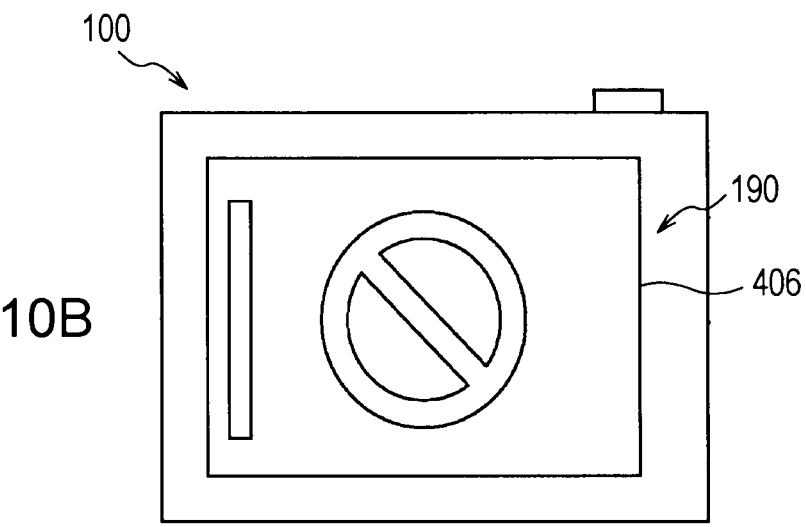

FIGS. 10A and 10B are diagrams illustrating a display example where a display state of images displayed on the input/output panel 190 is changed by a flick operation according to the first embodiment of the invention. FIG. 10A shows an example of the display state before the change and FIG. 10B shows an example of the display state after the change. In this example, the user executes the flick operation with the finger 890 in the display state (state where the image 404 is displayed on the input/output panel 190) shown in FIG. 10A to scroll-display the images. In this example, the display state (state where the image 406 is displayed on the input/output panel 190) shown in FIG. 10B is shown after the images are scroll-displayed by the flick operation.

For example, the user execute the flick operation with the finger 890 on the display surface of the input/output panel 190 in a direction of the arrow 892 in the state where the image 404 is displayed on the input/output panel 190, as shown in FIG. 10A. The flick operation is executed in the operation direction and by an operation amount to display the image 406. In this way, when the flick operation is executed, the display state of the input/output panel 190 is changed from the image 404 to the image 406 and thus the images 404 to 406 are scroll-displayed through animation. After the scroll display, the image 406 is displayed on the input/output panel 190, as shown in FIG. 10B. The change from the image 404 to the image 406 on the input/output panel 190 will be described in detail with reference to FIGS. 11A and 11B to FIGS. 13A and 13B.

FIGS. 11A and 11B to FIGS. 13A and 13B are schematic diagrams illustrating a drawing method of drawing the images in the image memory 300 by the drawing unit 141 and a display method of drawing the images drawn in the image memory 300 by the display controller 142 according to the first embodiment of the invention. The example shown in FIGS. 11A and 11B to FIGS. 13A and 13B corresponds to the example shown in FIGS. 10A and 10B. In the example, the display state of the image 404 on the input/output panel 190 is changed to the display state of the image 406 on the input/output panel 190 by the flick operation of the user.

Figure 11A:
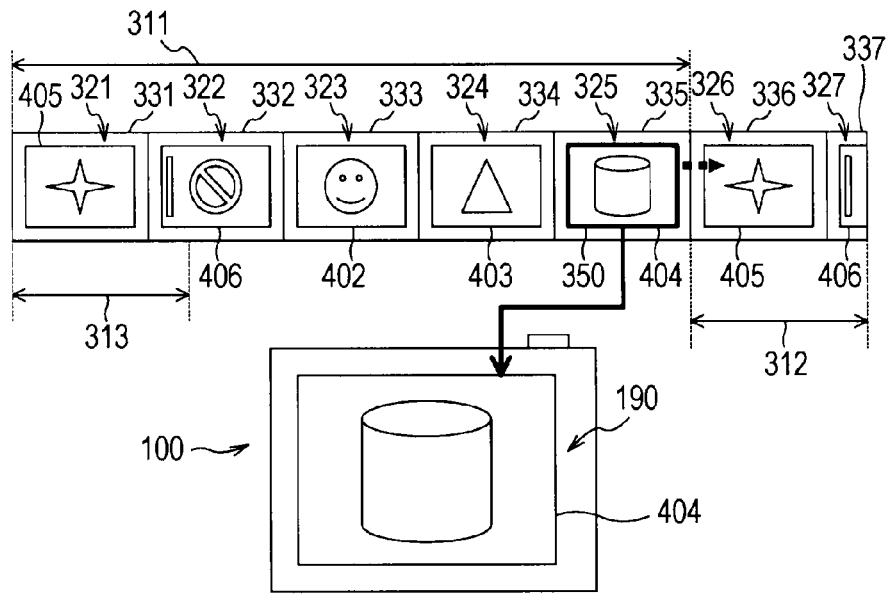
FIGS. 11A and 11B are schematic diagrams illustrating a drawing method of drawing images in the image memory by the drawing unit and a display method of displaying the images drawn in the image memory by the display controller according to the first embodiment of the invention.

FIG. 11A schematically shows a relationship between the drawing state of the image memory 300 and the display state of the input/output panel 190 when the image 404 is displayed on the input/output panel 190. In the display state shown in FIG. 11A, the image 404 is displayed on the input/output panel 190 by the flick operation, as in FIGS. 7A and 7B to FIGS. 9A and 9B. Since the display state shown in FIG. 11A is the same as that shown in FIG. 9B, the detailed description is omitted.

FIGS. 11B to 13A schematically show a relationship between the drawing state of the image memory 300 and the display state of the input/output panel 190, when the display state of the input/output panel 190 is changed from the image 404 to the image 406 on the input/output panel 190 by the flick operation.

Figure 11B:
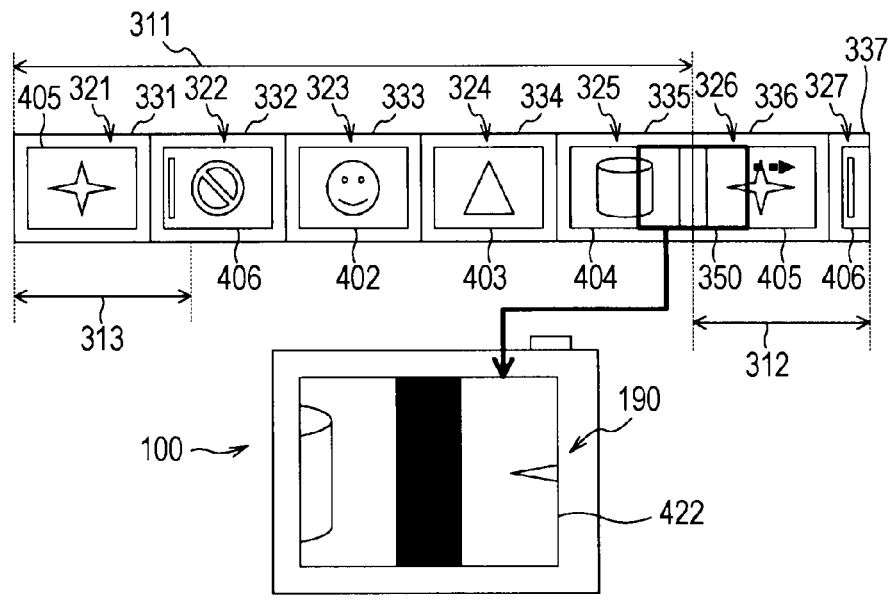
Figure 12A:
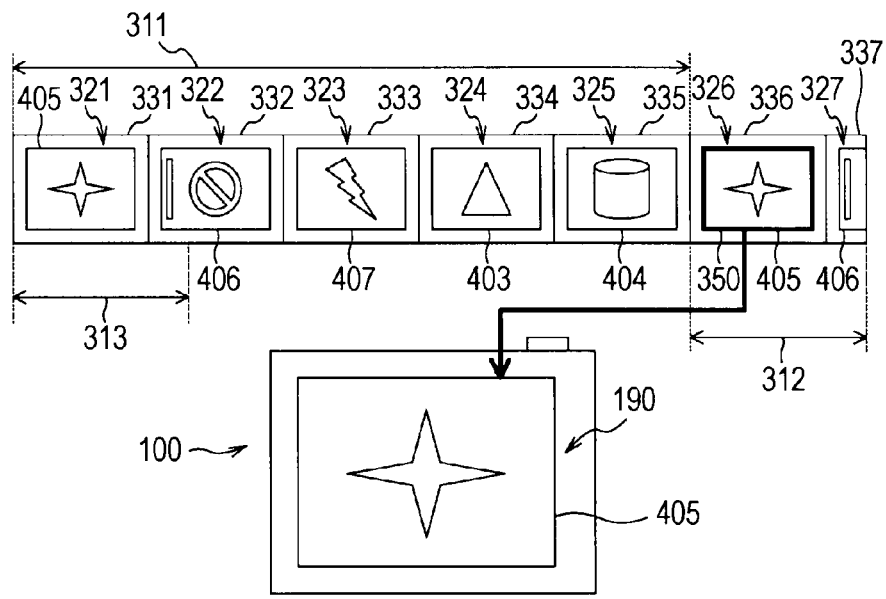
FIGS. 12A and 12B are schematic diagrams illustrating a drawing method of drawing images in the image memory by the drawing unit and a display method of displaying the images drawn in the image memory by the display controller according to the first embodiment of the invention.
Figure 12B:
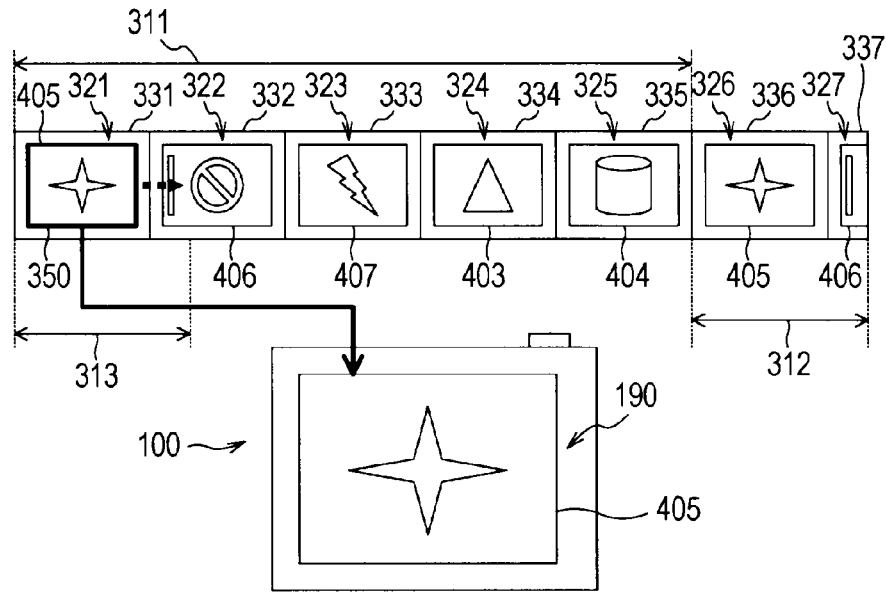

As shown in FIG. 10A, it is assumed that the user executes the flick operation to change the display state of the input/output panel 190 from the image 404 to the image 406 when the image 402 is displayed on the input/output panel 190. In this case, as shown in FIGS. 11B and 12A, the display controller 142 sequentially displays the images falling within the extraction range 350 on the input/output panel 190, while moving the extraction range 350 in a direction from the image 404 to the image 405. Here, the image drawing region 325 where the image 404 is drawn is located at an end of the loop region 311. The image 405 adjacent to the image 404 is drawn in the image drawing region 321 located at the other end of the loop region 311. Therefore, when the extraction range 350 in the loop region 311 is moved from the image 404 to the image 405, it is necessary to move the extraction range 350 from one end (the image drawing region 325) of the loop region 311 to the other end (the image drawing region 321) of the loop region 311. In the first embodiment of the invention, the same image as the image drawn in the pasting synchronous region 313 of the loop region 311 is drawn in the pasting region 312. When the extraction range 350 in the loop region 311 is moved from the image 404 to the image 405, as in FIGS. 11B and 12A, the extraction range 350 is moved to the image drawing region 326 where the image 405 is drawn in the pasting region 312. As shown in FIG. 12B, the extraction range 350 is moved to the image drawing region 321 where the image 405 is drawn in the loop region 311, after the movement. In this way, when the scroll display is executed from the image 404 to the image 405, animation display may be appropriately executed. On the contrary, when the scroll display is executed from the image 405 to the image 404, the extraction range 350 is moved to the image drawing region 321 of the pasting synchronous region 313 and then the extraction range 350 is moved to the image drawing region 326 of the pasting region 312.

As shown in FIGS. 12A and 12B, the extraction range 350 is moved in succession to the image 405 of the pasting region 312 and the pasting synchronous region 313, and the image 405 falling within the extraction range 350 is displayed on the input/output panel 190. When the extraction range 350 is moved to the image 405, the image 405 is newly drawn as the reference image by the drawing unit 141. Specifically, the images corresponding to four contents, which are located on either side of the content corresponding to the image 405 (the reference image) drawn in the image drawing region 321 of the loop region 311 and continue from the content corresponding to the reference image on the time axis, become the drawing target images. That is, the images 403 and 404 corresponding to the contents located before the image 405 on the time axis and the images 406 and 407 corresponding to the contents located after the image 405 on the time axis become the drawing target images. In this case, the reference image and the other four images are arranged and drawn in the ring form in chronological order. That is, the image 407 is drawn in the image drawing region 323 in the loop region 311.

Figure 13A:
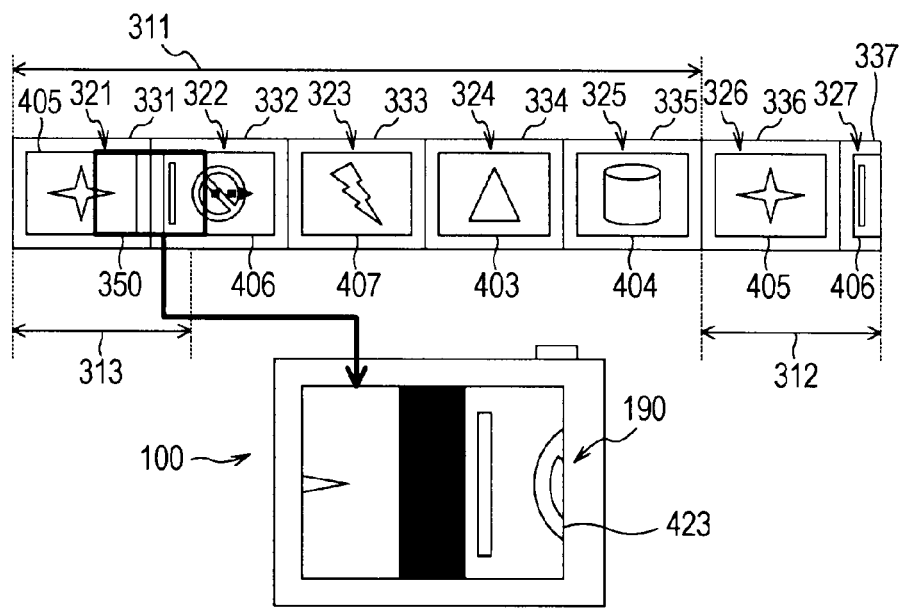
FIGS. 13A and 13B are schematic diagrams illustrating a drawing method of drawing images in the image memory by the drawing unit and a display method of displaying the images drawn in the image memory by the display controller according to the first embodiment of the invention.

Subsequently, as shown in FIG. 13A, the extraction range 350 is moved from the image 405 to the image 406 and an image 423 (a part of the image 405, a part of the image 406, and the black border) falling within the extraction range 350 is displayed on the input/output panel 190.

Figure 13B:
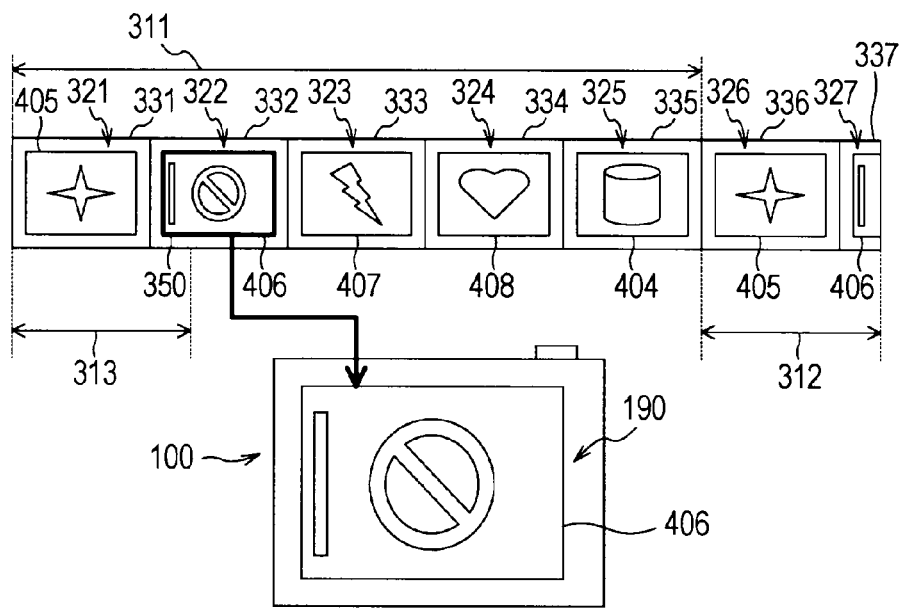

Subsequently, as shown in FIG. 13B, the extraction range 350 is moved to the image 406, which is the display target image, by the flick operation and the image 406 falling within the extraction range 350 is displayed on the input/output panel 190. When the extraction range 350 is moved to the image 406, as in FIG. 13B, the image 406 is newly drawn as the reference image by the drawing unit 141. Specifically, the images corresponding to four contents, which are located on either side of the content corresponding to the image 406 (the reference image) drawn in the image drawing region 322 of the loop region 311 and continue from the content corresponding to the reference image on the time axis, become the drawing target images. That is, the images 404 and 405 corresponding to the contents located before the image 406 on the time axis and the images 407 and 408 corresponding to the contents located after the image 406 on the time axis become the drawing target images. In this case, as described above, the reference image and the other four images are arranged and drawn in the ring form in chronological order. That is, the image 408 is drawn in the image drawing region 324 in the loop region 311.

Exemplary Scroll Display by Long-Contacting and Image Sending Operation

Next, an example will be described in which the display state of the input/output panel 190 is changed from the image 402 to the image 406 by a long-contacting and image sending operation.

Figure 14A:
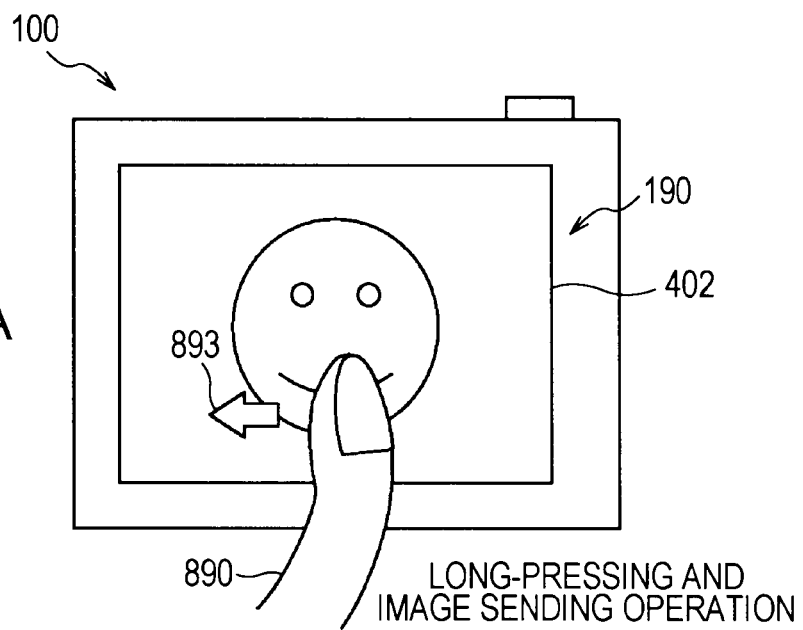
FIGS. 14A and 14B are diagrams illustrating a display example where a display state of images displayed on the input/output panel is changed by a long-contacting and image sending operation according to the first embodiment of the invention.
Figure 14B:
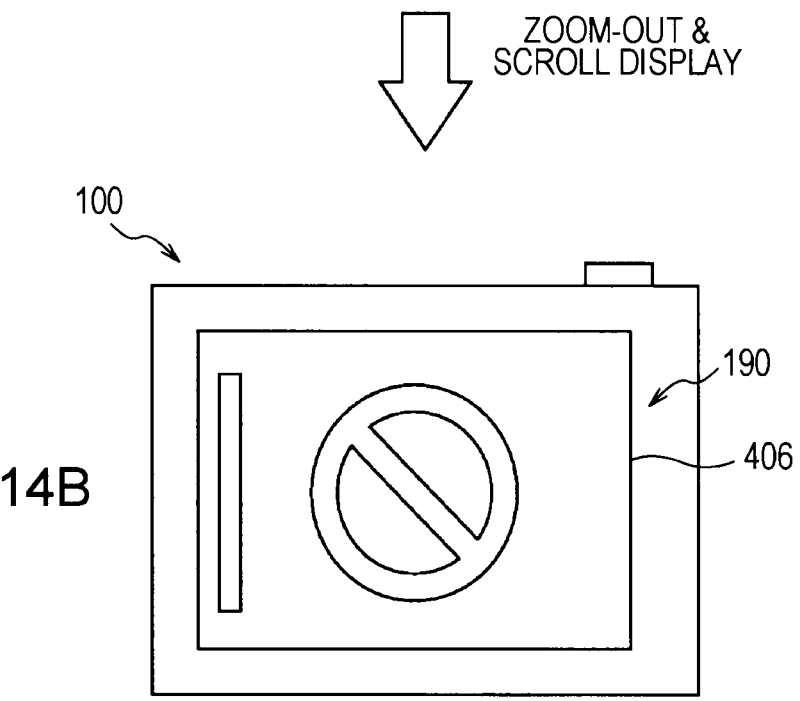

FIGS. 14A and 14B are diagrams illustrating a display example where the display state of images displayed on the input/output panel 190 is changed by the long-contacting and image sending operation according to the first embodiment of the invention. FIG. 14A shows an example of the display state before the change and FIG. 14B shows an example of the display state after the change. In this example, the user executes the long-contacting and image sending operation with the finger 890 in the display state (state where the image 402 is displayed on the input/output panel 190) shown in FIG. 14A to scroll-display the images. After the images are scroll-displayed by the long-contacting and image sending operation, the display state (state where the image 406 is displayed on the input/output panel 190) shown in FIG. 14B is shown. Here, the long-contacting and image sending operation refers to an operation of slightly moving a finger in a desired direction in a state where the finger comes into contact with the display surface of the input/output panel 190 and detaching the finger from the display surface of the input/output panel 190 when a desired image is displayed on the display surface after keeping the finger in contact with the display surface. Alternatively, the long-contacting and image sending operation may be executed using an operation member such as a mouse.

For example, in the state where the image 402 is displayed on the input/output panel 190, as shown in FIG. 14A, the user executes the long-contacting and image sending operation in a direction of an arrow 893 with the finger 890 on the display surface of the input/output panel 190. The long-contacting and image sending operation is executed in the operation direction in which the image 406 is displayed. When the long-contacting and image sending operation is executed in this way, the display state of the input/output panel 190 is changed from the image 402 to the image 406 and is scroll-displayed through animation. Upon executing the scroll display, the image 402 to the image 406 are reduced and displayed. The user detaches the finger 890 from the display surface of the input/output panel 190 at a predetermined time (time at which the image 406 is displayed). Then, after the scroll display, the image 406 is displayed on the input/output panel 190, as shown in FIG. 14B. The change from the image 402 to the image 406 on the input/output panel 190 will be described in detail with reference to FIGS. 15A and 15B to FIGS. 19A and 19B.

FIGS. 15A and 15B to FIGS. 19A and 19B are schematic diagrams illustrating a drawing method of drawing the images in the image memory 300 by the drawing unit 141 and a display method of drawing the images drawn in the image memory 300 by the display controller 142 according to the first embodiment of the invention. The example shown in FIGS. 15A and 15B to FIGS. 19A and 19B corresponds to the example shown in FIGS. 14A and 14B. In the example, the display state of the image 402 on the input/output panel 190 is changed to the display state of the image 406 on the input/output panel 190 by the long-contacting and image sending operation of the user.

FIG. 15A schematically shows a relationship between the drawing state of the image memory 300 and the display state of the input/output panel 190 when the image 402 is displayed on the input/output panel 190. Since the example shown in FIG. 15A is the same as the example shown in FIG. 8A, the description is omitted.

FIGS. 15B to 19A schematically show a relationship between the drawing state of the image memory 300 and the display state of the input/output panel 190, when the display state of the input/output panel 190 is changed from the image 402 to the image 406 by the long-contacting and image sending operation.

Figure 17A:
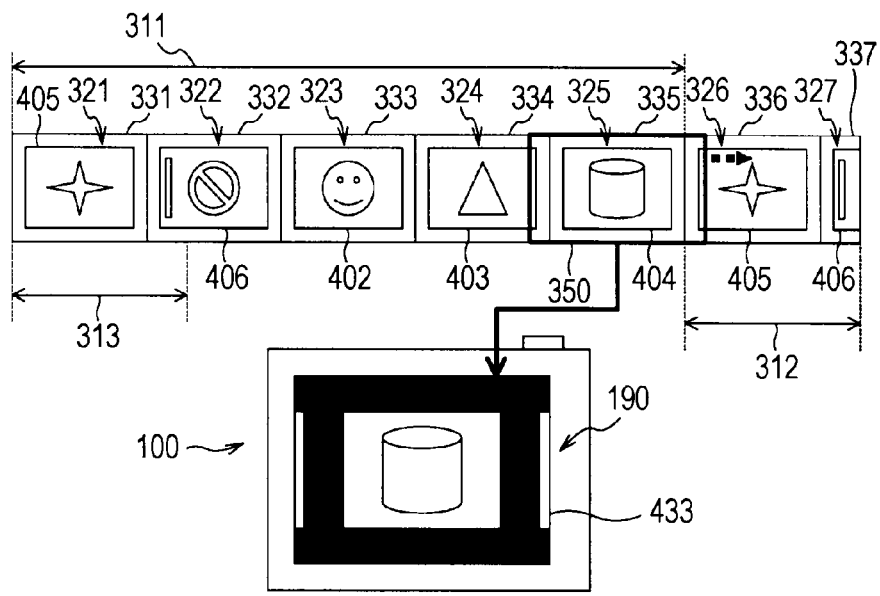
FIGS. 17A and 17B are schematic diagrams illustrating a drawing method of drawing images in the image memory by the drawing unit and a display method of displaying the images drawn in the image memory by the display controller according to the first embodiment of the invention.

As shown in FIG. 14A, it is assumed that the user executes the long-contacting and image sending operation to execute the scroll display in a direction from the image 402 to the image 406 when the image 402 is displayed on the input/output panel 190. In this case, as shown in FIG. 15B, the display controller 142 moves the extraction range 350 in the direction from the image 402 to the image 403 and also sequentially displays the images falling within the extraction range 350 on the input/output panel 190, while enlarging the size of the extraction range 350. The process of enlarging the extraction range 350 continues until the extraction range 350 becomes a certain size. For example, as shown in FIG. 16A, the extraction range 350 is enlarged until the vertical length of a rectangular shape corresponding to the extraction range 350 becomes the same as the vertical length of the black-border regions 331 to 337. The horizontal length of the rectangular shape of the extraction range 350 may be configured so as to contain the maximum three images, for example, as shown in FIG. 17A. After the extraction range 350 is enlarged up to the given size, the extraction range 350 is not enlarged and the extraction range 350 is moved in the direction from the image 402 to the image 405. In this case, the images falling within the extraction range 350 are sequentially displayed on the input/output panel 190, the images are contracted from the image 402, and the images are scroll-displayed through animation. For example, as shown in FIGS. 15B to 19A, the images are contracted from the image 402, and the black border images corresponding to the black-border regions 331 to 337 are added to the borders of the contracted images. Therefore, the images 430 to 436 can be displayed like as photo films are scrolled. For example, the extraction range 350 may be moved at a constant speed or may be moved at a speed changed in accordance with the long-contacting and image sending operation. The extraction range 350 may be enlarged in succession at a constant amount or may be enlarged to an enlargement degree corresponding to the long-contacting and image sending operation. The rectangular shape specified by the image drawing regions 326 and 327 and the black-border regions 336 and 337 of the pasting region 312 is set to be larger than the rectangular shape of the enlarged extraction range 350. For example, the rectangular shape specified by each region of the pasting region 312 may be set to be the same as the rectangular shape of the enlarged extraction range 350.

Here, for example, when the reference image is changed by moving the extraction range 350, as in FIG. 16B, the image near the reference image may be changed to the reference image under the condition that the entire image (403) near the reference image (the image 402) falls within the extraction range 350. Alternatively, the reference image may be changed under the same condition as the case of the above-described flick operation.

When the entire image 403 falls within the extraction range 350 by moving the extraction range 350, as shown in FIG. 16B, the image 403 is newly drawn as the reference image by the drawing unit 141. For example, the drawing unit 141 draws the image 405 in the image drawing region 321 of the loop region 311 and also draws the image 405 in the image drawing region 326 of the pasting region 312.

Figure 17B:
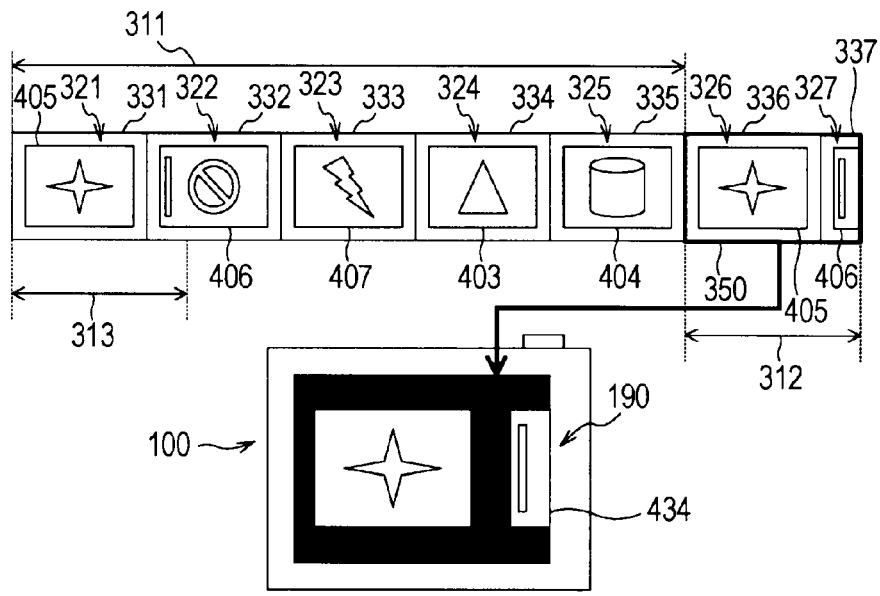
Figure 19A:
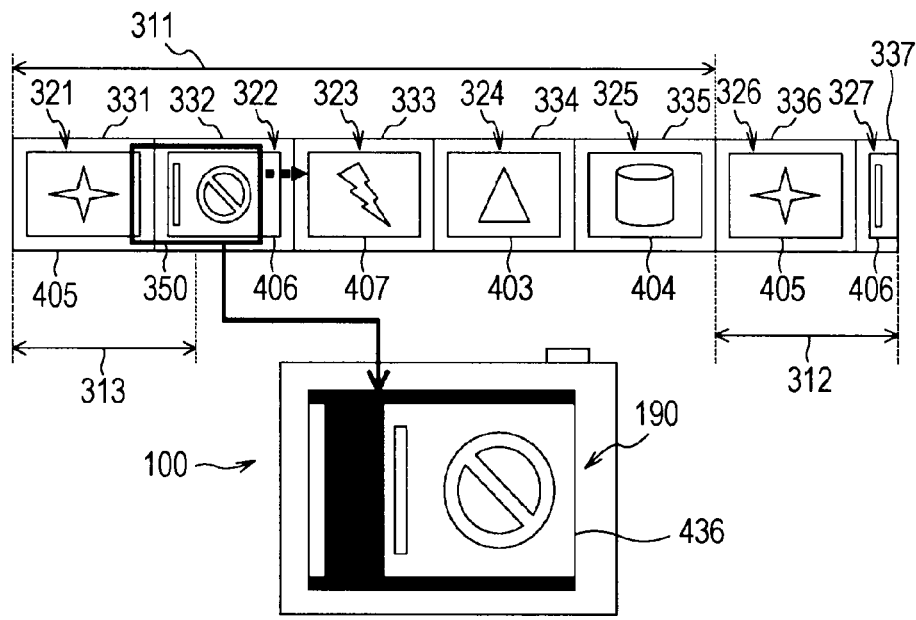
FIGS. 19A and 19B are schematic diagrams illustrating a drawing method of drawing images in the image memory by the drawing unit and a display method of displaying the images drawn in the image memory by the display controller according to the first embodiment of the invention.
Figure 19B:
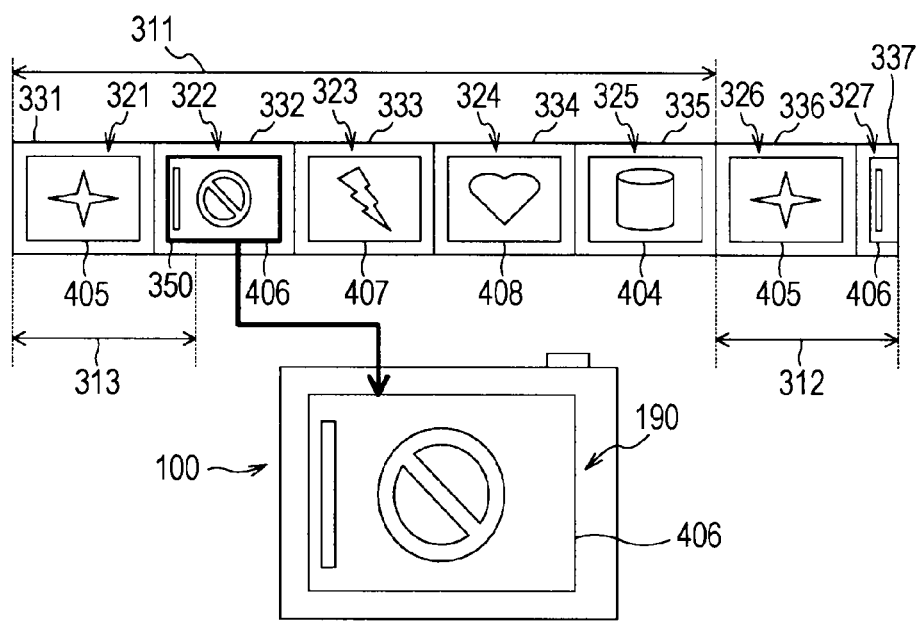

When the display controller 142 sequentially displays the images falling within the extraction range 350 on the input/output panel 190, while moving the extraction range 350 in the direction from the image 402 to the image 405, as shown in FIG. 17B, the extraction range 350 reaches the pasting region 312. When the extraction range 350 reaches the pasting region 312, as shown in FIG. 18A, the extraction range 350 is moved to the pasting synchronous region 313. In this way, when the scroll display is executed from the image 404 to the image 405, animation display can be appropriately executed. On the contrary, when the scroll display is executed in the opposite direction to the direction in the example shown in FIGS. 15A and 15B to FIGS. 19A and 19B, the extraction range 350 is moved to the pasting synchronous region 313 and then is moved to the pasting region 312.

When the long-contacting and image sending operation is ended by the user, the extraction range 350 is moved while contracting the size of the extraction range 350, and then the extraction range 350 is stopped at a time at which the long-contacting and image sending operation is ended. For example, the extraction range 350 may be stopped at the image drawing region passing after the long-contacting and image sending operation is ended. In addition, by detaching the finger from the display surface of the input/output panel 190, the long-contacting and the image sending operation is ended.

For example, it is assumed that the user ends the long-contacting and image sending operation after the extraction range 350 passes through the image drawing region 321. In this case, as in FIG. 19A, the display controller 142 moves the extraction range 350 while contracting the size of the extraction range 350, and stops the extraction range 350 at the position of the image 406 drawn in the image drawing region 322. Here, the extraction range 350 is contracted until the size of the extraction range 350 becomes the same as the size (the size before the enlargement) of the rectangular shape corresponding to each image drawing region. In this way, when the user detaches the finger from the display surface of the input/output panel 190 at the predetermined time (time at which the image 406 is displayed), as in FIG. 19B, the image 406 is displayed on the input/output panel 190 after the scroll display.

Exemplary Scroll Display by Drag Operation

Next, an example will be described in which the display state of the input/output panel 190 is changed from the image 402 to the image 403 by a drag operation.

Figure 20A:
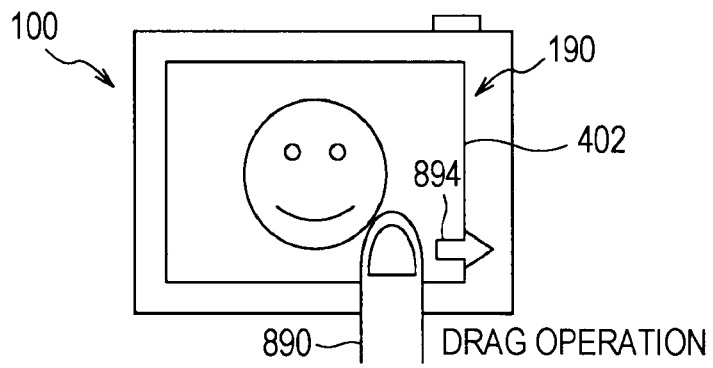
FIGS. 20A to 20D are diagrams illustrating a display example where the display state of the images displayed on the input/output panel is changed by a drag operation according to the first embodiment of the invention.
Figure 20B:
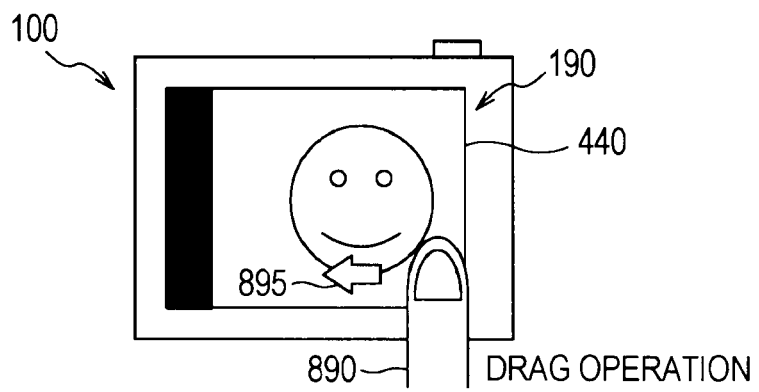
Figure 20C:
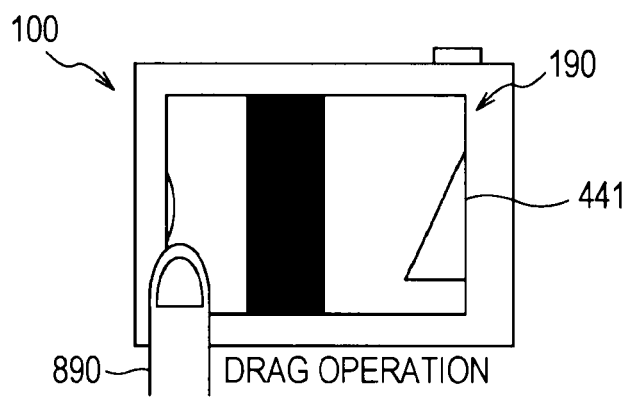
Figure 20D:
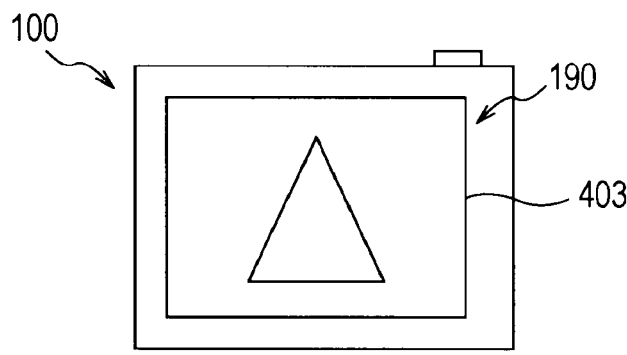

FIGS. 20A to 20D are diagrams illustrating a display example where the display state of the images displayed on the input/output panel 190 is changed by the drag operation according to the first embodiment of the invention. FIG. 20A shows an example of the display state before the change and FIG. 20B shows an example of the display state after the change. In this example, the user executes the drag operation with the finger 890 to scroll-display the images in the display state (state where the image 402 is displayed on the input/output panel 190) shown in FIG. 20A. In this example, after the image is scroll-displayed by the drag operation, the display state (state where the image 403 is displayed on the input/output panel 190) shown in FIG. 20D is shown. Here, the drag operation refers to an operation of sliding the finger in a desired direction and by a movement distance in the state where the finger comes into contact with the display surface of the input/output panel 190. For example, a target displayed on the display surface can be moved to a desired position by the drag operation. Alternatively, the drag operation may be executed using an operation member such as a mouse.

For example, the user executes the drag operation with the finger 890 in a direction of an arrow 894 on the display surface of the input/output panel 190 in the state where the image 402 is displayed on the input/output panel 190, as shown in FIG. 20A. The drag operation is slightly executed in the direction in which the image 401 is displayed. In this way, when the drag operation is executed, as in FIG. 20B, the image displayed on the input/output panel 190 is changed to an image 440 (the image containing a part of the image 402 and the black border image) and is scroll-displayed through animation. Then, the user executes the drag operation in a direction of an arrow 895 with the finger 890 on the input/output panel 190 in the state where the image 440 is displayed on the input/output panel 190, as shown in FIG. 20B. The drag operation is executed in the direction in which the image 403 is displayed. When the drag operation is executed in this manner, as in FIG. 20C, the display state of the input/output panel 190 is changed from the image 402 to the image 403 to be scroll-displayed through animation. When the user detaches the finger 890 from the display surface of the input/output panel 190 in the state shown in FIG. 20C, the image 403 is displayed on the input/output panel 190 after the scroll display, as in FIG. 20D. The change from the image 402 to the image 403 on the input/output panel 190 will be described in detail with reference to FIGS. 21A and 21B and FIGS. 22A and 22B.

FIGS. 21A and 21B and FIGS. 22A and 22B are schematic diagrams illustrating a drawing method of drawing images in the image memory 300 by the drawing unit 141 and a display method of displaying the images drawn in the image memory 300 by the display controller 142 according to the first embodiment of the invention. The example shown in FIGS.

Figure 22A:
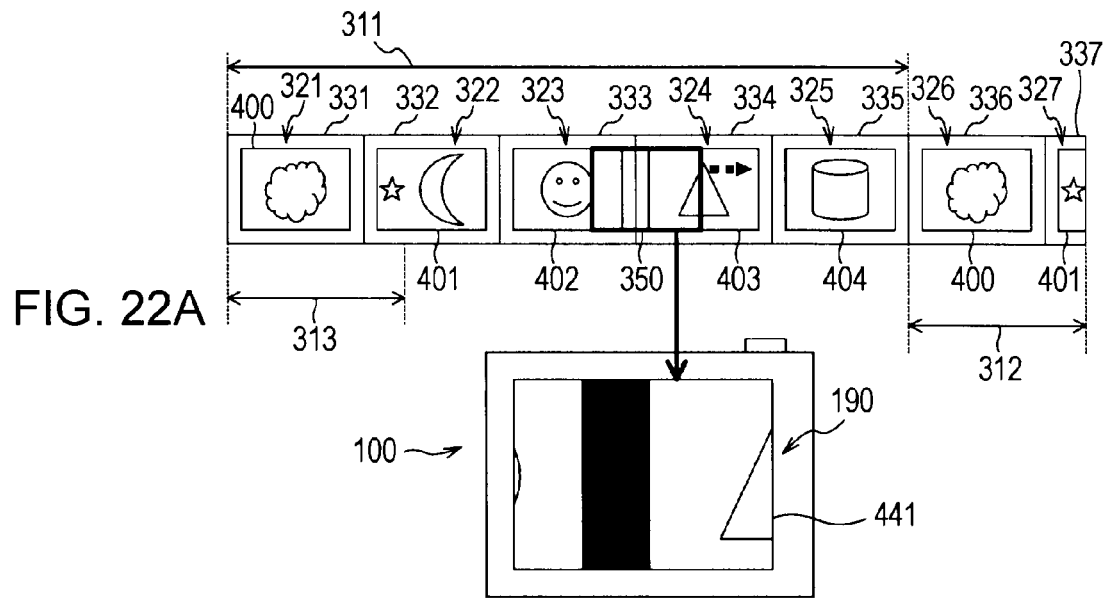
FIGS. 22A and 22B are schematic diagrams illustrating a drawing method of drawing images in the image memory by the drawing unit and a display method of displaying the images drawn in the image memory by the display controller according to the first embodiment of the invention.
Figure 22B:
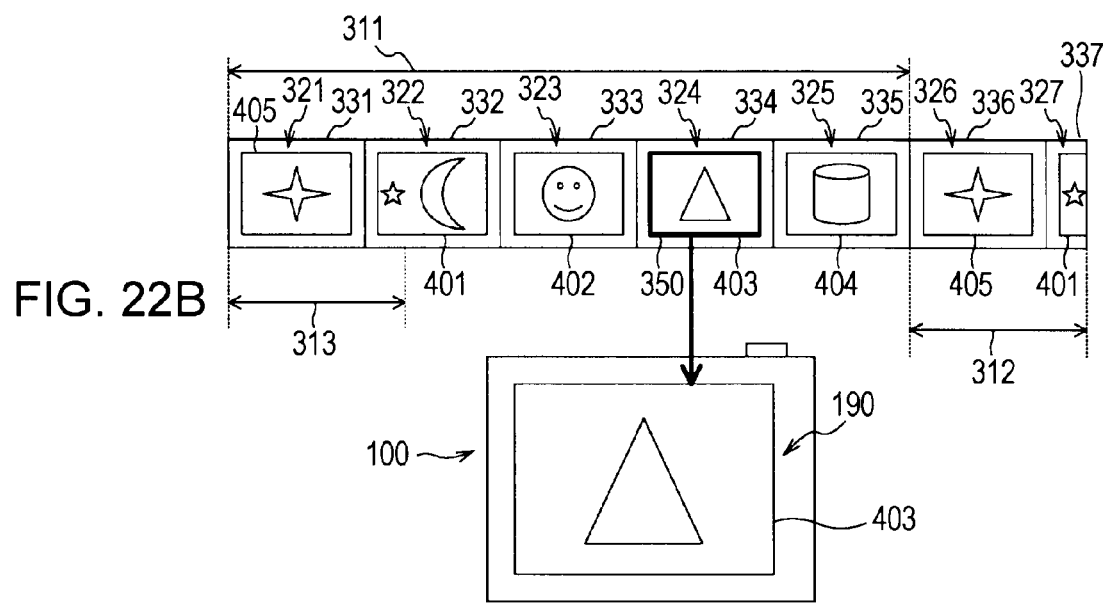

21A and 21B and FIGS. 22A and 22B correspond to the example shown in FIGS. 20A to 20D. In this example, the display state of the image 402 on the input/output panel 190 is changed to the display state of the image 403 on the input/output panel 190 by the drag operation of the user.

Figure 21A:
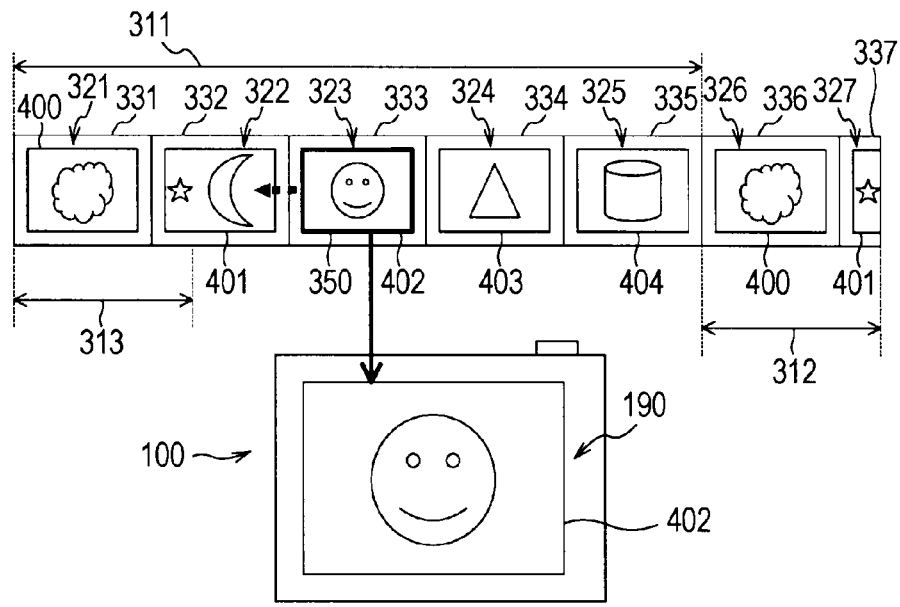
FIGS. 21A and 21B are schematic diagrams illustrating a drawing method of drawing images in the image memory by the drawing unit and a display method of displaying the images drawn in the image memory by the display controller according to the first embodiment of the invention.

FIG. 21A schematically shows a relationship between the drawing state of the image memory 300 and the display state of the input/output panel 190 when the image 402 is displayed on the input/output panel 190. Since the example shown in FIG. 21A is the same as the example shown in FIG. 8A, the description is omitted.

Figure 21B:
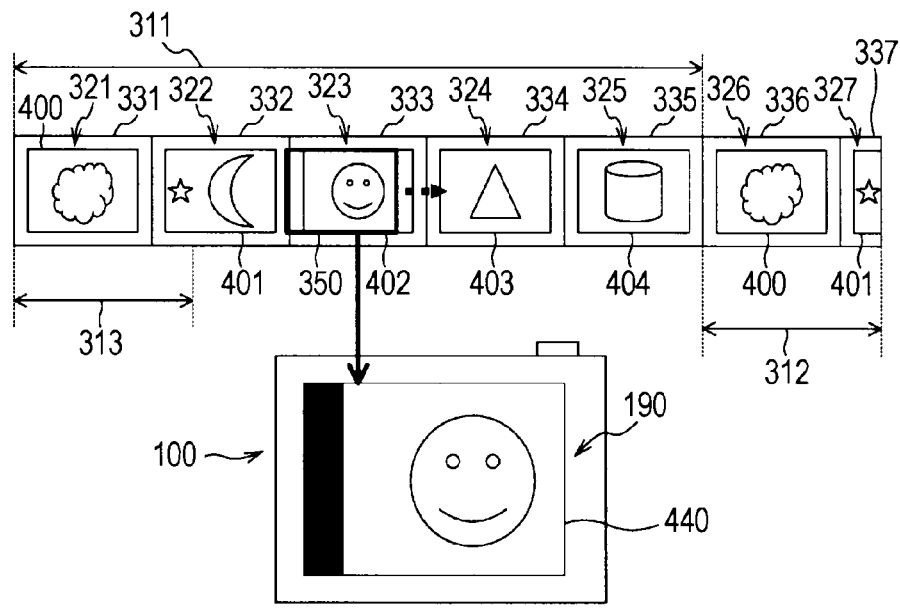

FIG. 21B schematically shows a relationship between the drawing state of the image memory 300 and the display state of the input/output panel 190, when the display state of the input/output panel 190 is changed from the image 402 to the image 401 on the input/output panel 190 by the drag operation.

As shown in FIG. 20A, it is assumed that the user executes the drag operation to execute the scroll display in a direction from the image 402 to the image 401 when the image 402 is displayed on the input/output panel 190. In this case, as shown in FIG. 21B, the display controller 142 sequentially displays the images falling within the extraction range 350 on the input/output panel 190, while moving the extraction range 350 in the direction from the image 402 to the image 401. The extraction range 350 can be moved in the movement direction and by the movement distance by the drag operation of the user, for example.

FIG. 22A schematically shows a relationship between the drawing state of the image memory 300 and the display state of the input/output panel 190, when the display state of the input/output panel 190 is changed from the image 402 to the image 403 by the drag operation.

As shown in FIG. 20B, it is assumed that the user executes the drag operation to execute the scroll display in the direction from the image 402 to the image 403 in the state where the image 440 is displayed on the input/output panel 190. In this case, as shown in FIG. 22A, the display controller 142 sequentially displays the images falling within the extraction range 350 on the input/output panel 190, while moving the extraction range 350 in a direction from the image 402 to the image 403.

Here, a determination criterion will be described which is used to change the image drawn near the reference image to the reference image when the extraction range 350 is moved by the drag operation. For example, when the drag operation is executed, as in FIGS. 20A to 20D, it is assumed that the vicinity of the boundary between the images is frequently moved in accordance with the movement of the user's finger. Therefore, in the first embodiment of the invention, the reference image is not changed during the drag operation, but the reference image is changed after the drag operation ends. That is, in the operations (for example, the flick operation, the long-contacting and image sending operation) except for the drag operation, a determination is executed when the reference image may be changed. However, the reference image is not changed during the drag operation. When the drag operation ends, as described above, the same determination as that in the operations except for the drag operation may be executed, and the reference image may be changed. In this way, by changing the reference image in the drag operation, it is possible to prevent the drawing process from occurring frequently, even when the extraction range 350 is frequently moved in the vicinity of the boundary between the images by the drag operation. Since the range in which the image is moved by a one-time operation of the user is restrictive in the drag operation, the reference image may be changed upon ending the drag operation to execute the scroll display appropriately and execute the drawing process. In this way, it is possible to reduce the load of the drawing process.

Since the range in which the image is moved by a one-time operation of the user is restrictive in the drag operation, as described above, the determination criterion may be eased in the process of changing the reference image, which is executed upon ending the drag operation, than in the operations except for the above-described drag operation. For example, when the half or more of the image near the reference image falls within the extraction range 350 upon ending the drag operation, the image near the reference image can be changed to the reference image.

For example, when the half or more of the image 403 near the reference image (the image 402) falls within the extraction range 350 upon ending the drag operation, as in FIG. 22A, the image 403 is newly drawn as the reference image by the drawing unit 141. For example, the drawing unit 141 draws the image 405 in the image drawing region 321 of the loop region 311 and also draws the image 405 in the image drawing region 326 of the pasting region 312. When a ratio in which the image 403 near the reference image (the image 402) falls within the extraction range 350 upon ending the drag operation is larger than a ration in which the image 402 falls within the extraction range 350, the image 403 may be newly drawn as the reference image by the drawing unit 141.

Since the range in which the image is moved by a one-time operation of the user is restrictive in the drag operation, as described above, it may be determined whether to display an image on the input/output panel 190 upon ending the drag operation. For example, when the reference image is changed upon ending the drag operation, the reference image may be displayed as a display target image on the input/output panel 190. When the reference image is not changed, the reference image may be displayed as a display target image on the input/output panel 190 upon starting the drag operation.

For example, when the image 403 is changed as the reference image upon ending the drag operation, as in FIG. 22B, the image 403 is displayed on the input/output panel 190.

In this example, the drag operation is executed only in the horizontal direction. However, the drag operation may be executed in a vertical direction, for example. When the drag operation is executed in the vertical direction, the black border image is displayed around the display target image.

Modified Example of Drawing Region of Display Target Image

Figure 23:
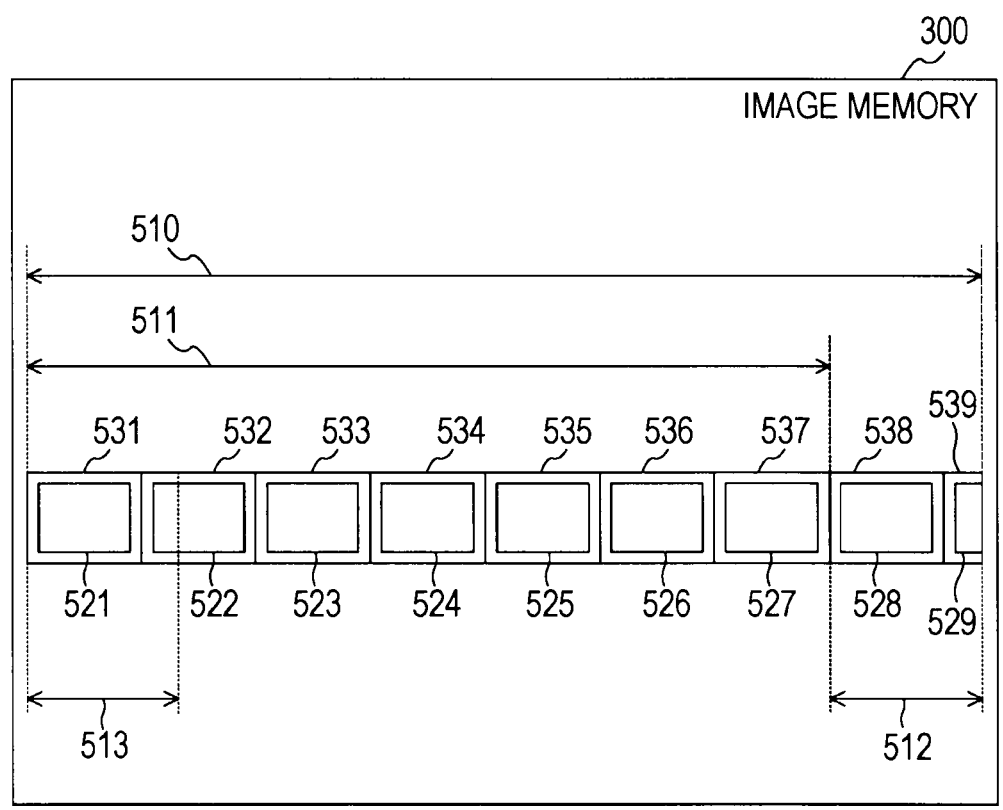
FIG. 23 is a schematic diagram illustrating a drawing region of a display target image in the image memory according to the first embodiment of the invention.

FIG. 23 is a schematic diagram illustrating a drawing region of a display target image in the image memory 300 according to the first embodiment of the invention. The example shown in FIG. 23 is a modified example of FIG. 5 and is the same as the example shown in FIG. 5 except that the number of image drawing regions and the number of the black-border regions in the loop region 311 are modified to five to seven. Hereinafter, the same description as that described with reference to FIG. 5 is partially omitted.

An effective region 510 includes a loop region 511 and a pasting region 512.

The loop region 511 is a region where there are drawn a display target image (reference image), the predetermined number of images located before the reference image along the time axis and continuing from the reference image, and the predetermined number of images located after the reference image along the time axis and continuing from the reference image. In the loop region 511, the images are drawn in image drawing regions 521 to 527, for example. Black-border regions 531 to 537 are disposed around the image drawing regions 521 to 527, respectively.

The pasting region 512 is a region where the same image as the image drawn in the pasting synchronous region 513 of the loop region 511 is drawn. Specifically, images are drawn in image drawing regions 528 and 529 of pasting region 512, for example. Black-border regions 538 and 539 are disposed around the image drawing regions 528 and 529, respectively.

Drawing Process by Flick Operation According to Comparative Example

FIGS. 24A to 24C and FIGS. 25A to 25C are schematic diagrams illustrating drawing methods of drawing images in the image memory 300 by the drawing unit 141 according to the first embodiment of the invention. FIGS. 24A to 24C and FIGS. 25A to 25C show examples of the drawing process in which the number of image drawing regions of the loop region is five and the number of image drawing regions of the loop region is seven according to a comparative example. Specifically, the display state is changed from the image 402 to the image 404 on the input/output panel 190 by the flick operation of the user, and then the display state is returned from the image 404 to the image 402 according to the comparative example.

Figure 24A:
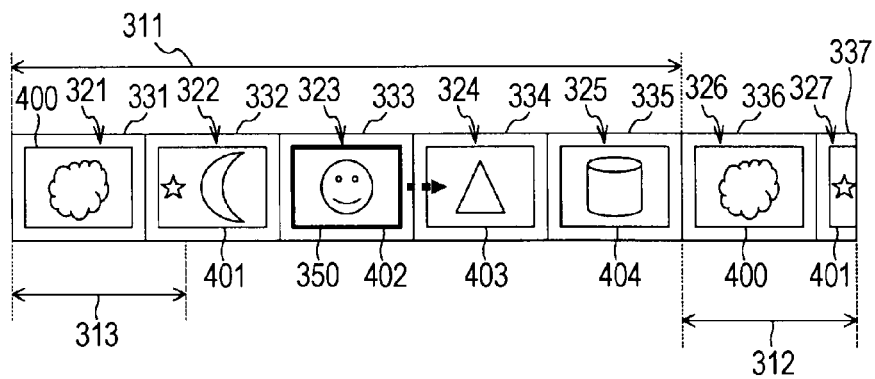
FIGS. 24A to 24C are schematic diagrams illustrating a drawing method of drawing images in the image memory by the drawing unit according to the first embodiment of the invention.
Figure 24B:
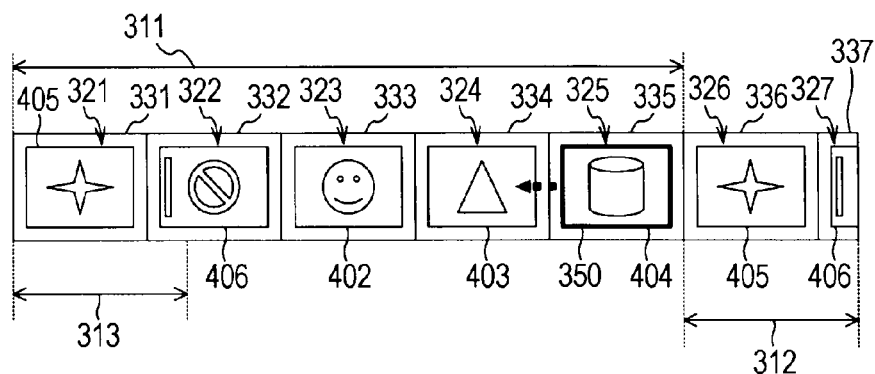
Figure 24C:
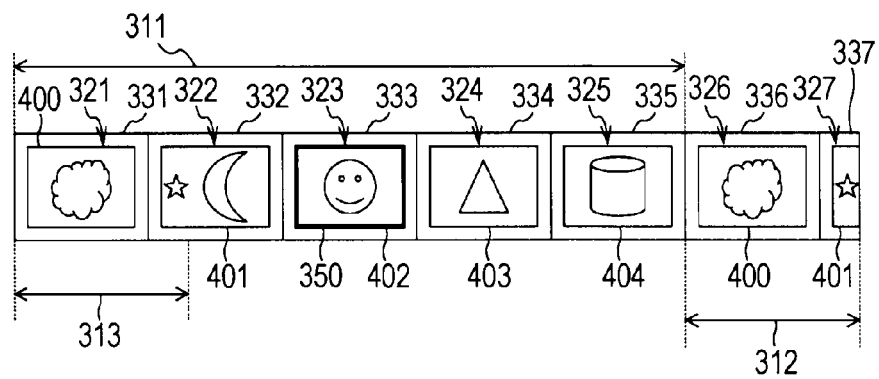

FIGS. 24A to 24C shows the example in which the effective region 310 is guaranteed as the drawing region of the display target image in the image memory 300, and the reference image and each two images continuing from the reference image are drawn, as shown in FIG. 5.

FIG. 24A schematically shows the drawing state of the image memory 300 when the image 402 is displayed on the input/output panel 190. Since the example shown in FIG. 24A is the same as the example shown in FIG. 8A, the description is omitted.

FIG. 24B schematically shows the drawing state of the image memory 300 when the display state of the input/output panel 190 is changed from the image 402 to the image 404 by the flick operation. Since the example in which the display state of the input/output panel 190 is changed from the image 402 to the image 404 is the same as the example shown in FIGS. 8A and 8B and FIGS. 9A and 9B, the detailed description is omitted.

When the display state of the input/output panel 190 is changed from the image 402 to the image 404, as shown in FIG. 24B, the images 405 and 406 are newly drawn in the image drawing regions 321 and 322 of the loop region 311. In addition, parts of the images 405 and 406 are newly drawn in the image drawing regions 326 and 327 of the pasting region 312, respectively.

FIG. 24C schematically shows the drawing state of the image memory 300 when the display state of the input/output panel 190 is changed from the image 404 to the image 402 by the flick operation.

When the display state of the input/output panel 190 is changed from the image 404 to the image 402, as in FIG. 24C, the images 400 and 401 are newly drawn in the image drawing regions 321 and 322 of the loop region 311. In addition, parts of the images 400 and 401 are newly drawn in the image drawing regions 326 and 327 of the pasting region 312. That is, this drawn state is the same as the drawn state shown in FIG. 24A.

When the number of image drawing regions of the loop region 311 is set to five and the reference image and each two images continuing from the reference image are drawn, it is necessary to execute the drawing process of drawing four images.

Figure 25A:
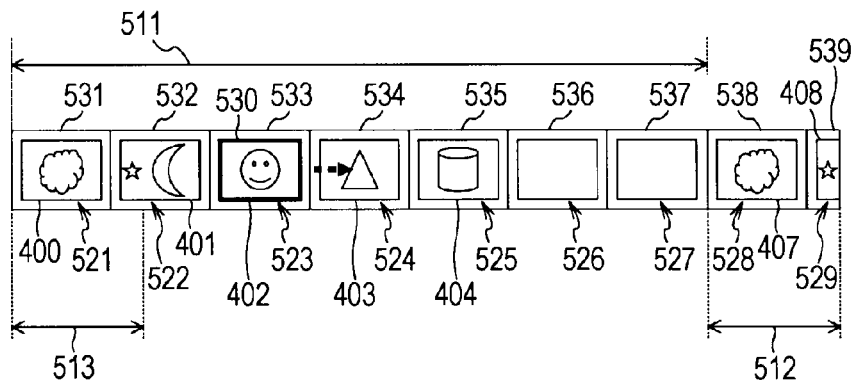
FIGS. 25A to 25C are schematic diagrams illustrating a drawing method of drawing images in the image memory by the drawing unit according to the first embodiment of the invention.
Figure 25B:
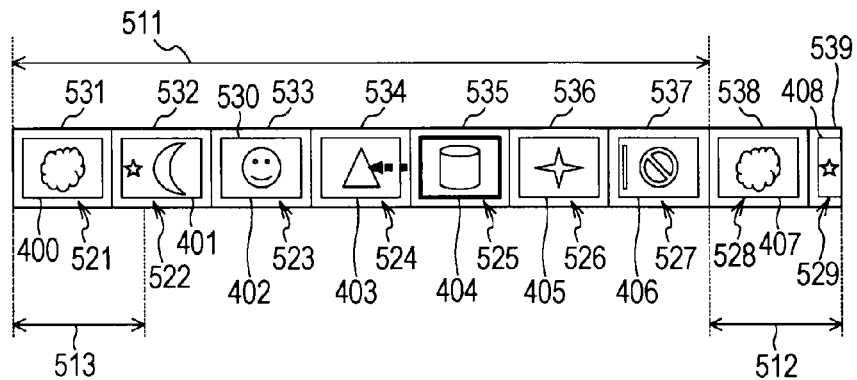
Figure 25C:
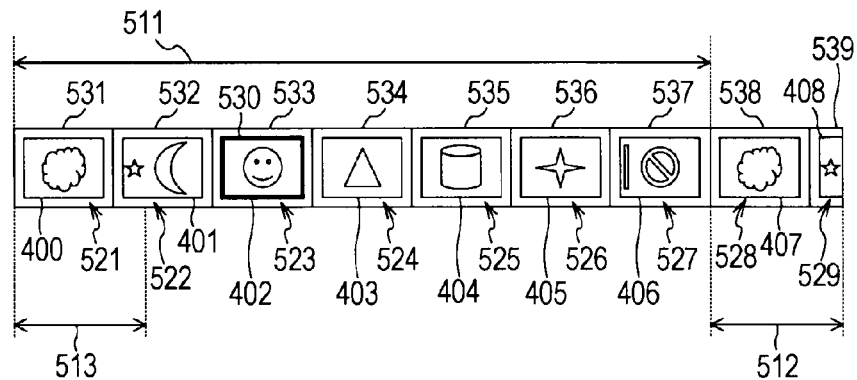

FIGS. 25A to 25C show the example in which the effective region 510 is guaranteed as the drawing region of the display target image in the image memory 300, and the reference image and each two images continuing from the reference image are drawn, as shown in FIG. 23.

FIG. 25A schematically shows the drawing state of the image memory 300 when the image 402 is displayed on the input/output panel 190. The example shown in FIG. 25A is nearly the same as the example shown in FIG. 8A except that the number of image drawing regions and the number of black-border regions are modified in the loop region 511. That is, two images 400 and 401 and two images 403 and 404 continuing from the reference image (the image 402) on both sides of the reference image are drawn. In addition, the same images as the images (the images 400 and 401) drawn in the pasting synchronous region 513 of the loop region 511 are drawn in the pasting region 512. Here, it is not necessary to drawn the images in the image drawing regions 526 and 527 of the loop region 511.

FIG. 25B schematically shows the drawing state of the image memory 300 when the display state of the input/output panel 190 is changed from the image 402 to the image 404 by the flick operation. When the display state of the input/output panel 190 is changed from the image 402 to the image 404, as in FIG. 25B, the two images 405 and 406 continuing from the reference image are drawn on the right side of the image 404 which newly becomes the reference image. In this way, since the number of image drawing regions of the loop region 511 is seven, it is not necessary to redraw the images 405 and 406, which are newly drawing target images, in the image drawing regions 521 and 522 of the loop region 511, unlike the example shown in FIG. 24B. That is, even when the reference image is changed to the image 404, the images 400 and 401 are drawn in the image drawing regions 521 and 522 of the loop region 511, respectively.

FIG. 25C schematically shows the drawing state of the image memory 300 when the display state of the input/output panel 190 is changed from the image 404 to the image 402 by the flick operation. When the display state of the input/output panel 190 is changed from the image 404 to the image 402, as in FIG. 25C, it is necessary to draw the two images 400 and 401 continuing from the reference image on the left side of the image 402, which newly becomes the reference image. Here, as described above, the images 400 and 401 are drawn in the image drawing regions 521 and 522 of the loop region 511, respectively. Therefore, it is not necessary to newly execute the drawing process on the images 401 and 402 which are the newly drawing target images. Even when the reference image is changed to the image 402, there is no image as the drawing target image in the image drawing regions 526 and 527 of the loop region 511 and thus the images 405 and 406 are drawn.

In this way, when the number of image drawing regions of the loop region 511 is set to seven and the reference image and two images continuing from the reference image are drawn, it is necessary to execute only the drawing process on the two images. Since the drawing process can be reduced as the number of image drawing regions of the loop region is guaranteed in the image memory 300, it is possible to reduce the load of the drawing process.

In the above example, the number of image drawing regions of the loop region is set to five or seven. However, it is desirable to set the number of image drawing regions of the loop region to about seventeen. In the above example, the same number of images continuing from the reference image is drawn by each operation. However, the number of images (near images), which are the drawing target images, continuing from the reference image may be modified depending on, for example, kinds of operations. For example, the number of near images is increased in order of the drag operation and the long-contacting and image sending operation, and the flick operation. For example, when the number of image drawing regions of the loop region is set to nine and the drag operation is executed, two images continuing from the reference image are drawn as the near images. For example, when the number of image drawing regions of the loop region is set to nine and the long-contacting and image sending operation is executed, three images continuing from the reference images are drawn as the near images. For example, when the number of image drawing regions of the loop region is set to nine and the flick operation is executed, four images continuing from the reference image are drawn as the near images. For example, when the drag operation or the long-contacting and image sending operation is executed, the number of near images on both sides of the reference image may be changed in accordance with the movement direction of the extraction range. For example, by increasing the number of near images drawn in the movement direction of the extraction range, the number of near images drawn in an opposite direction to the movement direction of the extraction range can be decreased.

Exemplary Operation of Imaging Apparatus

Figure 26:
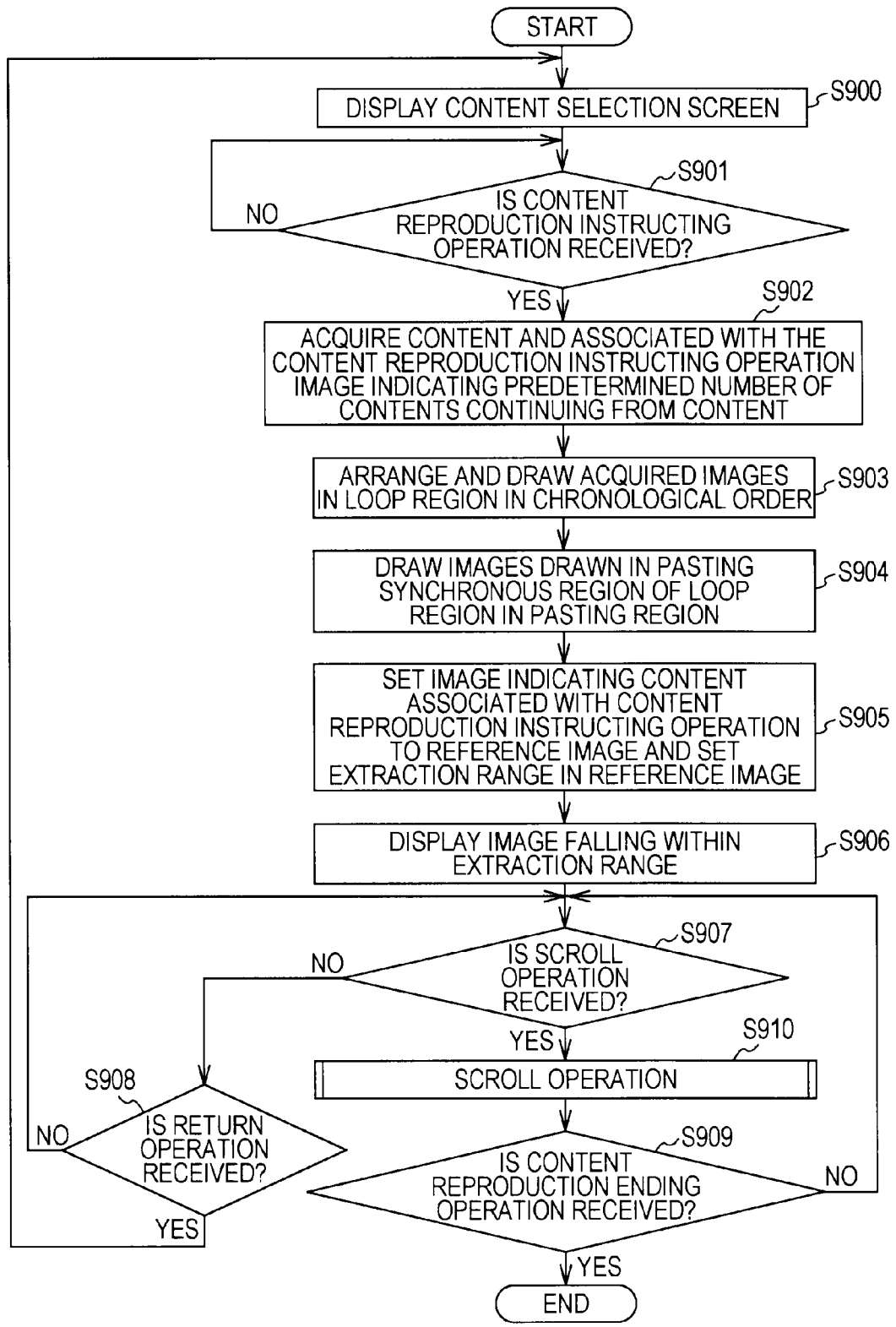
FIG. 26 is a flowchart illustrating a processing sequence of a content reproducing process by the imaging apparatus according to the first embodiment of the invention.

FIG. 26 is a flowchart illustrating a processing sequence of a content reproducing process by the imaging apparatus 100 according to the first embodiment of the invention.

Initially, a content selection screen (index screen) is displayed on the input/output panel 190 by an operation of the user (step S900). It is determined whether a content reproduction instructing operation is received to select a desired content (step S901). When the content reproduction instructing operation is not received, it is continuously detected until the content reproduction instructing operation is received. Alternatively, when the content reproduction instructing operation is received (step S901), the drawing unit 141 acquires a content associated with the content reproduction instructing operation and an image (image data) indicating the predetermined number of contents continuing from the content associated with the content reproduction instructing operation (step S902).

Subsequently, the drawing unit 141 arranges and draws the acquired images in the loop region of the image memory 300 in chronological order (step S903). Subsequently, the drawing unit 141 draws the same images as the images drawn in the pasting synchronous region of the loop region in the pasting region (step S904). Steps S903 and S904 are an example of a drawing sequence according to the embodiment of the invention. Subsequently, the display controller 142 sets the image indicating the content associated with the content reproduction instructing operation to the reference image and sets the extraction range in the reference image (step S905). Subsequently, the display controller 142 displays the image falling within the extraction range on the display panel 191 among the images drawn in the image memory 300 (step S906). Steps S905 and 906 are an example of a display control sequence according to the embodiment of the invention.

Subsequently, it is determined whether the scroll operation of the user on the image displayed on the display panel 191 is received (step S907). When the scroll operation is not received (step S907), it is determined whether a return operation of the user is received (step S908). When the return operation is not received (step S908), the process returns to step S907. Alternatively, when the return operation is received, the process returns to step S910.

Alternatively, when the scroll operation is received (step S907), the scroll operation is executed (step S910). The scroll operation is described in detail with reference to FIG. 27. Step S910 is an example of a control sequence according to the embodiment of the invention.

Subsequently, it is determined whether a content reproduction ending operation of the user is received (step S909). When the content reproduction ending operation is not received (step S909), the process returns to step S907. Alternatively, when the content reproduction ending operation is received, the content reproducing process is ended.

Figure 27:
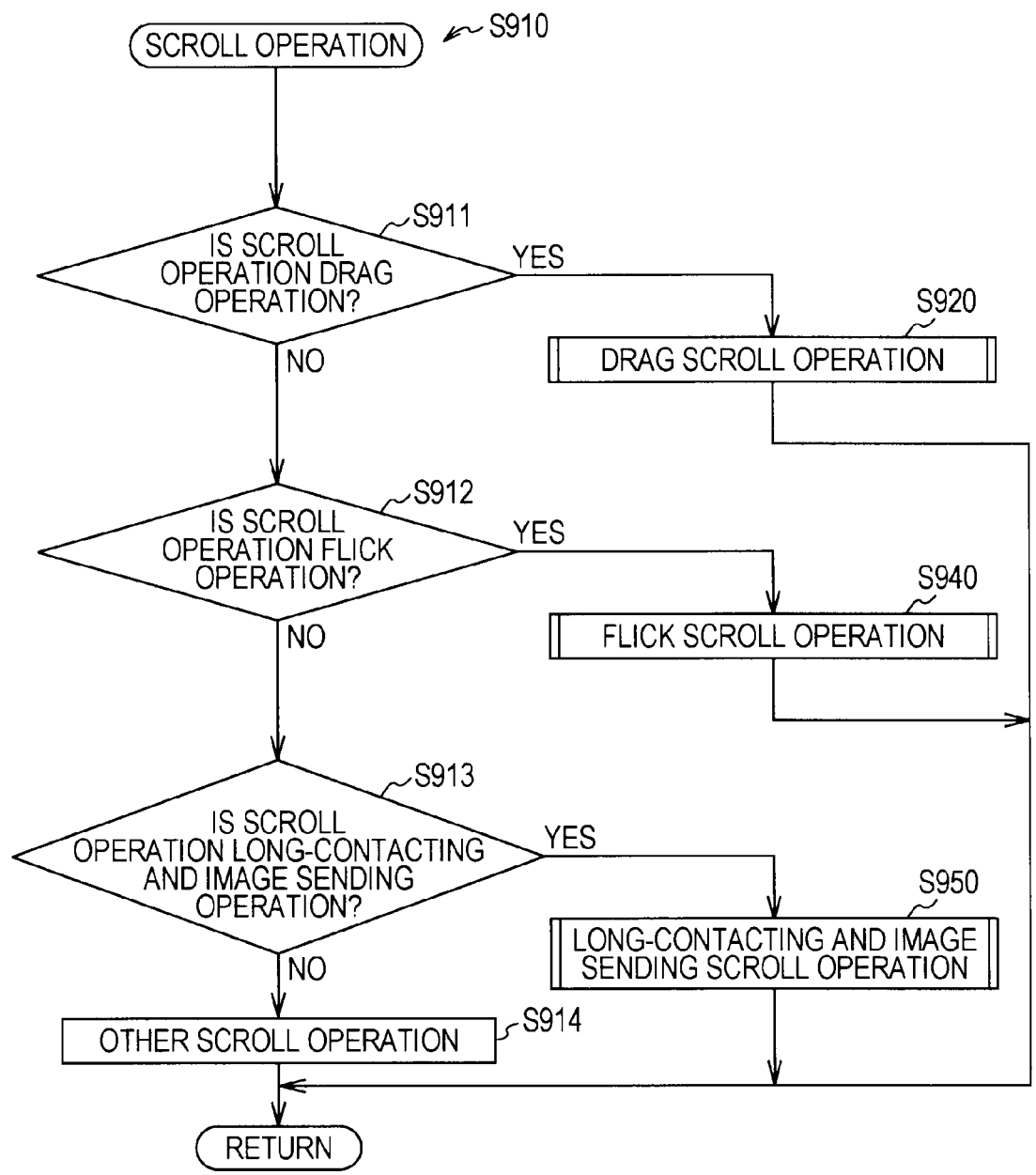
FIG. 27 is a flowchart illustrating a scroll operation in the processing sequence of the content reproducing process by the image apparatus according to the first embodiment of the invention.

FIG. 27 is a flowchart illustrating the scroll operation (the processing sequence of step S910 in FIG. 26) in the processing sequence of the content reproducing process by the imaging apparatus 100 according to the first embodiment of the invention.

Initially, it is determined whether the received scroll operation is a drag operation (step S911). When the received scroll operation is the drag operation (step S911), a drag scroll operation is executed (step S920). The drag scroll operation is described in detail with reference to FIG. 28.

Alternatively, when the received scroll operation is not the drag operation (step S911), it is determined whether the received scroll operation is a flick operation (step S912). When the received scroll operation is the flick operation (step S912), a flick scroll operation is executed (step S940). The flick scroll operation is described in detail with reference to FIG. 30.

Alternatively, when the received scroll operation is not the flick operation (step S912), it is determined whether the received scroll operation is a long-contacting and image sending operation (step S913). When the received scroll operation is the long-contacting and image sending operation (step S913), a long-contacting and image sending scroll operation is executed (step S950). The long-contacting and image sending scroll operation is described in detail with reference to FIG. 31.

Alternatively, when the received scroll operation is not the long-contacting and image sending operation (step S913), another scroll operation is executed in accordance with the received scroll operation (step S914).

Figure 28:
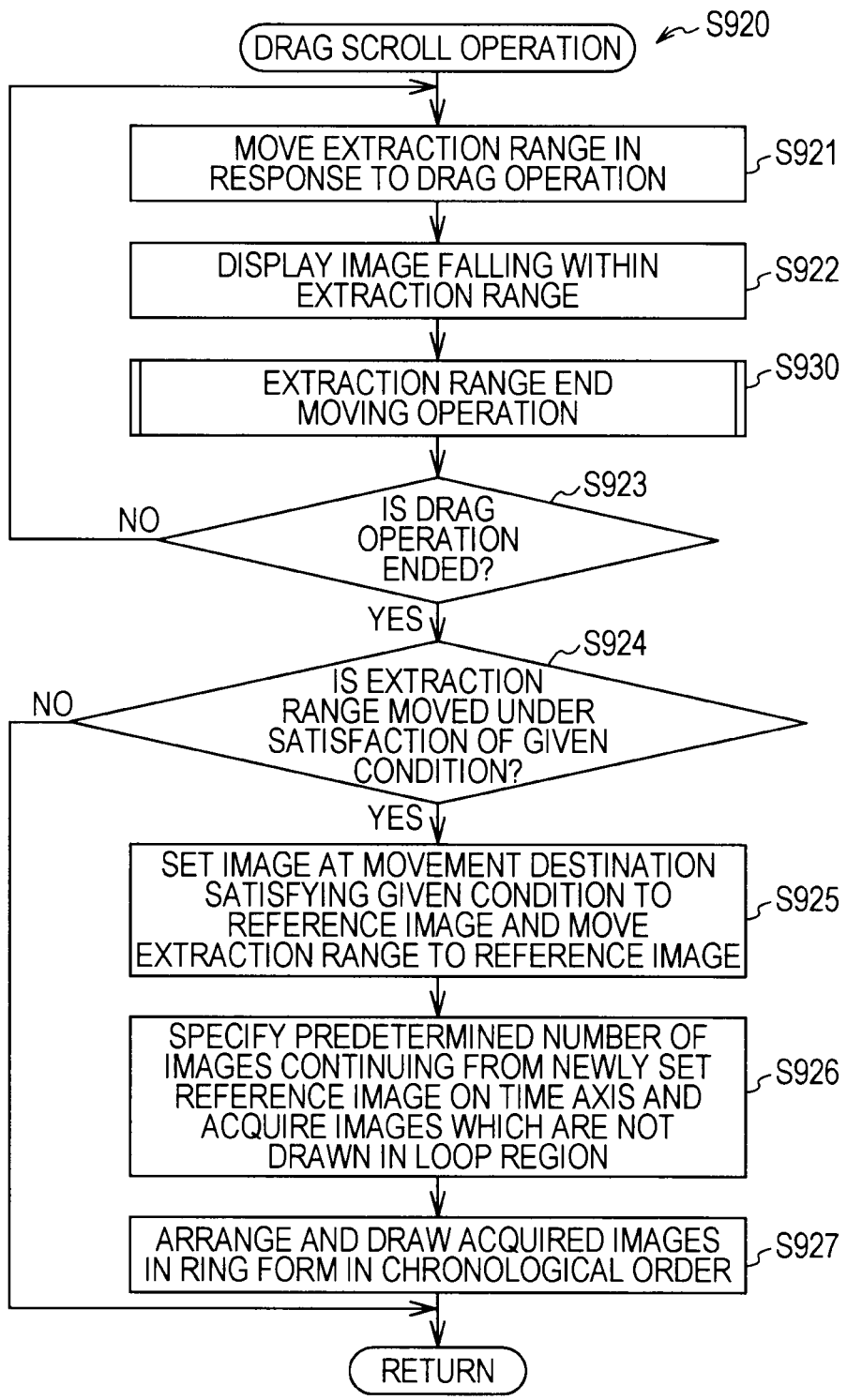
FIG. 28 is a flowchart illustrating a drag scroll operation in the processing sequence of the content reproducing process by the image apparatus according to the first embodiment of the invention.

FIG. 28 is a flowchart illustrating the drag scroll operation (the processing sequence of step S920 in FIG. 27) in the processing sequence of the content reproducing process by the image apparatus 100 according to the first embodiment of the invention.

Initially, the display controller 142 moves the extraction range in response to the drag operation (step S921) and displays the image falling within the moved extraction range on the display panel 191 among the images drawn in the image memory 300 (step S922). Subsequently, the display controller 142 executes an extraction range end moving operation (step S930). The extraction range end moving operation is described in detail with reference to FIG. 29.

Subsequently, it is determined whether the drag operation is ended (step S923). When the drag operation is not ended (step S923), the process returns to step S921. Alternatively, when the drag operation is ended (step S923), it is determined whether the extraction range is moved under the satisfaction of a given condition (step S924). When the extraction range is not moved under the satisfaction of a given condition (step S924), the drag scroll operation is ended.

When the extraction range is moved under the satisfaction of a given condition (step S924), the image at the movement destination satisfying the given condition is set to the reference image and the extraction range is moved to the reference image (step S925). The images falling in the extraction range are sequentially displayed on the display panel 191 in response to the movement. Subsequently, the newly set reference image and the predetermined number of images continuing from the reference image are specified, and drawing unit 141 acquires the images (image data) which are not drawn in the loop region in the image memory 300 (step S926).

Subsequently, the drawing unit 141 arranges and draws the acquired images in the loop region in the image memory 300 (step S927). In this case, when the images are drawn in the pasting synchronous region of the loop region, the same images as the drawn images are drawn in the pasting region.

Figure 29:
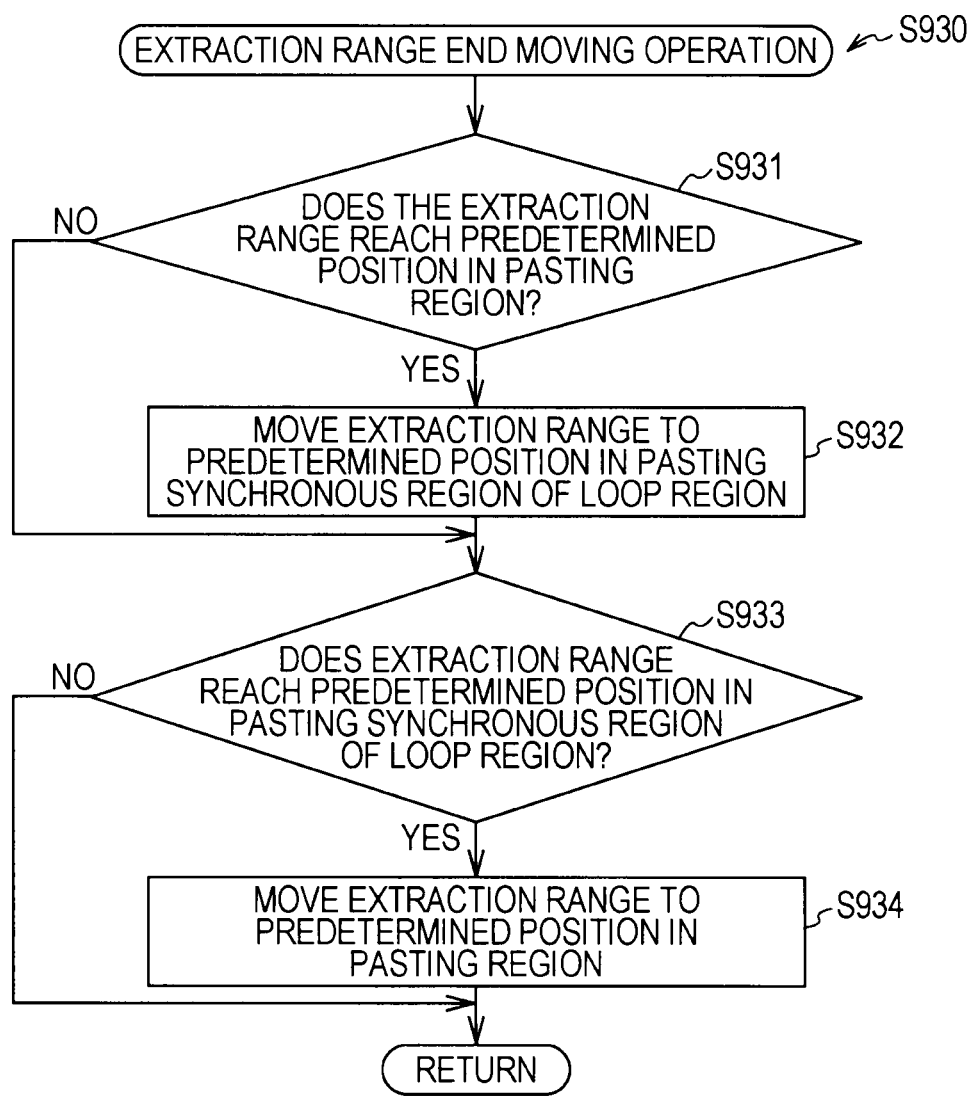
FIG. 29 is a flowchart illustrating an extraction range end moving operation in the processing sequence of the content reproducing process by the imaging apparatus according to the first embodiment of the invention.

FIG. 29 is a flowchart illustrating the extraction range end moving operation (in the processing sequence of step S930 in FIG. 28) in the processing sequence of the content reproducing process by the imaging apparatus 100 according to the first embodiment of the invention.

Initially, the display controller 142 determines whether the extraction range reaches a predetermined position (for example, the position of the image drawing region 326 in FIG. 5) in the pasting region (step S931). When the extraction range reaches the predetermined position in the pasting region (step S931), the display controller 142 moves the extraction range to a predetermined position (for example, the image drawing region 321 in FIG. 5) in the pasting synchronous region of the loop region (step S932). Alternatively, when the extraction range does not reach the predetermined position in the pasting region (step S931), the process proceeds to step S933.

Subsequently, the display controller 142 determines whether the extraction range reaches the predetermined position (for example, the image drawing region 321 in FIG. 5) in the pasting synchronous region of the loop region (step S933). When the extraction range reaches the predetermined position in the pasting synchronous region (step S933), the display controller 142 moves the extraction range to the predetermined position (for example, the position of the image drawing region 326 in FIG. 5) in the pasting region (step S934). Alternatively, the extraction range does not reach the predetermined position in the pasting synchronous region (step S933), the extraction range end moving operation is ended.

Figure 30:
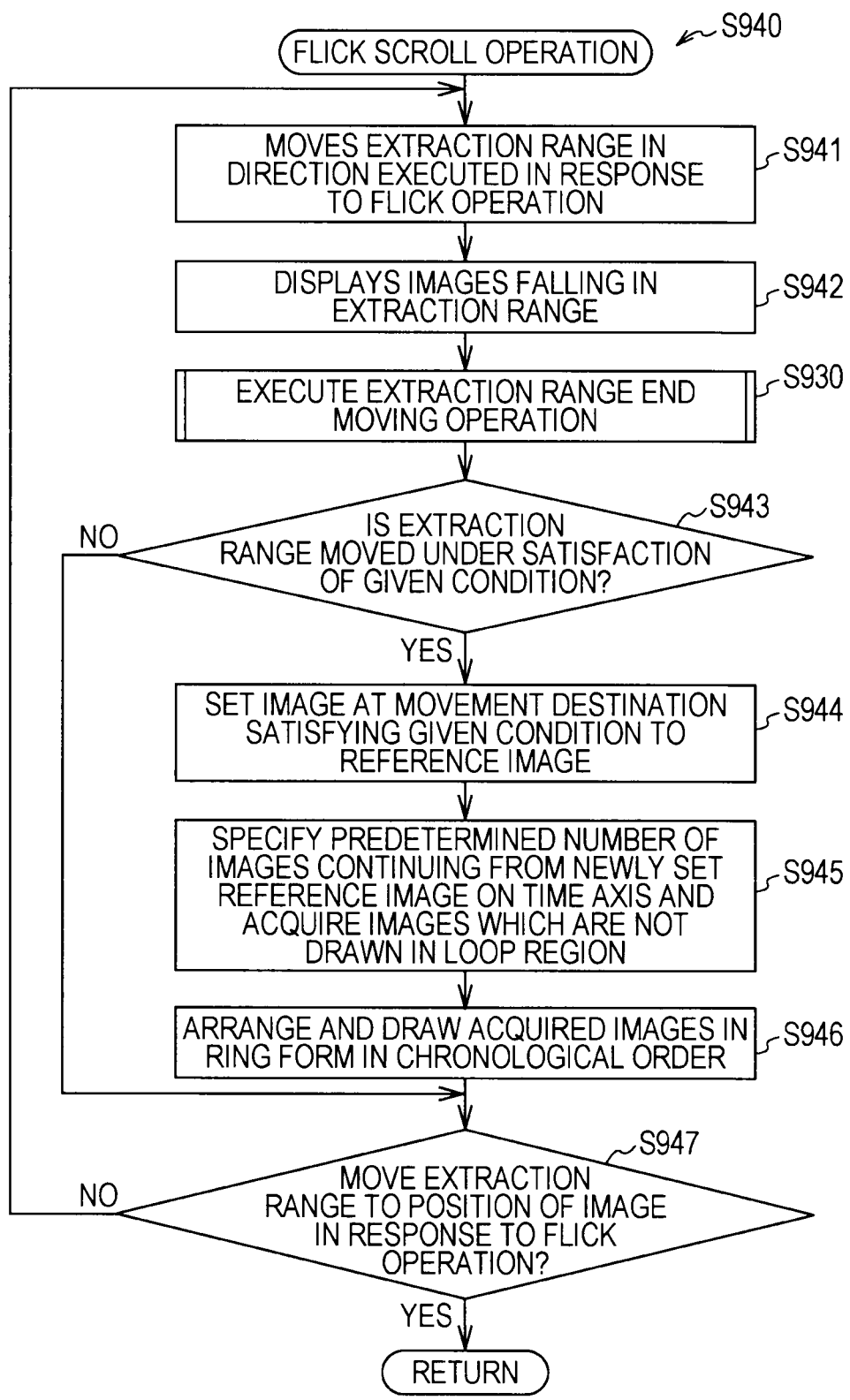
FIG. 30 is a flowchart illustrating a flick scroll operation in the processing sequence of the content reproducing process by the imaging apparatus according to the first embodiment of the invention.

FIG. 30 is a flowchart illustrating the flick scroll operation (in the processing sequence of step S940 in FIG. 27) in the processing sequence of the content reproducing process by the imaging apparatus 100 according to the first embodiment of the invention.

Initially, the display controller 142 moves the extraction range in a direction executed in response to the flick operation (step S941) and displays the images falling within the moved extraction range on the display panel 191 among the images drawn in the image memory 300 (step S942). Subsequently, the extraction range end moving operation is executed (step S930). The extraction range end moving operation is the same as that shown in FIG. 29.

Subsequently, it is determined whether the extraction range is moved under the satisfaction of a given condition (step S943). When the extraction range is not moved under the satisfaction of the given condition (step S943), the process proceeds to step S947. When the extraction range is moved under the satisfaction of the given condition (step S943), the image at the movement destination satisfying the given condition is set to the reference image (step S944). Subsequently, the newly set reference image and the predetermined number of images continuing from the reference image are specified, and the drawing unit 141 acquires the images (image data) which are not drawn in the loop region in the image memory 300 (step S945).

Subsequently, the drawing unit 141 arranges and draws the acquired images in chronological order in the loop region in the image memory 300 (step S946). In this case, when the images are drawn in the pasting synchronous region of the loop region, the same images as the drawn images are drawn in the pasting region.

Subsequently, it is determined whether the extraction range is moved up to the position of the image in response to the flick operation (step S947). When the extraction range is not moved up to the position of the image in response to the flick operation (step S947), the process returns to step S941. Alternatively, when the extraction range is moved up to the position of the image in response to the flick operation (step S947), the flick scroll operation is ended.

Figure 31:
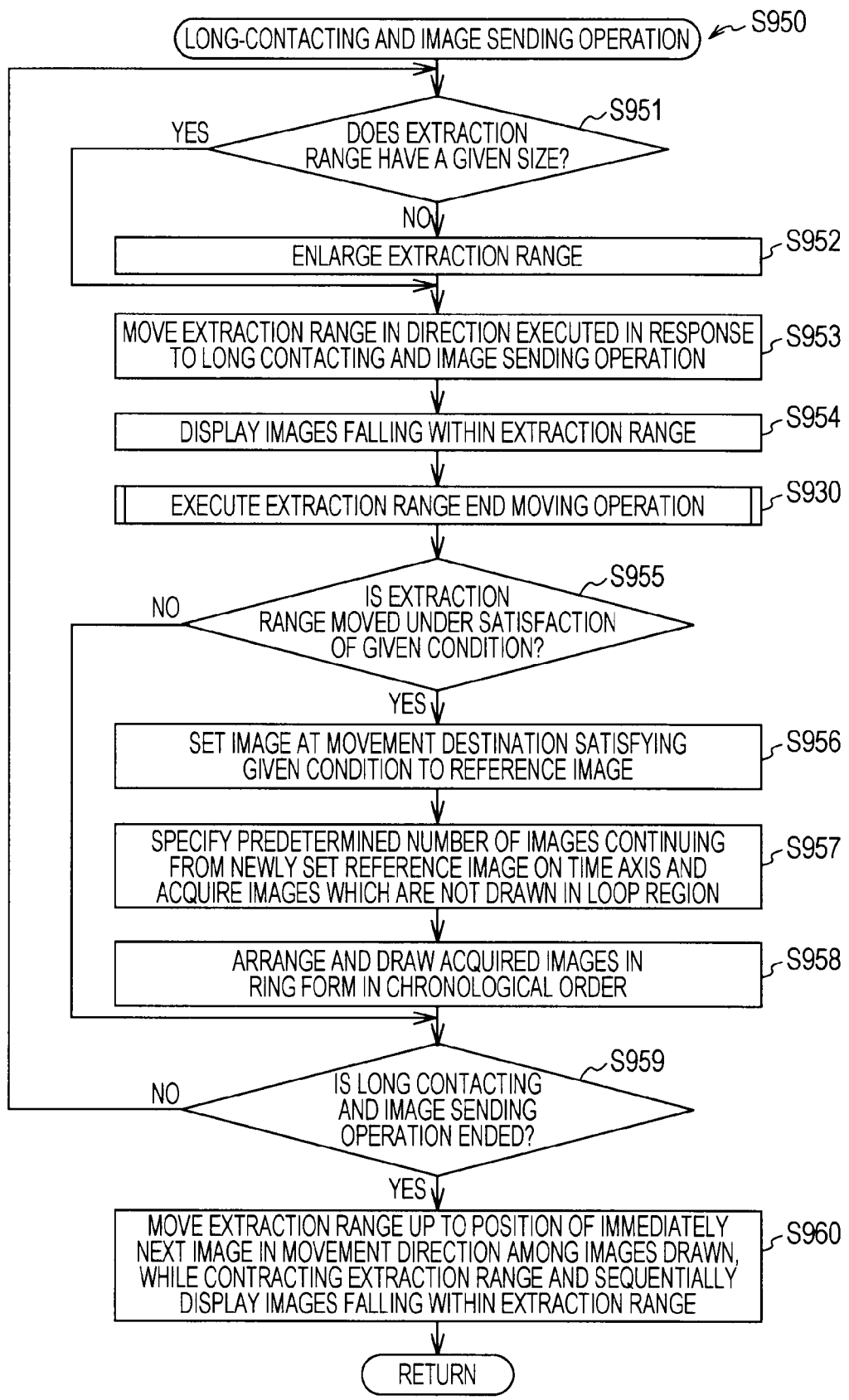
FIG. 31 is a flowchart illustrating a long-contacting and image sending scroll operation in the processing sequence of the content reproducing process by the imaging apparatus according to the first embodiment of the invention.

FIG. 31 is a flowchart illustrating the long-contacting and image sending scroll operation (in the processing sequence of step S950 in FIG. 27) in the processing sequence of the content reproducing process by the imaging apparatus 100 according to the first embodiment of the invention.

Initially, the display controller 142 determines whether the extraction range has a given size (for example, the size of the extraction range 350 enlarged as in FIGS. 16A and 16B to FIGS. 18A and 18B) (step S951). When the extraction range does not have the given size (step S951), the display controller 142 enlarges the extraction range (step S952). Alternatively, when the extraction range has the given size, the process proceeds to step S953.

Subsequently, the display controller 142 moves the extraction range in a direction executed in response to the long-contacting and image sending operation (step S953) and displays the images falling within the moved extraction range on the display panel 191 among the images drawn in the image memory 300 (step S954). Subsequently, the extraction range end moving operation is executed (step S930). The extraction range end moving operation is nearly the same as that shown in FIG. 29. However, since the extraction range is enlarged in the long-contacting and image sending operation, the predetermined position in the pasting region or the pasting synchronous region may be set to the entire pasting region or the entire pasting synchronous region.

Subsequently, it is determined whether the extraction range is moved under the satisfaction of a given condition (step S955). When the extraction range is not moved under the satisfaction of the given condition (step S955), the process proceeds to step S959. When the extraction range is moved under the satisfaction of the given condition (step S955), the image at the movement destination satisfying the given condition is set to the reference image (step S956). Subsequently, the newly set reference image and the predetermined number of images continuing from the reference image are specified, and the drawing unit 141 acquires the images (image data) which are not drawn in the loop region in the image memory 300 (step S957).

Subsequently, the drawing unit 141 arranges and draws the acquired images in chronological order in the loop region in the image memory 300 (step S958). In this case, when the images are drawn in the pasting synchronous region of the loop region, the same images as the drawn images are drawn in the pasting region.

Subsequently, it is determined whether the long-contacting and image sending operation is ended (step S959). When the long-contacting and image sending operation is not ended (step S959), the process returns to step S951. Alternatively, when the long-contacting and image sending operation is ended (step S959), the display controller 142 moves the extraction range up to the position of the immediately next image in the movement direction among the images drawn in the image memory 300, while contracting the extraction range (step S960). In addition, the display controller 142 sequentially displays the images falling within the moved extraction range on the display panel 191 among the images drawn in the image memory 300 (step S960). Then, the long-contacting and image sending scroll operation is ended.

2. Second Embodiment

In the first embodiment of the invention, the example has been described in which the pasting region is provided in one end of the loop region in the specified direction. In a second embodiment of the invention, an example will be described in which the pasting regions are provided in both ends of the loop region in a specified direction. The configuration of the imaging apparatus of the second embodiment of the invention is nearly the same as that of the first embodiment of the invention. Therefore, the configuration different from that of the first embodiment of the invention will be mainly described below.

Exemplary Drawing Region of Display Target Image

Figure 32:
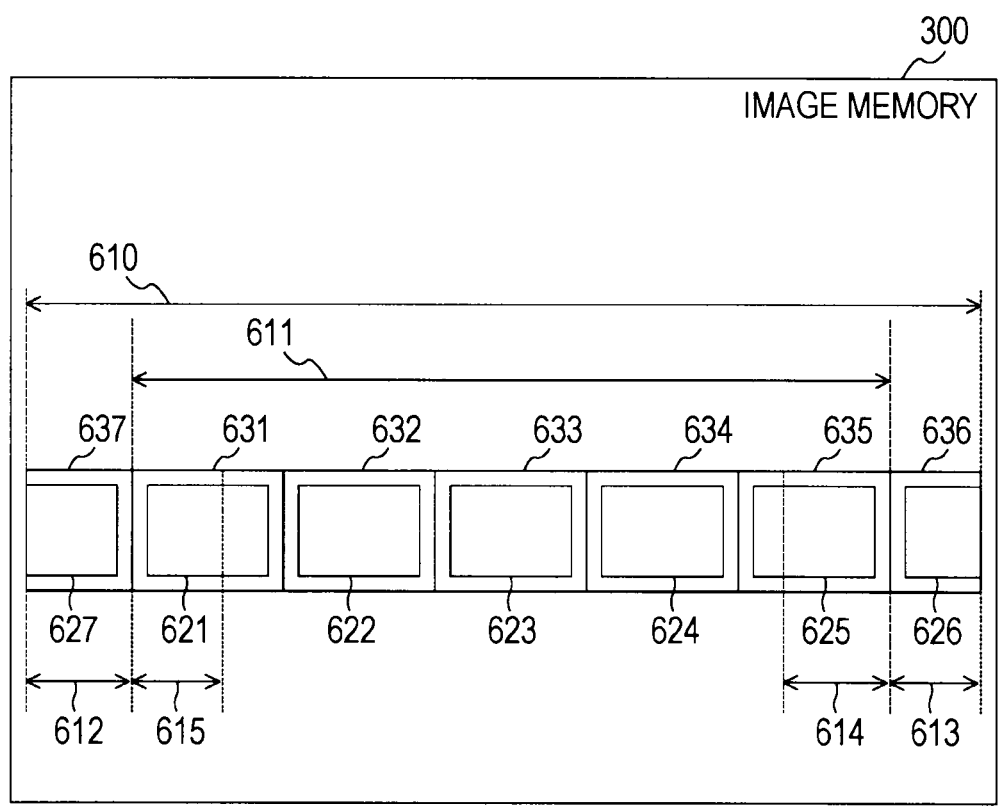
FIG. 32 is a schematic diagram illustrating the drawing region of the display target image in the image memory according to a second embodiment of the invention.

FIG. 32 is a schematic diagram illustrating the drawing region of the display target image in the image memory 300 according to the second embodiment of the invention. The example shown in FIG. 32 is a modified example of the example shown in FIG. 5. The example is nearly the same as the example shown in FIG. 5 except that the pasting regions are provided in both ends of the loop region in the specified direction instead of providing the pasting region in one end of the loop region in the specified direction. Therefore, the configuration different from that shown in FIG. 5 will be mainly described below.

When the images indicating the contents stored in the memory unit 200 are scroll-displayed by an operation of a user or the like, as shown in FIG. 32, a relatively long drawing region (an effective region 610) is guaranteed in a scroll direction in the image memory 300.

The effective region 610 includes a loop region 611, a first pasting region 612, and a second pasting region 613.

The loop region 611 is a region where there are drawn a reference image, two images located before the reference image along the time axis and continuing from the reference image, and two images located after the reference image along the time axis and continuing from the reference image. In the loop region 611, the images are drawn in image drawing regions 621 to 625, for example. In addition, black-border regions 631 to 635 are disposed around the image drawing regions 621 to 625, respectively.

The first pasting region 612 is a region where the same image as the image drawn in a first pasting synchronous region 614 of the loop region 611 is drawn. The second pasting region 613 is a region where the same image as the image drawn in a second pasting synchronous region 615 of the loop region 611 is drawn. A black-border region 637 is disposed around the image drawing region 627 of the first pasting region 612. A black-border region 636 is disposed around the image drawing region 626 of the second pasting region 613. Here, the rectangular shape specified by the first pasting region 612 and the second pasting synchronous region 615 is set to be equal to larger than the extraction range (for example, the enlarged extraction range 350 shown in FIGS. 33A and 33B). Similarly, the rectangular shape specified by the second pasting region 613 and the first pasting synchronous region 614 is set to be equal to larger than the extraction range.

Exemplary Scroll Display by Long-Contacting and Image Sending Operation

Figure 33A:
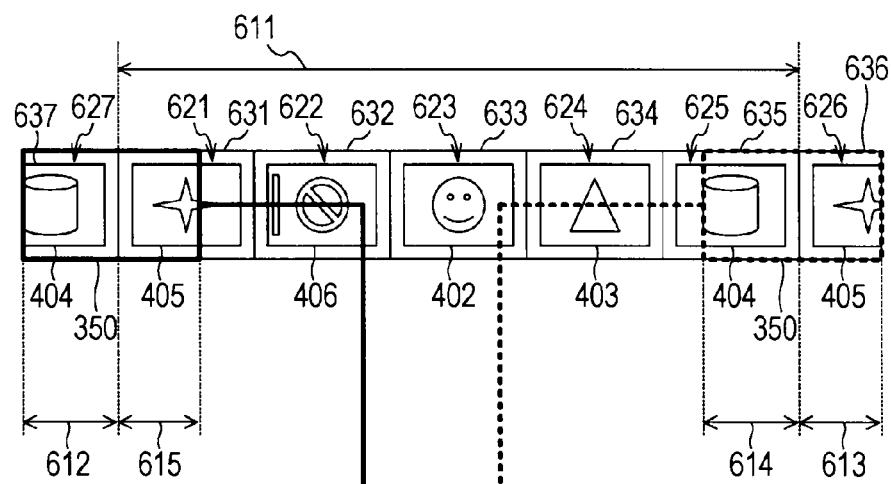
FIGS. 33A and 33B are schematic diagrams illustrating a drawing method of drawing images in an image memory by the drawing unit and a display method of displaying the images drawn in the image memory by the display controller according to the second embodiment of the invention.
Figure 33B:
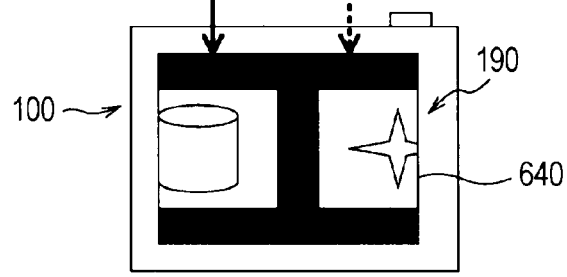

FIGS. 33A and 33B are schematic diagrams illustrating a drawing method of drawing images in an image memory 300 by the drawing unit 141 and a display method of displaying the images drawn in the image memory 300 by the display controller 142 according to the second embodiment of the invention. In the example shown in FIG. 33A, when the image 404 is set to the reference image, two images 402 and 403 and two images 405 and 406 are drawn which continue from the reference image and are disposed on both sides of the reference image. In this case, the same image as the image (the image 404) drawn in the first pasting synchronous region 614 of the loop region 611 is drawn in the first pasting region 612. In addition, the same image as the image (the image 405) drawn in the second pasting synchronous region 615 of the loop region 611 is drawn in the second pasting region 613. In the example shown in FIG. 33A, the enlarged extraction range 350 is moved in a direction (right direction) from the image 404 to the image 405 by the long-contacting and image sending operation.

FIG. 33B shows the display example of the images displayed on the input/output panel 190 in the state shown in FIG. 33A. As shown in FIG. 33A, the extraction range 350 is moved. When the entire extraction range 350 reaches the second pasting region 613 and the first pasting synchronous region 614, the extraction range 350 is moved to the first pasting region 612 and the second pasting synchronous region 615. In this case, an image 640 falling within the extraction range 350 is sequentially displayed on the input/output panel 190. In FIG. 33A, the extraction range 350 reaching the second pasting region 613 and the first pasting synchronous region 614 is indicated by a dot line. The extraction range 350 reaching the first pasting region 612 and the second pasting synchronous region 615 is indicated by a solid line.

In the second embodiment of the invention, the sum size of the first pasting region and the second pasting region is set to be equal to or larger than the enlarged extraction range and the pasting region is separated and disposed on both ends of the loop region. Even in this arrangement, the scroll display can be executed through animation in the ends of the loop region.

3. Third Embodiment

In the first and second embodiments of the invention, the examples have been described in which the pasting region is provided in the end of the loop region in the specified direction to continuously execute the scroll display in the end of the loop region. In a third embodiment of the invention, an example will be described in which the scroll display in the end of the loop region is continuously executed without providing the pasting region in the end of the loop region in the specified direction. The configuration of the imaging apparatus of the third embodiment of the invention is nearly the same as that of the first embodiment of the invention. Therefore, the configuration different from that of the first embodiment of the invention will be mainly described below.

Exemplary Drawing Region of Display Target Image

Figure 34:
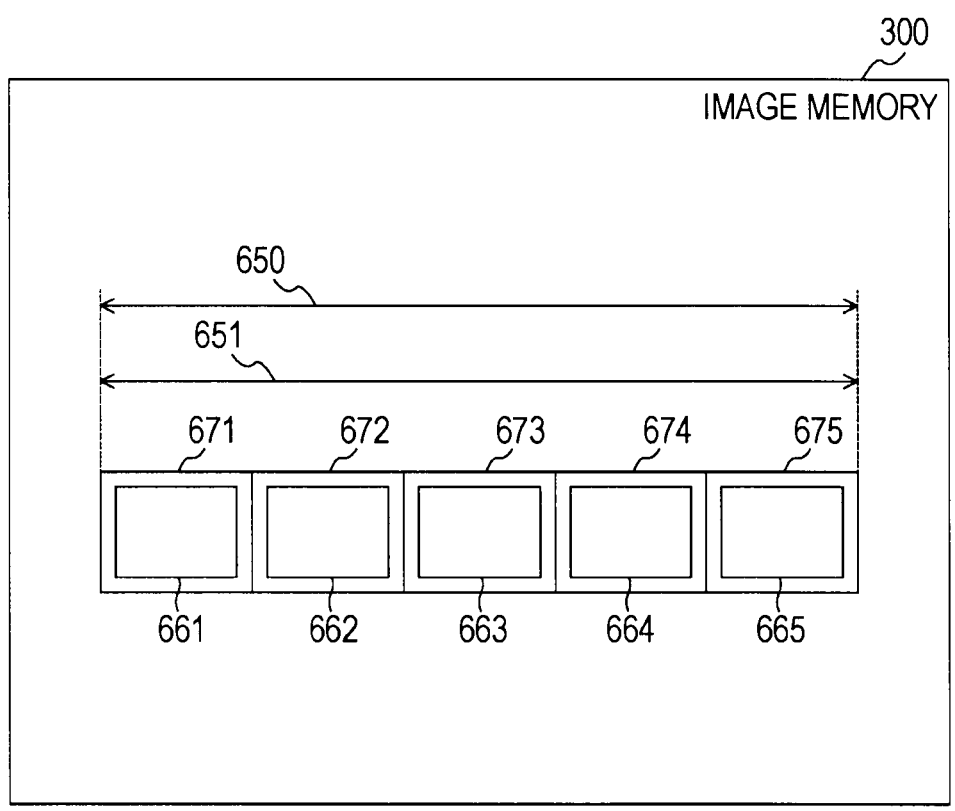
FIG. 34 is a schematic diagram illustrating the drawing region of the display target image in the image memory according to a third embodiment of the invention.

FIG. 34 is a schematic diagram illustrating the drawing region of the display target image in the image memory 300 according to the third embodiment of the invention. The example shown in FIG. 34 is a modified example of the example shown in FIG. 5. The example is nearly the same as the example shown in FIG. 5 except that the pasting region is not provided in the end of the loop region in the specified direction. Therefore, the configuration different from that shown in FIG. 5 will be mainly described below.

When the images indicating the contents stored in the memory unit 200 are scroll-displayed by an operation of a user or the like, as shown in FIG. 34, a relatively long drawing region (an effective region 650) is guaranteed in a scroll direction in the image memory 300. The effective region 650 is formed only by a loop region 651.

The loop region 651 is a region where there are drawn a reference image, two images located before the reference image along the time axis and continuing from the reference image, and two images located after the reference image along the time axis and continuing from the reference image. In the loop region 651, the images are drawn in image drawing regions 661 to 665, for example. In addition, the image drawing regions 671 to 675 are disposed around the black-border regions 661 to 665, respectively.

Exemplary Scroll Display by Long-Contacting and Image Sending Operation

Figure 35A:
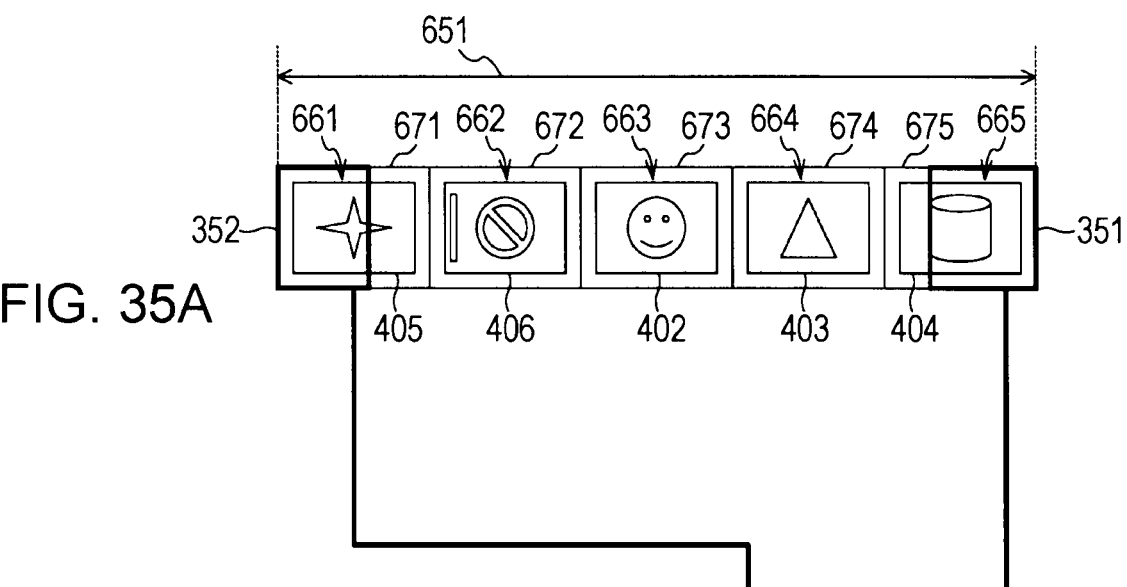
FIGS. 35A and 35B are schematic diagrams illustrating a drawing method of drawing images in an image memory by the drawing unit and a display method of displaying the images drawn in the image memory by the display controller according to a third embodiment of the invention.
Figure 35B:
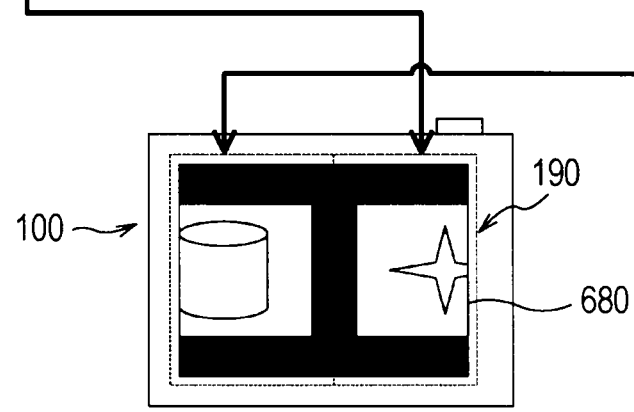

FIGS. 35A and 35B are schematic diagrams illustrating a drawing method of drawing images in an image memory 300 by the drawing unit 141 and a display method of displaying the images drawn in the image memory 300 by the display controller 142 according to the third embodiment of the invention. In the example shown in FIG. 35A, when the image 404 is set to the reference image, two images 402 and 403 and two images 405 and 406 are drawn which continue from the reference image and are disposed on both sides of the reference image. In the example shown in FIG. 35A, the extraction range is moved in a direction (right direction) from the image 404 to the image 405 by the long-contacting and image sending operation.

FIG. 35B shows the display example of the images displayed on the input/output panel 190 in the state shown in FIG. 35A. When the extraction range is moved and the extraction range reaches the end of the loop region 651, as in FIG. 35A, the display controller 142 sets two extraction ranges (extraction ranges 351 and 352) in both ends of the loop region 651. The sum size of the two extraction ranges may be set to be equal to or larger than the size of the above-described extraction range 350. Then, the display controller 142 combines the images falling in the extraction ranges 351 and 352 disposed on the both ends of the loop region 651 and displays a combined image 680 on the input/output panel 190. The display controller 142 moves the extraction ranges 351 and 352 disposed on the both sides of the loop region 651 at a predetermined speed. The display controller 142 sets one extraction range in the loop region 651, when the extraction range disposed either one end or the other end of the loop region 651 is not necessary. For example, when the extraction range is moved in a direction (right direction) from the image 405 to the image 406, the extraction range 351 is erased and the extraction 352 is continuously moved in a state where the extraction range 352 has the size of the normal extraction range (the extraction range 350).

In the third embodiment of the invention, two extraction ranges are set on the both sides of the loop range and the images falling within the two extraction ranges are combined to generate and display the combined image. In this way, the scroll display can be continuously executed in the ends of the loop region in the way of continuous animation, even when the pasting region is not provided.

4. Fourth Embodiment

In the first to third embodiments of the invention, the example has been described in which the images indicating the contents are scroll-displayed in a horizontal direction. In a fourth embodiment of the invention, an example will be described in which thumbnail images contained in an index screen (content selection screen) used to select the contents becoming reproduction targets are scroll-displayed. The configuration of the imaging apparatus of the fourth embodiment of the invention is nearly the same as that of the first embodiment of the invention. Therefore, the configuration different from that of the first embodiment of the invention will be mainly described below.

Exemplary Drawing Region of Display Target Image

Figure 36:
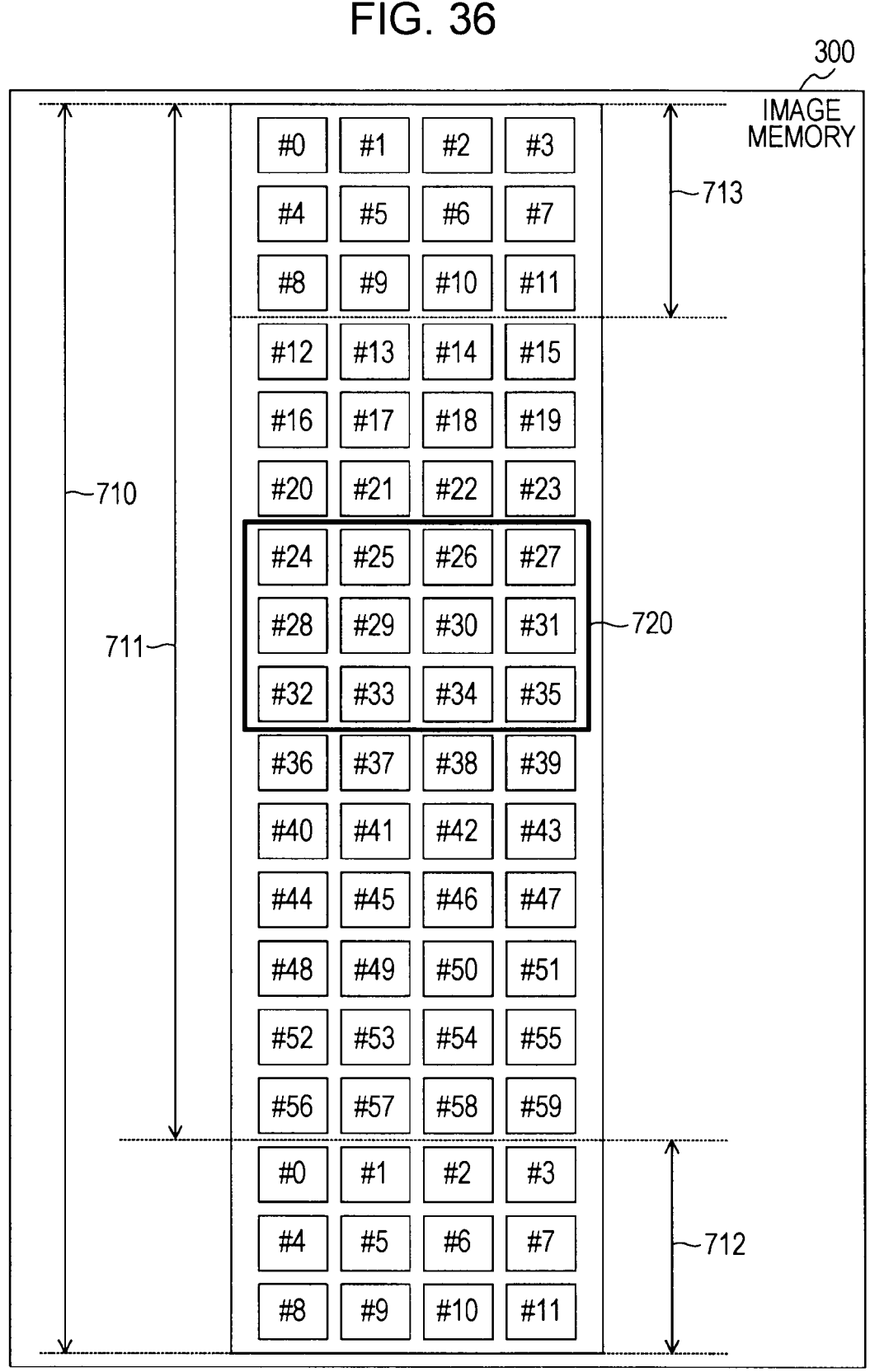
FIG. 36 is a schematic diagram illustrating the drawing region of the display target image in the image memory according to a fourth embodiment of the invention.

FIG. 36 is a schematic diagram illustrating the drawing region of the display target image in the image memory 300 according to the fourth embodiment of the invention. Here, when the index screen is displayed to select the contents stored in the memory unit 200 by an operation of a user in the fourth embodiment of the invention, a relatively long drawing region is guaranteed in the scroll direction in the image memory 300. For example, as shown in FIG. 36, an effective region 710 is guaranteed as the drawing region of the display target image in the image memory 300. In the example shown in FIG. 36, the drawing region of the display target image is shown when the index screen is scrolled in a vertical direction on the input/output panel 190. The example shown in FIG. 36 is a modified example of that shown in FIG. 5 and is nearly the same as the example shown in FIG. 5 except that the thumbnail image in which the drawing target is contained in the contents is provided and the index screen is scrolled in the vertical direction. Therefore, the configuration different from that shown in FIG. 5 will be mainly described below.

The effective region 710 includes a loop region 711 and a pasting region 712. In the effective region 710, the images are drawn in chronological order in accordance with the arrangement for displaying the index screen.

The loop region 711 is a region where the plurality of thumbnail images (reference image group), which are the display targets, and the plurality of images (the near images) continuing from the reference image group are drawn. For example, thumbnail images #0 to #59 are drawn in a 4×15 matrix form. In addition, thumbnail images #0 to #59 are arranged in chronological order (in order of #0 to #59). For example, twenty four thumbnail images (the thumbnail images arranged in a 4×6 matrix form) located before the reference image group on the time axis and continuing from the reference image group are drawn as the near images drawn in the loop region 711. For example, twenty four thumbnail images (the thumbnail images arranged in a 4×6 matrix form) located after the reference image group on the time axis and continuing from the reference image group are also drawn as the near images drawn in the loop region 711. For example, when thumbnail images #24 to #35 falling within the extraction range 720 are set to the reference image group, twenty four thumbnail images located before the reference image group on the time axis and continuing from the reference image group are thumbnail images #0 to #23. In addition, twenty four thumbnail images located after the reference image group on the time axis and continuing from the reference image group are thumbnail images #36 to #59.

The pasting region 712 is a region where the same thumbnail images as the thumbnail images drawn in the pasting synchronous region 713 of the loop region 711 are drawn. The pasting region 712 is set to have a size equal to or larger than that of the extraction range 720.

Exemplary Scroll Display of Index Image

FIGS. 37A and 37B are schematic diagrams illustrating a drawing method of drawing images in an image memory 300 by the drawing unit 141 and a display method of displaying the images drawn in the image memory 300 by the display controller 142 according to the fourth embodiment of the invention. In FIG. 37A, some of the image drawing regions of the loop region 711 are omitted. As shown in FIG. 37A, the same thumbnail images as the thumbnail images (the thumbnail images arranged in a 4×3 matrix form) drawn in the pasting synchronous region 713 of the loop region 711 are drawn in the pasting region 712.

In FIG. 37B, a display example of the index screen displayed on the input/output panel 190 is displayed in the state shown in FIG. 37A. As shown in FIG. 37B, a list of the thumbnail images falling within the extraction range 720 is displayed as the index screen 730 on the input/output panel 190. In this way, when an instruction operation of moving the index screen 730 in the vertical direction is executed by the user in the state where the index screen 730 is displayed on the input/output panel 190, the extraction range 720 is moved in the vertical direction in response to the instruction operation. The thumbnail images falling within the extraction range 720 are changed in response to the movement of the extraction range 720, and a list of the changed thumbnail images is sequentially displayed as the index screen on the input/output panel 190.

The reference image group is also changed in response to the movement of the extraction range 720. For example, the reference image group is changed in each one line among three lines of the thumbnail images falling within the extraction range 720. For example, when the thumbnail images of one line falling within the new extraction range 720 in response to the movement of the extraction range 720 fall within the extraction range 720 at a predetermined ratio in the vertical direction, the thumbnail images of three line including the thumbnail images of the new one line can be changed as the reference image group.

The movement of the extraction range 720 when the extraction range 720 reaches the pasting region 712 or the pasting synchronous region 713 is executed in the same manner as that of the first embodiment of the invention. Therefore, the description is omitted.

In this way, in the fourth embodiment of the invention, when the thumbnail images falling within the index screen are scroll-displayed, the thumbnail images can be scroll-displayed appropriately in the way of continuous animation.

In the embodiments of the invention, as described above, it is possible to execute the scroll display through animation appropriately in response to the operation of the user. That is, it is possible to execute the series of operations associated with the scroll display through animation readily without delay. For example, even when the images are changed from the end of the loop region to the other end of the loop region in the image memory, it is possible to execute the scroll display through animation without giving a discomfort to the user. In this way, in the GUI (Graphical User Interface) where the images are scroll-displayed, it is possible to improve visibility upon scroll-displaying the images.

In the embodiments of the invention, the examples have been described in which the images indicating the contents are arranged and drawn on the basis of the temporal information as a predetermined rule. For example, attribute information, such as location information or a title (for example, a file name), associated with the contents may be used. When the location information is used, the order of the contents can be specified on the basis of a distance from a reference position (for example, the home of a user). Alternatively, when the title is used, the order of the contents can be specified in lexical order of dictionary (for example, order of Japanese alphabet, order of English alphabet, or order of numeral), for example.

In the embodiments of the invention, the examples have been described in which the screen nail images or the thumbnail images contained in the still screen file as the images indicating the contents are drawn. However, when the screen nail images becoming the drawing target images are not contained in the still screen file, for example, the thumbnail images contained in the still screen file may be used for the drawing. When the thumbnail images becoming the drawing target images are not contained in the still screen file, for example, the screen nail images contained in the still screen file may be used for the drawing. When the screen nail images and the thumbnail images are not contained in the still screen file, the image contained in the still screen file may be used for the drawing. Alternatively, instead of using the image contained in the still screen file for the drawing, the images indicating the contents may be used for the drawing on the basis of the attribute information recorded in a management file managing the contents. The embodiments of the invention are applicable to a case where the image indicating a video file is displayed as the images indicating the contents. As the image indicating the video file, for example, the thumbnail image or the like of a representative frame (for example, a head frame) may be used.

The embodiments of the invention are applicable to a case where images indicating other contents except for video contents and still screen contents are displayed. For example, when images (for example, music jacket images) on the contents of voice data are displayed to execute the scroll display by an operation of a user, the embodiments of the invention are applicable.

In the embodiments of the invention, the imaging apparatus such as a digital still camera has been described as an example. However, the embodiments of the invention are applicable to an image processing apparatus such as a portable phone or a portable media player capable of reproducing contents such as music, videos, still screen images. For example, the embodiments of the invention are applicable to an image processing apparatus such as a personal computer capable of generating and displaying contents such as document data. In addition, the embodiments of the invention are applicable to an image processing apparatus capable of outputting contents to another display apparatus and displaying images indicating the contents on the display apparatus.

The embodiments of the invention are just examples for realizing embodiments of the invention. The specific details of the embodiments of the invention have a corresponding relationship with the specific details of the appended claims, as described in the embodiments of the invention. Similarly, the specific details of the appended claims have a corresponding relationship with the details of the embodiments of the invention to which the same terms as those the appended claims are given.

The processing sequence of the embodiments of the invention may be understood as a method of the series of processing sequences or a program causing a computer to execute the series of processing sequences or a recording medium storing the program. Examples of the recording medium include a CD (Compact Disc), an MD (MiniDisc), a DVD (Digital Versatile Disk), a memory card, and a Blu-ray disc (registered trademark).

The present application contains subject matter related to that disclosed in Japanese Priority Patent Application JP 2009-180627 filed in the Japan Patent Office on Aug. 3, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a drawing unit which draws one of a plurality of images arranged in an order specified based on a predetermined rule as a reference image in an image memory and which arranges and draws a predetermined number of images located before the reference image and a predetermined number of images located after the reference image, in an order and continuing from the reference image as near images of the reference image with reference to the reference image in the image memory;
a display controller which displays images falling within a predetermined range as the near images drawn in the image memory on a display unit; and
a controller which changes position of the predetermined range in accordance with an instruction operation of changing a display state of the images on the display unit, when the instruction operation is received, which changes the reference image to another image from the near images drawn in the image memory, when a given condition is satisfied, and which permits the drawing unit to arrange and draw the near images of the changed reference image in the order with reference to the changed reference image,
wherein the drawing unit arranges and draws the reference image and the near images in the order in a specified direction in an image drawing region of the image memory,
wherein the controller permits, when all of the near images of the changed reference image are not able to be arranged and drawn in the image drawing region in the specified direction in the order upon changing the reference image, the drawing unit to draw a near image, which is not able to be drawn, in the opposite end of the image drawing region in the specified direction in the order.

2. The image processing apparatus according to claim 1, wherein when the instruction operation is received, the controller changes the number of near images of the changed reference image in accordance to the received instruction operation.

3. The image processing apparatus according to claim 1, wherein the drawing unit draws the same image as the reference image or the near image drawn in one end of the image drawing region in the specified direction in the opposite end of the image drawing region in the specified direction, and
wherein the controller moves the predetermined range to the opposite end of the image drawing region in the specified direction, when the predetermined range changed in accordance with the instruction operation reaches either one or the opposite end of the image drawing region in the specified direction.

4. The image processing apparatus according to claim 3, wherein the drawing unit allows the size of a drawing region in the opposite end of the image drawing region in the specified direction, where the same image as the reference image or the near image drawn in the one end of the image drawing region is drawn, to be nearly equal to the largest size of the predetermined range.

5. The image processing apparatus according to claim 1, wherein the controller permits the drawing unit to newly draw only the near image which is not drawn in the image memory as the near images, when the reference image is changed.

6. The image processing apparatus according to claim 1, further comprising:
an operation receiving unit which receives an operation detail as an instruction operation to scroll-display the plurality of images on the display unit,
wherein the display controller moves the predetermined range in accordance with the instruction operation to scroll-display and permits the display unit to scroll-display each image drawn in the image memory.

7. The image processing apparatus according to claim 1, wherein the plurality of images are images indicating contents, and
wherein the drawing unit specifies the order based on attribute information associated with the contents.

8. The image processing apparatus according to claim 1, wherein the plurality of images are thumbnail images indicating contents,
wherein the drawing unit draws the reference image and the near images in the order in accordance with display arrangement of a content selection screen used to select the contents, and
wherein the display controller displays the content selection screen, which contains the predetermined range within which a plurality of thumbnail images fall among the thumbnail images drawn in the image memory and contains the plurality of thumbnail images falling within the predetermined range, on the display unit.

9. An image processing method comprising the steps of:
drawing one of a plurality of images arranged in an order specified based on a predetermined rule as a reference image in an image memory, and arranging and drawing, a predetermined number of images located before the reference image and a predetermined number of images located after the reference image, in an order and continuing from the reference image as near images of the reference image with reference to the reference image in the image memory;
displaying images falling within a predetermined range as the near images drawn in the image memory on a display unit;
changing position of the predetermined range in accordance with an instruction operation of changing a display state of the images on the display unit, when the instruction operation is received, changing the reference image to another image from the near images drawn in the image memory, when a given condition is satisfied, and permitting to arrange and draw the near images of the changed reference image in the order with reference to the changed reference image;
arranging and drawing the reference image and the near images in the order in a specified direction in the image drawing region of the image memory; and
permitting, when all of the near images of the changed reference image are not able to be arranged and drawn in the image drawing region in the specified direction in the order upon changing the reference image, to draw the near image, which is not able to be drawn, in the opposite end of an image drawing region in the specified direction in the order.

10. A non-transitory computer-readable storage medium having stored thereon, a computer program having at least one code section for image processing, said at least one code section being executable by a computer for causing said computer to perform steps comprising:
drawing one of a plurality of images arranged in an order specified based on a predetermined rule as a reference image in an image memory, and arranging and drawing, a predetermined number of images located before the reference image and a predetermined number of images located after the reference image, in an order and continuing from the reference image as near images of the reference image with reference to the reference image in the image memory;

displaying images falling within a predetermined range as the near images drawn in the image memory on a display unit;

changing position of the predetermined range in accordance with an instruction operation of changing a display state of the images on the display unit, when the instruction operation is received, changing the reference image to another image from the near images from the image memory, when a given condition is satisfied, and permitting to arrange and draw the near images of the changed reference image in the order with reference to the changed reference image;

arranging and drawing the reference image and the near images in the order in a specified direction in the image drawing region of the image memory; and permitting, when all of the near images of the changed reference image are not able to be arranged and drawn in the image drawing region in the specified direction in the order upon changing the reference image, to draw the near image, which is not able to be drawn, in the opposite end of an image drawing region in the specified direction in the order.

11. The method according to claim 9, comprising changing the near images based on the changed reference image, when the instruction operation is received.

12. The method according to claim 9, comprising moving the predetermined range to the opposite end of the image drawing region in the specified direction, when the predetermined range changed in accordance with the instruction operation reaches one end of the image drawing region in the specified direction.

13. The method according to claim 9, comprising newly drawing only the near image which is not drawn in the image memory as the near images, when the reference image is changed.

14. The method according to claim 9, comprising:

receiving an operation detail as an instruction operation to scroll-display the plurality of images on the display unit, moving the predetermined range in accordance with the instruction operation to scroll-display and permitting to scroll-display each image drawn in the image memory.

15. The method according to claim 9, comprising specifying the order based on attribute information associated with contents, wherein the plurality of images are images indicating the contents.

16. The method according to claim 9, comprising:

drawing the reference image and the near images in the order in accordance with display arrangement of a content selection screen used to select the contents, and displaying the content selection screen, which contains the predetermined range within which a plurality of thumbnail images fall among the thumbnail images drawn in the image memory and contains the plurality of thumbnail images falling within the predetermined range, on the display unit, wherein the plurality of images are thumbnail images indicating contents.

* * * * *